(12) United States Patent
Ellingford et al.

(10) Patent No.: US 12,301,950 B2
(45) Date of Patent: *May 13, 2025

(54) USER INTERFACES FOR ACCESSING EPISODES OF A CONTENT SERIES

(71) Applicant: Apple Inc., Cupertino, CA (US)

(72) Inventors: Christopher J. Ellingford, Alameda, CA (US); Lucio Moreno Rufo, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,109

(22) Filed: Nov. 22, 2023

(65) Prior Publication Data

US 2024/0089550 A1 Mar. 14, 2024

Related U.S. Application Data

(63) Continuation of application No. 17/210,352, filed on Mar. 23, 2021, now Pat. No. 11,843,838.

(Continued)

(51) Int. Cl.
*H04N 21/431* (2011.01)
*H04N 21/45* (2011.01)
*H04N 21/482* (2011.01)

(52) U.S. Cl.
CPC ....... *H04N 21/4825* (2013.01); *H04N 21/431* (2013.01); *H04N 21/4532* (2013.01)

(58) Field of Classification Search
None
See application file for complete search history.

(56) References Cited

U.S. PATENT DOCUMENTS 2,718,550 A 9/1955 Hoyt et al.
4,672,677 A 6/1987 Yamakawa
(Continued)

FOREIGN PATENT DOCUMENTS

AU 2009255409 B2 7/2012
AU 2016100476 A4 5/2016
(Continued)

OTHER PUBLICATIONS

Advisory Action received for U.S. Appl. No. 15/167,801, mailed on Feb. 16, 2018, 4 pages.
(Continued)

*Primary Examiner* — Nasser M Goodarzi
*Assistant Examiner* — Charles N Hicks
(74) *Attorney, Agent, or Firm* — Kubota & Basol LLP

(57) ABSTRACT

In some embodiments, an electronic device displays a user interface associated with an episodic series. In some embodiments, the user interface includes representations of episodes that are downloaded on the device, does not include a representation of a given not-yet-downloaded episode, and optionally includes a download affordance that is selectable to initiate a process for downloading not-yet-downloaded episodes. In some embodiments, an electronic device displays a user interface associated with an episodic series, wherein the user interface associated with the episodic series of content includes representations of episodes of the episodic series. In some embodiments, in response to receiving the user input selecting a respective representation, the device either initiates a process to display the respective episode or displays a user interface associated with the respective episode without displaying the respective episode.

30 Claims, 48 Drawing Sheets

Related U.S. Application Data

(60) Provisional application No. 63/082,915, filed on Sep. 24, 2020, provisional application No. 62/994,209, filed on Mar. 24, 2020.

(56) References Cited

U.S. PATENT DOCUMENTS

| | | |
|---|---|---|
| 5,029,223 A | 7/1991 | Fujisaki |
| 5,483,261 A | 1/1996 | Yasutake |
| 5,488,204 A | 1/1996 | Mead et al. |
| 5,585,866 A | 12/1996 | Miller et al. |
| 5,596,373 A | 1/1997 | White et al. |
| 5,621,456 A | 4/1997 | Florin et al. |
| 5,677,708 A | 10/1997 | Matthews et al. |
| 5,818,439 A | 10/1998 | Nagasaka et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,049,333 A | 4/2000 | Lajoie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 6,928,433 B2 | 8/2005 | Goodman et al. |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,324,953 B1 | 1/2008 | Murphy |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,665,022 B1 | 2/2010 | Bednarz, Jr. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,316,394 B2 | 11/2012 | Yates |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,607,268 B2 | 12/2013 | Migos |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,509,798 B1 | 11/2016 | Thomas et al. |
| 9,514,476 B2 | 12/2016 | Kay et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |

(56) References Cited

U.S. PATENT DOCUMENTS

| | | |
|---|---|---|
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,940,454 B2 | 4/2018 | Richardson et al. |
| 9,973,800 B2 | 5/2018 | Yellin et al. |
| 9,992,025 B2 | 6/2018 | Mahaffey et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,114,631 B2 | 10/2018 | Shin |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,650,052 B2 | 5/2020 | Van Os et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 11,461,397 B2 | 10/2022 | Van Os et al. |
| 11,843,838 B2 * | 12/2023 | Ellingford .......... H04N 21/4335 |
| 11,863,837 B2 | 1/2024 | Payne |
| 11,962,836 B2 | 4/2024 | Domm et al. |
| 2002/0015024 A1 | 2/2002 | Westerman et al. |
| 2002/0026637 A1 | 2/2002 | Markel et al. |
| 2002/0029170 A1 | 3/2002 | Gasser et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2002/0178446 A1 | 11/2002 | Sie et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1 | 3/2004 | Lin et al. |
| 2004/0070573 A1 | 4/2004 | Graham |
| 2004/0088328 A1 | 5/2004 | Cook et al. |
| 2004/0090463 A1 | 5/2004 | Celik et al. |
| 2004/0093262 A1 | 5/2004 | Weston et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0134625 A1 | 6/2005 | Kubota |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0053470 A1 | 3/2006 | Colter et al. |
| 2006/0069998 A1 | 3/2006 | Artman et al. |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0120624 A1 | 6/2006 | Jojic et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0236847 A1 | 10/2006 | Withop |
| 2006/0248113 A1 | 11/2006 | Leffert et al. |
| 2006/0265637 A1 | 11/2006 | Marriott et al. |
| 2006/0271968 A1 | 11/2006 | Zellner |
| 2006/0282856 A1 | 12/2006 | Errico et al. |
| 2006/0288848 A1 | 12/2006 | Gould et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0011702 A1 | 1/2007 | Vaysman |
| 2007/0024594 A1 | 2/2007 | Sakata et al. |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0094602 A1 | 4/2007 | Murabayashi |
| 2007/0150802 A1 | 6/2007 | Wan et al. |
| 2007/0150918 A1 | 6/2007 | Carpenter et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |

(56) References Cited

U.S. PATENT DOCUMENTS

| | | |
|---|---|---|
| 2007/0204057 A1 | 8/2007 | Shaver et al. |
| 2007/0220580 A1 | 9/2007 | Putterman et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2007/0248317 A1 | 10/2007 | Bahn |
| 2008/0046928 A1 | 2/2008 | Poling et al. |
| 2008/0046931 A1 | 2/2008 | Corbett et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0127281 A1 | 5/2008 | Van et al. |
| 2008/0155475 A1 | 6/2008 | Duhig |
| 2008/0163053 A1 | 7/2008 | Hwang et al. |
| 2008/0189740 A1 | 8/2008 | Carpenter et al. |
| 2008/0189742 A1 | 8/2008 | Ellis et al. |
| 2008/0208844 A1 | 8/2008 | Jenkins |
| 2008/0216020 A1 | 9/2008 | Plummer |
| 2008/0222677 A1 | 9/2008 | Woo et al. |
| 2008/0235331 A1 | 9/2008 | Melamed et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276278 A1 | 11/2008 | Krieger et al. |
| 2008/0276279 A1 | 11/2008 | Gossweiler et al. |
| 2008/0301260 A1 | 12/2008 | Goldeen et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0106110 A1 | 4/2009 | Stannard et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0228807 A1 | 9/2009 | Lemay |
| 2009/0228919 A1 | 9/2009 | Zott et al. |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0009719 A1 | 1/2010 | Oh et al. |
| 2010/0017713 A1 | 1/2010 | Igarashi |
| 2010/0031162 A1 | 2/2010 | Wiser et al. |
| 2010/0046608 A1 | 2/2010 | Mccrossan et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0211884 A1 | 8/2010 | Kashyap et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0299606 A1 | 11/2010 | Morita |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0033168 A1 | 2/2011 | Iyer |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0099519 A1 | 4/2011 | Ma et al. |
| 2011/0107220 A1 | 5/2011 | Perlman |
| 2011/0119710 A1 | 5/2011 | Jang et al. |
| 2011/0119715 A1 | 5/2011 | Chang et al. |
| 2011/0122315 A1 | 5/2011 | Schweiger et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |

(56) References Cited

U.S. PATENT DOCUMENTS

| | | |
|---|---|---|
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054679 A1 | 3/2012 | Ma et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler |
| 2012/0114303 A1 | 5/2012 | Chung et al. |
| 2012/0117584 A1 | 5/2012 | Gordon |
| 2012/0124615 A1 | 5/2012 | Lee |
| 2012/0131615 A1 | 5/2012 | Kobayashi et al. |
| 2012/0139938 A1 | 6/2012 | Khedouri et al. |
| 2012/0141095 A1 | 6/2012 | Schwesinger et al. |
| 2012/0144003 A1 | 6/2012 | Rosenbaum et al. |
| 2012/0158524 A1 | 6/2012 | Hintz et al. |
| 2012/0159543 A1 | 6/2012 | Jin et al. |
| 2012/0166998 A1 | 6/2012 | Cotterill et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0007656 A1 | 1/2013 | Li et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0080968 A1 | 3/2013 | Hanson et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0254308 A1 | 9/2013 | Rose et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332871 A1 | 12/2013 | Bucur et al. |
| 2013/0332960 A1 | 12/2013 | Young et al. |
| 2013/0339877 A1 | 12/2013 | Skeen et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |
| 2014/0028780 A1 | 1/2014 | Croen et al. |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0067425 A1 | 3/2014 | Dudar et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0082660 A1 | 3/2014 | Zhang et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0101706 A1 | 4/2014 | Kardatzke |
| 2014/0104646 A1 | 4/2014 | Nishiyama |
| 2014/0109204 A1 | 4/2014 | Papillon et al. |
| 2014/0111416 A1 | 4/2014 | Sugiura |

(56) References Cited

U.S. PATENT DOCUMENTS

| | | | |
|---|---|---|---|
| 2014/0115636 A1* | 4/2014 | Stuckman | H04N 21/6175 |
| | | | 725/53 |
| 2014/0123006 A1 | 5/2014 | Chen et al. | |
| 2014/0129232 A1 | 5/2014 | Jones et al. | |
| 2014/0130097 A1 | 5/2014 | Londero | |
| 2014/0136946 A1 | 5/2014 | Matas | |
| 2014/0137029 A1 | 5/2014 | Stephenson et al. | |
| 2014/0137030 A1 | 5/2014 | Matas | |
| 2014/0143260 A1 | 5/2014 | Simonson et al. | |
| 2014/0143683 A1 | 5/2014 | Underwood et al. | |
| 2014/0156792 A1 | 6/2014 | Roberts et al. | |
| 2014/0157204 A1 | 6/2014 | Roberts et al. | |
| 2014/0157329 A1 | 6/2014 | Roberts et al. | |
| 2014/0164966 A1 | 6/2014 | Kim et al. | |
| 2014/0168071 A1 | 6/2014 | Ahmed et al. | |
| 2014/0171153 A1 | 6/2014 | Kienzle et al. | |
| 2014/0172622 A1 | 6/2014 | Baronshin | |
| 2014/0172953 A1 | 6/2014 | Blanksteen | |
| 2014/0173660 A1 | 6/2014 | Correa et al. | |
| 2014/0184471 A1 | 7/2014 | Martynov et al. | |
| 2014/0189523 A1 | 7/2014 | Shuttleworth et al. | |
| 2014/0189574 A1 | 7/2014 | Stallings et al. | |
| 2014/0189606 A1 | 7/2014 | Shuttleworth et al. | |
| 2014/0196064 A1 | 7/2014 | Kennedy et al. | |
| 2014/0196069 A1 | 7/2014 | Ahmed et al. | |
| 2014/0208268 A1 | 7/2014 | Jimenez | |
| 2014/0208360 A1 | 7/2014 | Kardatzke | |
| 2014/0219637 A1 | 8/2014 | Mcintosh et al. | |
| 2014/0224867 A1 | 8/2014 | Werner et al. | |
| 2014/0244751 A1 | 8/2014 | Tseng | |
| 2014/0245148 A1 | 8/2014 | Silva et al. | |
| 2014/0245186 A1 | 8/2014 | Tseng | |
| 2014/0245222 A1 | 8/2014 | Kovacevic et al. | |
| 2014/0250465 A1 | 9/2014 | Mulholland et al. | |
| 2014/0250479 A1 | 9/2014 | Lee et al. | |
| 2014/0253463 A1 | 9/2014 | Hicks | |
| 2014/0259074 A1 | 9/2014 | Ansari et al. | |
| 2014/0278072 A1 | 9/2014 | Fino et al. | |
| 2014/0278940 A1 | 9/2014 | Wade | |
| 2014/0280728 A1 | 9/2014 | Szerlip Joyce et al. | |
| 2014/0282208 A1 | 9/2014 | Chaudhri | |
| 2014/0282636 A1 | 9/2014 | Petander et al. | |
| 2014/0282677 A1 | 9/2014 | Mantell et al. | |
| 2014/0288686 A1 | 9/2014 | Sant et al. | |
| 2014/0289226 A1 | 9/2014 | English et al. | |
| 2014/0289751 A1 | 9/2014 | Hsu et al. | |
| 2014/0310742 A1 | 10/2014 | Kim | |
| 2014/0317653 A1 | 10/2014 | Mlodzinski | |
| 2014/0325357 A1 | 10/2014 | Sant et al. | |
| 2014/0333530 A1 | 11/2014 | Agnetta et al. | |
| 2014/0337607 A1 | 11/2014 | Peterson et al. | |
| 2014/0340358 A1 | 11/2014 | Martinoli | |
| 2014/0341109 A1 | 11/2014 | Cartmell et al. | |
| 2014/0344247 A1 | 11/2014 | Procopio et al. | |
| 2014/0344291 A9 | 11/2014 | Simonson et al. | |
| 2014/0344294 A1 | 11/2014 | Skeen et al. | |
| 2014/0351691 A1 | 11/2014 | Neil et al. | |
| 2014/0359598 A1 | 12/2014 | Oliver et al. | |
| 2014/0364056 A1 | 12/2014 | Belk et al. | |
| 2014/0365479 A1 | 12/2014 | Lyons et al. | |
| 2014/0365481 A1 | 12/2014 | Novosel et al. | |
| 2014/0365604 A1 | 12/2014 | Lewis et al. | |
| 2014/0365919 A1 | 12/2014 | Shaw et al. | |
| 2014/0366040 A1 | 12/2014 | Parker et al. | |
| 2014/0366047 A1 | 12/2014 | Thomas et al. | |
| 2015/0020127 A1 | 1/2015 | Doshi et al. | |
| 2015/0039685 A1 | 2/2015 | Lewis et al. | |
| 2015/0046866 A1 | 2/2015 | Shimadate | |
| 2015/0067582 A1 | 3/2015 | Donnelly et al. | |
| 2015/0067724 A1 | 3/2015 | Johnson et al. | |
| 2015/0074522 A1 | 3/2015 | Harned et al. | |
| 2015/0074552 A1 | 3/2015 | Chai et al. | |
| 2015/0074603 A1 | 3/2015 | Abe et al. | |
| 2015/0082187 A1 | 3/2015 | Wallters et al. | |
| 2015/0095460 A1* | 4/2015 | Berger | H04L 67/59 |
| | | | 709/219 |
| 2015/0095845 A1 | 4/2015 | Chun et al. | |
| 2015/0106856 A1 | 4/2015 | Rankine | |
| 2015/0113000 A1 | 4/2015 | Scheer et al. | |
| 2015/0113429 A1 | 4/2015 | Edwards et al. | |
| 2015/0121408 A1 | 4/2015 | Jacoby et al. | |
| 2015/0134653 A1 | 5/2015 | Bayer et al. | |
| 2015/0135049 A1 | 5/2015 | Murphy | |
| 2015/0135071 A1 | 5/2015 | Glotzer | |
| 2015/0150049 A1 | 5/2015 | White | |
| 2015/0150066 A1 | 5/2015 | Park et al. | |
| 2015/0153571 A1 | 6/2015 | Ballard et al. | |
| 2015/0161251 A1 | 6/2015 | Ramanarayanan et al. | |
| 2015/0169705 A1 | 6/2015 | Korbecki et al. | |
| 2015/0169975 A1 | 6/2015 | Kienzle et al. | |
| 2015/0186002 A1 | 7/2015 | Suzuki et al. | |
| 2015/0189347 A1 | 7/2015 | Oztaskent et al. | |
| 2015/0193119 A1 | 7/2015 | Chai et al. | |
| 2015/0193192 A1 | 7/2015 | Kidron | |
| 2015/0195624 A1 | 7/2015 | Gossweiler, III | |
| 2015/0205591 A1 | 7/2015 | Jitkoff et al. | |
| 2015/0237389 A1 | 8/2015 | Grouf et al. | |
| 2015/0296072 A1 | 10/2015 | Zhou et al. | |
| 2015/0301729 A1 | 10/2015 | Wang et al. | |
| 2015/0309670 A1 | 10/2015 | Wheeler et al. | |
| 2015/0312603 A1 | 10/2015 | Singh et al. | |
| 2015/0317343 A1 | 11/2015 | Cselle et al. | |
| 2015/0318020 A1 | 11/2015 | Pribula | |
| 2015/0331685 A1 | 11/2015 | Bourke | |
| 2015/0334464 A1 | 11/2015 | Shin | |
| 2015/0346975 A1 | 12/2015 | Lee et al. | |
| 2015/0350741 A1 | 12/2015 | Rajaraman et al. | |
| 2015/0355816 A1 | 12/2015 | Shim | |
| 2015/0363035 A1 | 12/2015 | Hinckley et al. | |
| 2015/0365729 A1 | 12/2015 | Kaya et al. | |
| 2015/0370435 A1 | 12/2015 | Kirmse et al. | |
| 2015/0370455 A1 | 12/2015 | Van Os et al. | |
| 2015/0370920 A1 | 12/2015 | Van Os et al. | |
| 2015/0373107 A1 | 12/2015 | Chan et al. | |
| 2015/0382047 A1 | 12/2015 | Van Os et al. | |
| 2015/0382066 A1 | 12/2015 | Heeter et al. | |
| 2016/0004425 A1 | 1/2016 | Yoon et al. | |
| 2016/0004772 A1 | 1/2016 | Kim et al. | |
| 2016/0004773 A1 | 1/2016 | Jannink et al. | |
| 2016/0005013 A1 | 1/2016 | Perry | |
| 2016/0014461 A1 | 1/2016 | Leech et al. | |
| 2016/0021412 A1 | 1/2016 | Zito, Jr. | |
| 2016/0035119 A1 | 2/2016 | Lee et al. | |
| 2016/0036897 A1 | 2/2016 | Kim et al. | |
| 2016/0041702 A1 | 2/2016 | Wang | |
| 2016/0043962 A1 | 2/2016 | Kim et al. | |
| 2016/0066004 A1 | 3/2016 | Lieu et al. | |
| 2016/0066021 A1 | 3/2016 | Thomas et al. | |
| 2016/0066040 A1 | 3/2016 | Webster et al. | |
| 2016/0066049 A1 | 3/2016 | Mountain | |
| 2016/0078465 A1 | 3/2016 | Chai et al. | |
| 2016/0078526 A1 | 3/2016 | Nations et al. | |
| 2016/0080815 A1 | 3/2016 | Ruffini et al. | |
| 2016/0092042 A1 | 3/2016 | Yenigalla et al. | |
| 2016/0092559 A1 | 3/2016 | Lind et al. | |
| 2016/0096113 A1 | 4/2016 | Decoufle | |
| 2016/0099991 A1 | 4/2016 | Lonkar et al. | |
| 2016/0105540 A1 | 4/2016 | Kwon et al. | |
| 2016/0110064 A1 | 4/2016 | Shapira | |
| 2016/0127783 A1 | 5/2016 | Garcia Navarro | |
| 2016/0127789 A1 | 5/2016 | Roberts et al. | |
| 2016/0133230 A1 | 5/2016 | Daniels et al. | |
| 2016/0142783 A1 | 5/2016 | Bagga et al. | |
| 2016/0165307 A1 | 6/2016 | Lavender et al. | |
| 2016/0188902 A1 | 6/2016 | Jin | |
| 2016/0191639 A1 | 6/2016 | Dai et al. | |
| 2016/0192017 A1 | 6/2016 | Tirpak | |
| 2016/0231885 A1 | 8/2016 | Lee et al. | |
| 2016/0249105 A1 | 8/2016 | Carney Landow | |
| 2016/0255379 A1 | 9/2016 | Langan et al. | |
| 2016/0277785 A1 | 9/2016 | Newman et al. | |
| 2016/0345070 A1 | 11/2016 | Beeson et al. | |
| 2016/0357305 A1 | 12/2016 | Wells et al. | |

(56) References Cited

U.S. PATENT DOCUMENTS

| | | |
|---|---|---|
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2016/0378283 A1 | 12/2016 | Cockcroft et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0070786 A1 | 3/2017 | Keene et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0185240 A1 | 6/2017 | Delrosario et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pirnack et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2017/0364274 A1 | 12/2017 | Hammons et al. |
| 2018/0011580 A1 | 1/2018 | Lebowitz et al. |
| 2018/0027279 A1 | 1/2018 | Templeman |
| 2018/0041814 A1 | 2/2018 | Christie et al. |
| 2018/0053094 A1 | 2/2018 | Patel et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293210 A1 | 10/2018 | Xue et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0367834 A1 | 12/2018 | Carpenter et al. |
| 2018/0367863 A1 | 12/2018 | Newman et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0324614 A1 | 10/2019 | Brillon et al. |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0034792 A1 | 1/2020 | Rogers et al. |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0145726 A1 | 5/2020 | Ciuca et al. |
| 2020/0213642 A1 | 7/2020 | Bartos et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0356160 A1 | 11/2020 | Kosugi et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0092489 A1 | 3/2021 | Dutta et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2021/0406995 A1 | 12/2021 | Peters et al. |
| 2022/0057984 A1 | 2/2022 | Yang et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz Delgado et al. |
| 2023/0096458 A1 | 3/2023 | Van Os et al. |
| 2023/0127228 A1 | 4/2023 | Clarke |
| 2023/0132595 A1 | 5/2023 | Van Os et al. |
| 2023/0300415 A1 | 9/2023 | Balsamo |
| 2023/0328327 A1 | 10/2023 | Cielak et al. |
| 2024/0037144 A1 | 2/2024 | Chen |
| 2024/0089553 A1 | 3/2024 | Payne |
| 2024/0126401 A1 | 4/2024 | Rajam et al. |
| 2024/0220195 A1 | 7/2024 | Christie et al. |
| 2024/0267583 A1 | 8/2024 | Domm et al. |
| 2024/0302952 A1 | 9/2024 | Wood et al. |
| 2024/0323473 A1 | 9/2024 | Newman et al. |
| 2024/0388761 A1 | 11/2024 | Christie et al. |
| 2024/0402899 A1 | 12/2024 | Sart et al. |
| 2024/0419736 A1 | 12/2024 | Van Os et al. |
| 2024/0422394 A1 | 12/2024 | Keighran et al. |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 1391765 A | 1/2003 |
| CN | 1985277 A | 6/2007 |
| CN | 1985327 A | 6/2007 |
| CN | 101160932 A | 4/2008 |
| CN | 101228570 A | 7/2008 |
| CN | 101317149 A | 12/2008 |

(56) References Cited

FOREIGN PATENT DOCUMENTS

| | | | |
|---|---|---|---|
| CN | 101370104 A | 2/2009 |
| CN | 101405679 A | 4/2009 |
| CN | 101436110 A | 5/2009 |
| CN | 101465993 A | 6/2009 |
| CN | 101529437 A | 9/2009 |
| CN | 101641662 A | 2/2010 |
| CN | 101699505 A | 4/2010 |
| CN | 101706704 A | 5/2010 |
| CN | 101719125 A | 6/2010 |
| CN | 101860447 A | 10/2010 |
| CN | 102098537 A | 6/2011 |
| CN | 102103460 A | 6/2011 |
| CN | 102187338 A | 9/2011 |
| CN | 102265586 A | 11/2011 |
| CN | 102325144 A | 1/2012 |
| CN | 102541419 A | 7/2012 |
| CN | 102819715 A | 12/2012 |
| CN | 102859484 A | 1/2013 |
| CN | 102880404 A | 1/2013 |
| CN | 102890615 A | 1/2013 |
| CN | 102939515 A | 2/2013 |
| CN | 102955653 A | 3/2013 |
| CN | 102981695 A | 3/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103562947 A | 2/2014 |
| CN | 103620531 A | 3/2014 |
| CN | 103620541 A | 3/2014 |
| CN | 103620639 A | 3/2014 |
| CN | 103686418 A | 3/2014 |
| CN | 103985045 A | 8/2014 |
| CN | 103999017 A | 8/2014 |
| CN | 104508618 A | 4/2015 |
| CN | 104822098 A | 8/2015 |
| CN | 105190590 A | 12/2015 |
| CN | 105247526 A | 1/2016 |
| CN | 105264479 A | 1/2016 |
| CN | 105303372 A | 2/2016 |
| CN | 105308634 A | 2/2016 |
| CN | 105308923 A | 2/2016 |
| CN | 105336350 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| CN | 107710131 A | 2/2018 |
| CN | 108292190 A | 7/2018 |
| CN | 109313491 A | 2/2019 |
| CN | 109313651 A | 2/2019 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2679017 A2 | 1/2014 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-27381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-124465 A | 5/2007 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-206957 A | 9/2009 |
| JP | 2009-260947 A | 11/2009 |
| JP | 2009-276557 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-76588 A | 4/2011 |
| JP | 2011-512701 A | 4/2011 |
| JP | 2011-123750 A | 6/2011 |
| JP | 2011-154455 A | 8/2011 |
| JP | 2011-182146 A | 9/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-12021 A | 1/2013 |
| JP | 2013-223150 A | 10/2013 |
| JP | 2013-235523 A | 11/2013 |
| JP | 2013-242610 A | 12/2013 |
| JP | 2014-81740 A | 5/2014 |
| JP | 2014-102660 A | 6/2014 |
| JP | 2015-50655 A | 3/2015 |
| JP | 2015-70404 A | 4/2015 |
| KR | 10-2001-0005939 A | 1/2001 |
| KR | 10-2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0014712 A | 2/2013 |
| KR | 10-2013-0058034 A | 6/2013 |
| KR | 10-2013-0137969 A | 12/2013 |
| KR | 10-2014-0041939 A | 4/2014 |
| KR | 10-2019-0033658 A | 3/2019 |
| KR | 10-2022-0041231 A | 3/2022 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2004/063862 A2 | 7/2004 |
| WO | 2004/102285 A2 | 11/2004 |
| WO | 2005/050652 A1 | 6/2005 |
| WO | 2005/109345 A1 | 11/2005 |
| WO | 2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/039786 A1 | 4/2009 |
| WO | 2009/148781 A1 | 12/2009 |
| WO | 2010/022570 A1 | 3/2010 |
| WO | 2010/025168 A1 | 3/2010 |
| WO | 2010/118690 A1 | 10/2010 |
| WO | 2011/095693 A1 | 8/2011 |
| WO | 2011/158475 A1 | 12/2011 |
| WO | 2012/012446 A2 | 1/2012 |
| WO | 2012/061760 A2 | 5/2012 |
| WO | 2012/088665 A1 | 7/2012 |

(56) References Cited

FOREIGN PATENT DOCUMENTS

| | | |
|---|---|---|
| WO | 2013/000741 A1 | 1/2013 |
| WO | 2013/149128 A2 | 10/2013 |
| WO | 2013/169849 A2 | 11/2013 |
| WO | 2013/169877 A2 | 11/2013 |
| WO | 2013/187370 A1 | 12/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/030437 A1 | 3/2016 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS

Applicant Initiated Interview Summary received for U.S. Appl. No. 15/167,801, mailed on Apr. 23, 2018, 3 pages.
Applicant Initiated Interview Summary received for U.S. Appl. No. 15/167,801, mailed on Jul. 29, 2019, 3 pages.
Applicant Initiated Interview Summary received for U.S. Appl. No. 17/210,352, mailed on Feb. 28, 2022, 4 pages.
Corrected Notice of Allowability received for U.S. Appl. No. 16/108,519, mailed on Dec. 22, 2021, 3 pages.
Corrected Notice of Allowance received for U.S. Appl. No. 14/242,575, mailed on Dec. 15, 2016, 7 pages.
Corrected Notice of Allowance received for U.S. Appl. No. 14/242,575, mailed on Nov. 16, 2016, 7 pages.
Corrected Notice of Allowance received for U.S. Appl. No. 14/255,664, mailed on Aug. 29, 2017, 4 pages.
Corrected Notice of Allowance received for U.S. Appl. No. 14/267,671, mailed on Nov. 29, 2018, 3 pages.
Corrected Notice of Allowance received for U.S. Appl. No. 14/749,288, mailed on Sep. 21, 2017, 5 pages.
Corrected Notice of Allowance received for U.S. Appl. No. 15/276,633, mailed on Sep. 10, 2019, 7 pages.
Corrected Notice of Allowance received for U.S. Appl. No. 15/695,880, mailed on Jun. 11, 2018, 6 pages.
Corrected Notice of Allowance received for U.S. Appl. No. 15/714,904, mailed on Sep. 7, 2018, 5 pages.
Corrected Notice of Allowance received for U.S. Appl. No. 15/876,715, mailed on Apr. 11, 2022, 4 Pages.
Corrected Notice of Allowance received for U.S. Appl. No. 15/876,715, mailed on Apr. 19, 2022, 4 Pages.
Corrected Notice of Allowance received for U.S. Appl. No. 15/876,715, mailed on Oct. 20, 2021, 2 pages.
Corrected Notice of Allowance received for U.S. Appl. No. 16/010,280, mailed on Aug. 6, 2019, 2 pages.
Corrected Notice of Allowance received for U.S. Appl. No. 16/036,810, mailed on Nov. 19, 2018, 6 pages.
Corrected Notice of Allowance received for U.S. Appl. No. 16/142,635, mailed on Mar. 10, 2022, 2 Pages.
Corrected Notice of Allowance received for U.S. Appl. No. 16/233,990, mailed on Mar. 8, 2022, 4 pages.
Corrected Notice of Allowance received for U.S. Appl. No. 16/233,990, mailed on Oct. 20, 2022, 2 pages.
Corrected Notice of Allowance received for U.S. Appl. No. 16/827,931, mailed on Dec. 6, 2021, 4 pages.
Corrected Notice of Allowance received for U.S. Appl. No. 16/872,274, mailed on Aug. 12, 2022, 5 pages.
Corrected Notice of Allowance received for U.S. Appl. No. 16/888,453, mailed on Jul. 26, 2023, 5 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Corrected Notice of Allowance received for U.S. Appl. No. 17/065,387, mailed on Mar. 30, 2022, 2 Pages.
Corrected Notice of Allowance received for U.S. Appl. No. 17/210,352, mailed on Sep. 20, 2023, 5 pages.
Corrected Notice of Allowance received for U.S. Appl. No. 17/367,227, mailed on Jul. 27, 2023, 2 pages.
Cover Flow, Wikipedia, Available online at: <https://en.wikipedia.org/w/index.php?title=Cover_Flow&oldid=879285208>, Jan. 20, 2019, 3 pages.
Examiner Initiated Interview Summary received for U.S. Appl. No. 15/390,377, mailed on Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 17813728.7, mailed on Feb. 11, 2019, 8 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Extended European Search Report received for European Patent Application No. 22167405.4, mailed on Jul. 4, 2022, 11 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/390,377, mailed on Nov. 9, 2017, 18 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/719,404, mailed on Mar. 30, 2021, 19 pages.

(56) References Cited

OTHER PUBLICATIONS

Final Office Action received for U.S. Appl. No. 15/876,715, mailed on Nov. 5, 2018, 15 pages.
Final Office Action received for U.S. Appl. No. 16/108,519, mailed on Dec. 12, 2019, 10 pages.
Final Office Action received for U.S. Appl. No. 16/108,519, mailed on Nov. 25, 2020, 12 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/584,790, mailed on May 27, 2020, 27 pages.
Final Office Action received for U.S. Appl. No. 16/682,443, mailed on Mar. 9, 2021, 9 pages.
Final Office Action received for U.S. Appl. No. 16/697,090, mailed on Dec. 14, 2022, 28 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,910, mailed on Mar. 15, 2023, 18 pages.
Final Office Action received for U.S. Appl. No. 16/827,918, mailed on Jul. 8, 2021, 31 pages.
Final Office Action received for U.S. Appl. No. 16/827,926, mailed on Apr. 18, 2023, 32 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Feb. 13, 2023, 27 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/133,550, mailed on Feb. 15, 2023, 22 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
Final Office Action received for U.S. Appl. No. 17/379,785, mailed on Oct. 28, 2022, 14 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2015/037030, mailed on Dec. 10, 2015, 6 pages.
International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.
International Search Report received for PCT Patent Application No. PCT/US2017/031764, mailed on Aug. 7, 2017, 2 pages.
International Search Report received for PCT Patent Application No. PCT/US2017/058132, mailed on Mar. 27, 2018, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/208,099, mailed on Jun. 25, 2015, 12 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Non-Final Office Action received for U.S. Appl. No. 14/262,435, mailed on Feb. 22, 2016, 22 pages.
Non-Final Office Action received for U.S. Appl. No. 14/267,671, mailed on Apr. 1, 2016, 16 pages.
Non-Final Office Action received for U.S. Appl. No. 14/267,671, mailed on Dec. 1, 2017, 18 pages.
Non-Final Office Action received for U.S. Appl. No. 14/267,671, mailed on May 26, 2017, 18 pages.
Non-Final Office Action received for U.S. Appl. No. 14/271,179, mailed on May 29, 2015, 25 pages.
Non-Final Office Action received for U.S. Appl. No. 14/271,179, mailed on Oct. 5, 2018, 15 pages.
Non-Final Office Action received for U.S. Appl. No. 14/271,179, mailed on Sep. 21, 2017, 12 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 14/746,620, mailed on Jan. 11, 2017, 16 pages.
Non-Final Office Action received for U.S. Appl. No. 14/746,662, mailed on Aug. 9, 2016, 8 pages.
Non-Final Office Action received for U.S. Appl. No. 14/749,288, mailed on Oct. 12, 2016, 11 pages.
Non-Final Office Action received for U.S. Appl. No. 15/167,801 mailed on Mar. 24, 2017, 12 pages.

(56) References Cited

OTHER PUBLICATIONS

Non-Final Office Action received for U.S. Appl. No. 15/167,801, mailed on Aug. 30, 2018, 15 pages.
Non-Final Office Action received for U.S. Appl. No. 15/167,801, mailed on Dec. 11, 2020, 18 pages.
Non-Final Office Action received for U.S. Appl. No. 15/167,801, mailed on Feb. 8, 2023, 23 pages.
Non-Final Office Action received for U.S. Appl. No. 15/167,801, mailed on May 18, 2022, 17 Pages.
Non-Final Office Action received for U.S. Appl. No. 15/167,801, mailed on Sep. 3, 2021, 17 pages.
Non-Final Office Action received for U.S. Appl. No. 15/167,801, mailed on Sep. 26, 2019, 18 pages.
Non-Final Office Action received for U.S. Appl. No. 15/224,370, mailed on Oct. 3, 2017, 14 pages.
Non-Final Office Action received for U.S. Appl. No. 15/235,000, mailed on Jul. 14, 2017, 31 pages.
Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/272,397, mailed on Nov. 22, 2016, 20 pages.
Non-Final Office Action received for U.S. Appl. No. 15/276,633, mailed on Feb. 23, 2018, 12 pages.
Non-Final Office Action received for U.S. Appl. No. 15/276,633, mailed on Mar. 5, 2019, 16 pages.
Non-Final Office Action received for U.S. Appl. No. 15/276,633, mailed on Nov. 17, 2016, 12 pages.
Non-Final Office Action received for U.S. Appl. No. 15/390,377, mailed on Apr. 5, 2017, 17 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/719,404, mailed on May 10, 2023, 14 pages.
Non-Final Office Action received for U.S. Appl. No. 15/719,404, mailed on Nov. 26, 2021, 19 pages.
Non-Final Office Action received for U.S. Appl. No. 15/719,404, mailed on Oct. 16, 2020, 18 pages.
Non-Final Office Action received for U.S. Appl. No. 15/798,092, mailed on Dec. 20, 2017, 20 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 15/990,327, mailed on Jul. 31, 2018, 8 pages.
Non-Final Office Action received for U.S. Appl. No. 16/010,280, mailed on Mar. 7, 2019, 5 pages.
Non-Final Office Action received for U.S. Appl. No. 16/108,519, mailed on Apr. 5, 2021, 13 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Aug. 25, 2020, 22 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 9, 2020, 10 pages.
Non-Final Office Action received for U.S. Appl. No. 16/136,005, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/142,635, mailed on Jun. 11, 2021, 23 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.
Non-Final Office Action received for U.S. Appl. No. 16/175,565, mailed on Feb. 17, 2023, 33 pages.
Non-Final Office Action received for U.S. Appl. No. 16/175,565, mailed on Sep. 20, 2021, 33 pages.
Non-Final Office Action received for U.S. Appl. No. 16/233,990, mailed on Jul. 9, 2021, 18 pages.
Non-Final Office Action received for U.S. Appl. No. 16/233,990, mailed on Jun. 18, 2020, 17 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 23, 2020, 30 pages.
Non-Final Office Action received for U.S. Appl. No. 16/584,790, mailed on Dec. 26, 2019, 24 pages.
Non-Final Office Action received for U.S. Appl. No. 16/584,790, mailed on Feb. 1, 2022, 33 pages.
Non-Final Office Action received for U.S. Appl. No. 16/682,443, mailed on Sep. 23, 2020, 10 pages.
Non-Final Office Action received for U.S. Appl. No. 16/697,090, mailed on Aug. 3, 2021, 16 pages.
Non-Final Office Action received for U.S. Appl. No. 16/697,090, mailed on Jul. 6, 2020, 14 pages.
Non-Final Office Action received for U.S. Appl. No. 16/697,090, mailed on Jul. 7, 2022, 25 pages.
Non-Final Office Action received for U.S. Appl. No. 16/827,910, mailed on Jun. 17, 2021, 16 pages.
Non-Final Office Action received for U.S. Appl. No. 16/827,910, mailed on Sep. 14, 2022, 18 pages.
Non-Final Office Action received for U.S. Appl. No. 16/827,918, mailed on Dec. 10, 2020, 28 pages.
Non-Final Office Action received for U.S. Appl. No. 16/827,926, mailed on Apr. 25, 2022, 27 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/888,478, mailed on May 2, 2022, 29 pages.
Non-Final Office Action received for U.S. Appl. No. 16/945,724, mailed on Jul. 19, 2021, 8 pages.
Non-Final Office Action received for U.S. Appl. No. 17/000,112, mailed on Dec. 7, 2021, 15 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Jun. 8, 2021, 23 pages.
Non-Final Office Action received for U.S. Appl. No. 17/133,550, mailed on Sep. 9, 2022, 23 pages.

(56) References Cited

OTHER PUBLICATIONS

Non-Final Office Action received for U.S. Appl. No. 17/210,352, mailed on Oct. 18, 2021, 18 pages.
Non-Final Office Action received for U.S. Appl. No. 17/353,527, mailed on Dec. 8, 2022, 17 pages.
Non-Final Office Action received for U.S. Appl. No. 17/353,527, mailed on Oct. 5, 2021, 14 pages.
Non-Final Office Action received for U.S. Appl. No. 17/379,785, mailed on Mar. 9, 2023, 14 pages.
Non-Final Office Action received for U.S. Appl. No. 17/379,785, mailed on Mar. 30, 2022, 18 Pages.
Non-Final Office Action received for U.S. Appl. No. 17/457,901, mailed on Apr. 28, 2022, 24 pages.
Non-Final Office Action received for U.S. Appl. No. 17/586,625, mailed on Sep. 1, 2022, 13 pages.
Non-Final Office Action received for U.S. Appl. No. 17/651,731, mailed on Apr. 25, 2023, 9 pages.
Non-Final Office Action received for U.S. Appl. No. 17/656,610, mailed on Feb. 6, 2023, 10 pages.
Non-Final Office Action received for U.S. Appl. No. 17/656,610, mailed on Jul. 26, 2023, 10 pages.
Non-Final Office Action received for U.S. Appl. No. 17/657,913, mailed on Jul. 21, 2023, 16 pages.
Non-Final Office Action received for U.S. Appl. No. 17/660,622, mailed on Dec. 20, 2022, 17 pages.
Non-Final Office Action received for U.S. Appl. No. 17/937,410, mailed on Mar. 2, 2023, 15 pages.
Non-Final Office Action received for U.S. Appl. No. 17/937,704, mailed on Mar. 30, 2023, 18 pages.
Non-Final Office Action received for U.S. Appl. No. 18/060,902, mailed on Mar. 10, 2023, 8 pages.
Non-Final Office Action received for U.S. Appl. No. 16/175,565, mailed on Mar. 4, 2020, 36 pages.
Notice of Allowability received for U.S. Appl. No. 17/457,901, mailed on Mar. 8, 2023, 9 pages.
Notice of Allowance received for U.S. Appl. No. 14/208,099, mailed on Feb. 3, 2016, 10 pages.
Notice of Allowance received for U.S. Appl. No. 14/242,575, mailed on Oct. 27, 2016, 11 pages.
Notice of Allowance received for U.S. Appl. No. 14/255,664, mailed on May 5, 2017, 7 pages.
Notice of Allowance received for U.S. Appl. No. 14/262,435, mailed on Aug. 16, 2016, 6 pages.
Notice of Allowance received for U.S. Appl. No. 14/267,671, mailed on Sep. 19, 2018, 8 pages.
Notice of Allowance received for U.S. Appl. No. 14/746,095, mailed on Dec. 31, 2019, 8 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/272,397, mailed on Oct. 18, 2017, 8 pages.
Notice of Allowance received for U.S. Appl. No. 15/276,633, mailed on Aug. 26, 2019, 8 pages.
Notice of Allowance received for U.S. Appl. No. 15/390,377, mailed on Jul. 2, 2018, 9 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/714,904, mailed on May 22, 2018, 8 pages.
Notice of Allowance received for U.S. Appl. No. 15/719,404, mailed on Jul. 13, 2022, 8 pages.
Notice of Allowance received for U.S. Appl. No. 15/719,404, mailed on Nov. 9, 2022, 7 pages.
Notice of Allowance received for U.S. Appl. No. 15/798,092, mailed on Jun. 7, 2018, 9 pages.
Notice of Allowance received for U.S. Appl. No. 15/798,092, mailed on Oct. 9, 2018, 5 pages.
Notice of Allowance received for U.S. Appl. No. 15/833,618, mailed on Mar. 14, 2018, 9 pages.
Notice of Allowance received for U.S. Appl. No. 15/876,715, mailed on Apr. 4, 2022, 7 pages.
Notice of Allowance received for U.S. Appl. No. 15/876,715, mailed on Aug. 3, 2022, 7 pages.
Notice of Allowance received for U.S. Appl. No. 15/876,715, mailed on Oct. 14, 2021, 7 pages.
Notice of Allowance received for U.S. Appl. No. 15/990,327, mailed on Jan. 11, 2019, 7 pages.
Notice of Allowance received for U.S. Appl. No. 16/010,280, mailed on Jul. 29, 2019, 7 pages.
Notice of Allowance received for U.S. Appl. No. 16/036,810, mailed on Oct. 31, 2018, 9 pages.
Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/144,077, mailed on May 8, 2020, 15 pages.
Notice of Allowance received for U.S. Appl. No. 16/233,990, mailed on Feb. 22, 2022, 8 pages.
Notice of Allowance received for U.S. Appl. No. 16/233,990, mailed on Jan. 31, 2023, 5 pages.
Notice of Allowance received for U.S. Appl. No. 16/233,990, mailed on May 26, 2022, 5 pages.
Notice of Allowance received for U.S. Appl. No. 16/233,990, mailed on Oct. 5, 2022, 5 pages.
Notice of Allowance received for U.S. Appl. No. 16/392,467, mailed on Mar. 23, 2020, 9 pages.
Notice of Allowance received for U.S. Appl. No. 16/584,790, mailed on Feb. 3, 2023, 9 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/827,918, mailed on Feb. 7, 2022, 9 pages.
Notice of Allowance received for U.S. Appl. No. 16/827,918, mailed on Jun. 8, 2022, 9 Pages.
Notice of Allowance received for U.S. Appl. No. 16/827,926, mailed on Nov. 1, 2021, 35 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.

(56) References Cited

OTHER PUBLICATIONS

Notice of Allowance received for U.S. Appl. No. 16/827,942, mailed on Oct. 5, 2020, 10 pages.
Notice of Allowance received for U.S. Appl. No. 16/865,172, mailed on Apr. 13, 2022, 8 pages.
Notice of Allowance received for U.S. Appl. No. 16/865,172, mailed on Aug. 25, 2022, 8 pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/888,453, mailed on Jun. 21, 2023, 7 pages.
Notice of Allowance received for U.S. Appl. No. 16/888,453, mailed on Mar. 1, 2023, 8 pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/065,387, mailed on Dec. 1, 2021, 10 pages.
Notice of Allowance received for U.S. Appl. No. 17/210,352, mailed on Dec. 5, 2022, 9 pages.
Notice of Allowance received for U.S. Appl. No. 17/210,352, mailed on Mar. 16, 2023, 7 pages.
Notice of Allowance received for U.S. Appl. No. 17/353,527, mailed on Jul. 21, 2023, 7 pages.
Notice of Allowance received for U.S. Appl. No. 17/367,227, mailed on Mar. 23, 2023, 12 pages.
Notice of Allowance received for U.S. Appl. No. 17/457,901, mailed on Nov. 16, 2022, 9 pages.
Notice of Allowance received for U.S. Appl. No. 17/654,578, mailed on Feb. 15, 2023, 8 pages.
Notice of Allowance received for U.S. Appl. No. 17/654,578, mailed on Jun. 13, 2023, 7 pages.
Notice of Allowance received for U.S. Appl. No. 17/654,578, mailed on Oct. 25, 2022, 8 pages.
Patent Board Decision received for U.S. Appl. No. 15/876,715, mailed on Aug. 3, 2021, 8 pages.
Restriction Requirement received for U.S. Appl. No. 14/208,099, mailed on Feb. 24, 2015, 5 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201780066823.6, mailed on Nov. 1, 2022, 4 pages (2 pages of English Translation and 2 pages of Official Copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201910469185.3, mailed on Feb. 23, 2021, 6 pages (3 page of English Translation and 3 page of Official Copy).
Search Report received for Chinese Patent Application No. 201910587972.8, mailed on Jan. 4, 2022, 4 pages (2 pages of English Translation and 2 pages of Official Copy).
Search Report received for Chinese Patent Application No. 201911313480.6, mailed on Jan. 20, 2023, 4 pages (2 pages of English Translation and 2 pages of Official Copy).
Search Report received for Chinese Patent Application No. 201911313496.7, mailed on Jan. 20, 2023, 4 pages (2 pages of English Translation and 2 pages of Official Copy).
Search Report received for Chinese Patent Application No. 201911313497.1, mailed on Apr. 11, 2023, 5 pages (2 pages of English Translation and 3 pages of Official Copy).
Search Report received for Chinese Patent Application No. 201911313497.1, mailed on Dec. 14, 2022, 3 pages (1 page of English Translation and 2 pages of Official Copy).
Search Report received for Chinese Patent Application No. 202010011436.6, mailed on Dec. 15, 2022, 9 pages (4 pages of English Translation and 5 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201670582, mailed on Feb. 9, 2017, 1 page.
Search Report received for Danish Patent Application No. PA 201870354, mailed on Sep. 26, 2018, 4 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for European Patent Application No. 20718506.7, mailed on Mar. 21, 2023, 2 pages.
Search Report received for Taiwanese Patent Application No. 104120369, mailed on Aug. 8, 2016, 2 Pages (1 page of official copy & 1 page of English translation).
Search Report received for Taiwanese Patent Application No. 104120385, mailed on Nov. 25, 2016, 2 pages (1 page of official copy & 1 page of English translation).
Supplemental Notice of Allowability received for U.S. Appl. No. 16/827,942, mailed on Nov. 4, 2020, 3 pages.
Supplemental Notice of Allowance received for U.S. Appl. No. 15/798,092, mailed on Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, [Retrieved May 4, 2020], 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, [Retrieved Aug. 5, 2019], May 1, 2016, pp. 1-12.
Anonymous, "Video Progress Bar—YouTube Help", Retrieved from the Internet: <URL:https://web.archive.org/web/20190317001501/ https://support.google.com/youtube/answer/7174115?hl=en>, [retrieved on Mar. 22, 2023], Mar. 17, 2019, 2 pages.
Apple, "The control is all yours", Available online at : <https://www.apple.com.cn/privacy/control/>, [Retrieved Dec. 29, 2022], Nov. 30, 2022, 12 pages.
Beer et al., "The Odds Of Running A Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages.

(56) References Cited

OTHER PUBLICATIONS

Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Budhraja et al., "Probability Based Playlist Generation Based on Music Similarity and User Customization", National Conference On Computing And Communication Systems, 2012, 5 pages.
Cheng Luo, "The Designing of Dynamic Play-list Based on Flash Streaming Media Technology", Computer and Telecommunication, 2008, 3 pages.
Cheredar Tom, "Verizon's Viewdini Lets You Watch Netflix, Comcast, & Hulu Videos from a Single App", Available online at: <venturebeat.com>, [Retrieved Jun. 10, 2021], May 22, 2012, 6 pages.
Drews et al., "Virtual Jukebox—Reviving a Classic", Proceedings of the 35th Hawaii International Conference on System Sciences, 2022, 7 pages.
episodecalendar.com, "Keep track of your favorite TV shows!—TV Episode Calendar", Available Online At: <https://web.archive.org/web/20140517060612/https://episodecalendar.com/>, [Retrieved Oct. 18, 2017], May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Jin et al., "Pricing Sponsored Content in Wireless Networks with Multiple Content Providers", The Fourth IEEE Workshop on Smart Data Pricing 2015, 2015, pp. 668-673.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, [Retrieved Jun. 10, 2021], Aug. 3, 2015, 1 page.
Kimbler Kristofer, "App Store Strategies for Service Providers", 2010 4th International Conference on Intelligence in Next Generation Networks, Nov. 18, 2010, 5 pages.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Liu Chang, "Functions and Design of Multi-Screen Playing System in TV Variety Studio", Modern TV Technology, 2013, 5 pages.
Meng et al., "Role Authorization Based Web Service Access Control Model", Journal of Lanzhou University (Natural Science Edition), vol. 42, No. 2, 2007, pp. 84-88.
Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.
Panzarino Matthew, "Apple Announces Voice Activated Siri Assistant Feature For iOS 5, Integrates Wolfram Alpha And Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Tinari George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Wang et al., "Authorization Management Mechanism of Web Application System", Network and Information Technology, vol. 25, No. 11, 2006, 3 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Zhang et al., "Music Playlist Prediction Via Detecting Song Moods", IEEE China Summit and International Conference on Signal and Information Processing, 2013, pp. 174-178.
Advisory Action received for U.S. Appl. No. 14/208,963, mailed on Feb. 17, 2017, 3 pages.
Advisory Action received for U.S. Appl. No. 18/060,902, mailed on Nov. 13, 2023, 2 pages.
Corrected Notice of Allowance received for U.S. Appl. No. 16/888,478, mailed on Oct. 31, 2023, 6 pages.
Decision on Appeal received for U.S. Appl. No. 14/208,963, mailed on Dec. 22, 2021, 12 pages.
Decision on Appeal received for U.S. Appl. No. 15/943,316, mailed on Jan. 11, 2022, 19 pages.
Examiner's Answer to Appeal Brief received for U.S. Appl. No. 14/208,963, mailed on Jun. 24, 2021, 20 pages.
Examiner's Answer to Appeal Brief received for U.S. Appl. No. 15/943,316, mailed on Jun. 16, 2021, 9 pages.
Examiner's Answer to Appeal Brief received for U.S. Appl. No. 16/697,090, mailed on Oct. 26, 2023, 10 pages.
Final Office Action received for U.S. Appl. No. 14/208,963, mailed on Aug. 13, 2015, 16 pages.
Final Office Action received for U.S. Appl. No. 14/208,963, mailed on Aug. 18, 2016, 17 pages.
Final Office Action received for U.S. Appl. No. 15/167,801, mailed on Sep. 19, 2023, 19 pages.
Final Office Action received for U.S. Appl. No. 15/943,316, mailed on Apr. 27, 2020, 19 pages.
Final Office Action received for U.S. Appl. No. 15/943,316, mailed on Mar. 6, 2019, 8 pages.
Final Office Action received for U.S. Appl. No. 17/379,785, mailed on Aug. 23, 2023, 13 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Final Office Action received for U.S. Appl. No. 18/060,902, mailed on Aug. 25, 2023, 8 pages.
Non-Final Office Action received for U.S. Appl. No. 14/208,963 mailed on Nov. 3, 2014, 17 pages.
Non-Final Office Action received for U.S. Appl. No. 14/208,963, mailed on Apr. 21, 2017, 19 pages.
Non-Final Office Action received for U.S. Appl. No. 14/208,963, mailed on Jan. 29, 2016, 17 pages.
Non-Final Office Action received for U.S. Appl. No. 14/208,963, mailed on Jun. 30, 2020, 20 pages.
Non-Final Office Action received for U.S. Appl. No. 15/943,316, mailed on Aug. 20, 2019, 11 pages.
Non-Final Office Action received for U.S. Appl. No. 15/943,316, mailed on Jul. 23, 2018, 9 pages.
Non-Final Office Action received for U.S. Appl. No. 18/060,902, mailed on Dec. 1, 2023, 9 pages.
Non-Final Office Action received for U.S. Appl. No. 18/146,336, mailed on Aug. 3, 2023, 23 pages.
Notice of Allowance received for U.S. Appl. No. 16/827,910, mailed on Aug. 3, 2023, 21 pages.
Notice of Allowance received for U.S. Appl. No. 16/827,926, mailed on Sep. 13, 2023, 9 pages.

(56) References Cited

OTHER PUBLICATIONS

Notice of Allowance received for U.S. Appl. No. 16/888,478, mailed on Aug. 2, 2023, 9 pages.
Notice of Allowance received for U.S. Appl. No. 17/353,527, mailed on Oct. 4, 2023, 7 pages.
Notice of Allowance received for U.S. Appl. No. 17/586,625, mailed on Oct. 26, 2023, 7 pages.
Notice of Allowance received for U.S. Appl. No. 17/651,731, mailed on Oct. 3, 2023, 5 pages.
Search Report received for Chinese Patent Application No. 201811143102.3, mailed on Nov. 2, 2023, 5 pages (3 pages of English Translation and 2 pages of Official Copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010662994.9, mailed on Sep. 28, 2023, 3 pages (1 page of English Translation and 2 pages of Official Copy).
Search Report received for Chinese Patent Application No. 202110201931.8, mailed on Oct. 16, 2023, 3 pages (1 page of English Translation and 2 pages of Official Copy).
Search Report received for Chinese Patent Application No. 202210799020.4, mailed on Jul. 27, 2023, 5 pages (1 page of English Translation and 4 pages of Official Copy).
Cai, Chongshan, "Analysis of Copyright Infringement Problems of Video Aggregation App", China Copyright, vol. 02, [retrieved on Oct. 6, 2023], Available online at: <http://www.cqvip.com/qk/81889a/2015002/907166815048495348504485048.html>, Apr. 15, 2015, 2 pages (1 page English Translation and 1 page Official Copy).
Chen et al., "What a Juke! A Collaborative Music Sharing System", IEEE, 2012, 6 pages.
Cunningham et al., "An Ethnographic Study of Music Information Seeking: Implications for the Design of a Music Digital Library", IEEE, 2003, 13 pages.
Corrected Notice of Allowability received for U.S. Appl. No. 17/656,610, mailed on Dec. 19, 2024, 2 pages.
Applicant Initiated Interview Summary received for U.S. Appl. No. 17/656,610, mailed on Apr. 10, 2024, 2 pages.
Corrected Notice of Allowability received for U.S. Appl. No. 18/060,902, mailed on Sep. 5, 2024, 4 pages.
Corrected Notice of Allowability received for U.S. Appl. No. 15/719,404, mailed on Mar. 22, 2024, 2 pages.
Corrected Notice of Allowability received for U.S. Appl. No. 17/586,625, mailed on Feb. 20, 2024, 2 pages.
Corrected Notice of Allowability received for U.S. Appl. No. 17/657,913, mailed on Sep. 16, 2024, 2 pages.
Corrected Notice of Allowability received for U.S. Appl. No. 17/657,913, mailed on Sep. 26, 2024, 2 pages.
Corrected Notice of Allowability received for U.S. Appl. No. 17/937,704, mailed on Jul. 31, 2024, 8 pages.
European Search Report received for European Patent Application No. 20718505.9, mailed on Sep. 27, 2024, 5 pages.
Examiner's Answer to Appeal Brief received for U.S. Appl. No. 16/175,565, mailed on Dec. 15, 2023, 27 pages.
Examiner's Answer to Appeal Brief received for U.S. Appl. No. 17/133,550, mailed on Sep. 23, 2024, 26 pages.
Extended European Search Report received for European Patent Application No. 24152097.2, mailed on Jul. 23, 2024, 9 pages.
Final Office Action received for U.S. Appl. No. 17/379,785, mailed on Aug. 16, 2024, 14 pages.
Final Office Action received for U.S. Appl. No. 17/656,610, mailed on Jan. 16, 2024, 12 pages.
Final Office Action received for U.S. Appl. No. 18/146,336, mailed on Feb. 23, 2024, 23 pages.
Non-Final Office Action received for U.S. Appl. No. 17/133,550, mailed on Dec. 18, 2023, 25 pages.
Non-Final Office Action received for U.S. Appl. No. 17/379,785, mailed on Feb. 15, 2024, 14 pages.
Non-Final Office Action received for U.S. Appl. No. 17/656,610, mailed on Apr. 30, 2024, 12 pages.
Non-Final Office Action received for U.S. Appl. No. 17/657,913, mailed on Jan. 11, 2024, 20 pages.
Non-Final Office Action received for U.S. Appl. No. 17/930,703, mailed on May 16, 2024, 36 pages.
Non-Final Office Action received for U.S. Appl. No. 17/937,410, mailed on Feb. 29, 2024, 16 pages.
Non-Final Office Action received for U.S. Appl. No. 17/937,704, mailed on Feb. 1, 2024, 21 pages.
Non-Final Office Action received for U.S. Appl. No. 18/168,490, mailed on Jun. 27, 2024, 19 pages.
Non-Final Office Action received for U.S. Appl. No. 18/336,569, mailed on Oct. 23, 2024, 22 pages.
Non-Final Office Action received for U.S. Appl. No. 18/391,448, mailed on Sep. 24, 2024, 12 pages.
Non-Final Office Action received for U.S. Appl. No. 18/602,342 mailed on Sep. 24, 2024, 19 pages.
Notice of Allowance received for U.S. Appl. No. 17/656,610, mailed on Sep. 11, 2024, 7 pages.
Notice of Allowance received for U.S. Appl. No. 17/657,913, mailed on Aug. 30, 2024, 7 pages.
Notice of Allowance received for U.S. Appl. No. 17/660,622, mailed on Aug. 22, 2024, 9 pages.
Notice of Allowance received for U.S. Appl. No. 18/168,490, mailed on Sep. 18, 2024, 10 pages.
Notice of Allowance received for U.S. Appl. No. 15/719,404, mailed on Dec. 8, 2023, 10 pages.
Notice of Allowance received for U.S. Appl. No. 16/175,565, mailed on Oct. 24, 2024, 5 pages.
Notice of Allowance received for U.S. Appl. No. 16/827,910, mailed on Dec. 13, 2023, 19 pages.
Notice of Allowance received for U.S. Appl. No. 16/827,926, mailed on Feb. 2, 2024, 8 pages.
Notice of Allowance received for U.S. Appl. No. 17/651,731, mailed on Jan. 25, 2024, 5 pages.
Notice of Allowance received for U.S. Appl. No. 17/651,731, mailed on Jul. 10, 2024, 5 pages.
Notice of Allowance received for U.S. Appl. No. 17/660,622, mailed on Jan. 24, 2024, 11 pages.
Notice of Allowance received for U.S. Appl. No. 17/937,410, mailed on Sep. 26, 2024, 8 pages.
Notice of Allowance received for U.S. Appl. No. 17/937,704, mailed on Apr. 25, 2024, 12 pages.
Notice of Allowance received for U.S. Appl. No. 18/060,902, mailed on May 21, 2024, 8 pages.
Notice of Allowance received for U.S. Appl. No. 18/487,837, mailed on May 30, 2024, 8 pages.
Notice of Allowance received for U.S. Appl. No. 18/503,515, mailed on Jun. 13, 2024, 8 pages.
Notice of Allowance received for U.S. Appl. No. 18/503,515, mailed on Oct. 1, 2024, 8 pages.
Notice of Allowance received for U.S. Appl. No. 18/518,365, mailed on Jul. 3, 2024, 8 pages.
Patent Board Decision received for U.S. Appl. No. 16/175,565, mailed on Jul. 31, 2024, 19 pages.
Patent Board Decision received for U.S. Appl. No. 16/697,090, mailed on Jul. 26, 2024, 33 pages.
Search Report received for Chinese Patent Application No. 202080040260.5, mailed on Apr. 4, 2024, 8 pages (4 pages of English Translation and 4 pages of Official Copy).
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Search Report received for Chinese Patent Application No. 202210608296.X, mailed on Aug. 15, 2024, 4 pages (1 page of English Translation and 3 pages of Official Copy).

(56) References Cited

OTHER PUBLICATIONS

Usainbolt.com, Available online at: <https://usainbolt.com/>; <https://web.archive.org>, Archived on Mar. 15, 2015 in Wayback Machine, 2015, 4 pages.

Kim et al., "Towards Optimal Navigation Through Video Content on Interactive TV", Interacting with Computers, vol. 18, No. 4, Mar. 3, 2006, pp. 723-746.

Matejka et al., "Swifter: Improved Online Video Scrubbing", Proceedings of the SIGCHI Conference on Human Factors in Computing Systems, Apr. 27-May 2, 2013, 10 pages.

Schmidt Alexander, "Graphical User Interface for Video on Demand Navigation from an IPTV Set Top Box", Jun. 16, 2009, 52 pages.

Tech Life Unity, "How to Use Netflix | Netflix Guide Part 2", Available online at: <https://www.youtube.com/watch?v=Hg4IC_BIHss> [Retrieved Sep. 16, 2024], Aug. 19, 2017, 2 pages.

Final Office Action received for U.S. Appl. No. 17/930,703, mailed on Nov. 6, 2024, 39 pages.

Notice of Allowance received for U.S. Appl. No. 18/518,365, mailed on Nov. 6, 2024, 8 pages.

Notice of Allowance received for U.S. Appl. No. 18/395,268, mailed on Dec. 2, 2024, 8 pages.

Anonymous, "YouTube(TM) On Hover :: add0n.com", Retrieved from the Internet: <URL: https://web.archive.org/web/20180713134812/https://add0n.com/youtube-hover.html>, [retrieved on Nov. 8, 2024], Jul. 13, 2018, 4 pages.

Leonard, Sengere, "You can now hover over videos on Youtube to get GIF like previews—Techzim", Retrieved from the Internet: URL: <https://web.archive.org/web/20171007193435/https://www.techzim.co.zw/2017/07/can-now-hovervideos-youtube-get-gif-like-previews/>, [retrieved on Nov. 8, 2024], Oct. 7, 2017, 6 pages.

Notice of Allowance received for U.S. Appl. No. 18/146,336, mailed on Nov. 22, 2024, 11 pages.

Extended European Search Report received for European Patent Application No. 24195286.0, mailed on Nov. 5, 2024, 9 pages.

Notice of Allowance received for U.S. Appl. No. 18/487,837, mailed on Nov. 8, 2024, 7 pages.

\* cited by examiner

All Season 1 episodes available to download
Season 2 Episode 6 not available to download
User has not watched Season 2 Episode 5

All Season 1 episodes available to download
Season 2 Episode 7 available to download
User has watched Season 2 Episode 6

Season 2 Episode 8 not available to download

Season 2 Episode 8 available to download
User has watched Season 2 Episode 7

USER INTERFACES FOR ACCESSING EPISODES OF A CONTENT SERIES

CROSS REFERENCE TO RELATED APPLICATIONS

This application is a continuation of U.S. patent application Ser. No. 17/210,352, filed Mar. 23, 2021, and published on Sep. 30, 2021 as U.S. Publication No. 2021-0306711, which claims the benefit of U.S. Provisional Application No. 62/994,209, filed Mar. 24, 2020, and U.S. Provisional Application No. 63/082,915, filed Sep. 24, 2020, the contents of which are hereby incorporated by reference in their entireties for all purposes.

FIELD OF THE DISCLOSURE

This relates generally to user interfaces that enable a user to access episodes of a content series on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents episodic content series in a content browsing and/or playback application. In some circumstances, episodes of an episodic content series can be discovered and downloaded on the electronic device. In some circumstances, an episodic series includes episodes that have not been released but are scheduled to be released soon. Enhancing the user's ability to discover and download episodes of an episodic content and/or ability to view information about an unreleased episodic that is scheduled to be released soon enhances the user's interactions with the device. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that provide user interfaces for downloading episodes of episodic content series. Some embodiments described in this disclosure are directed to one or more electronic devices that present upcoming content for episodic content series. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
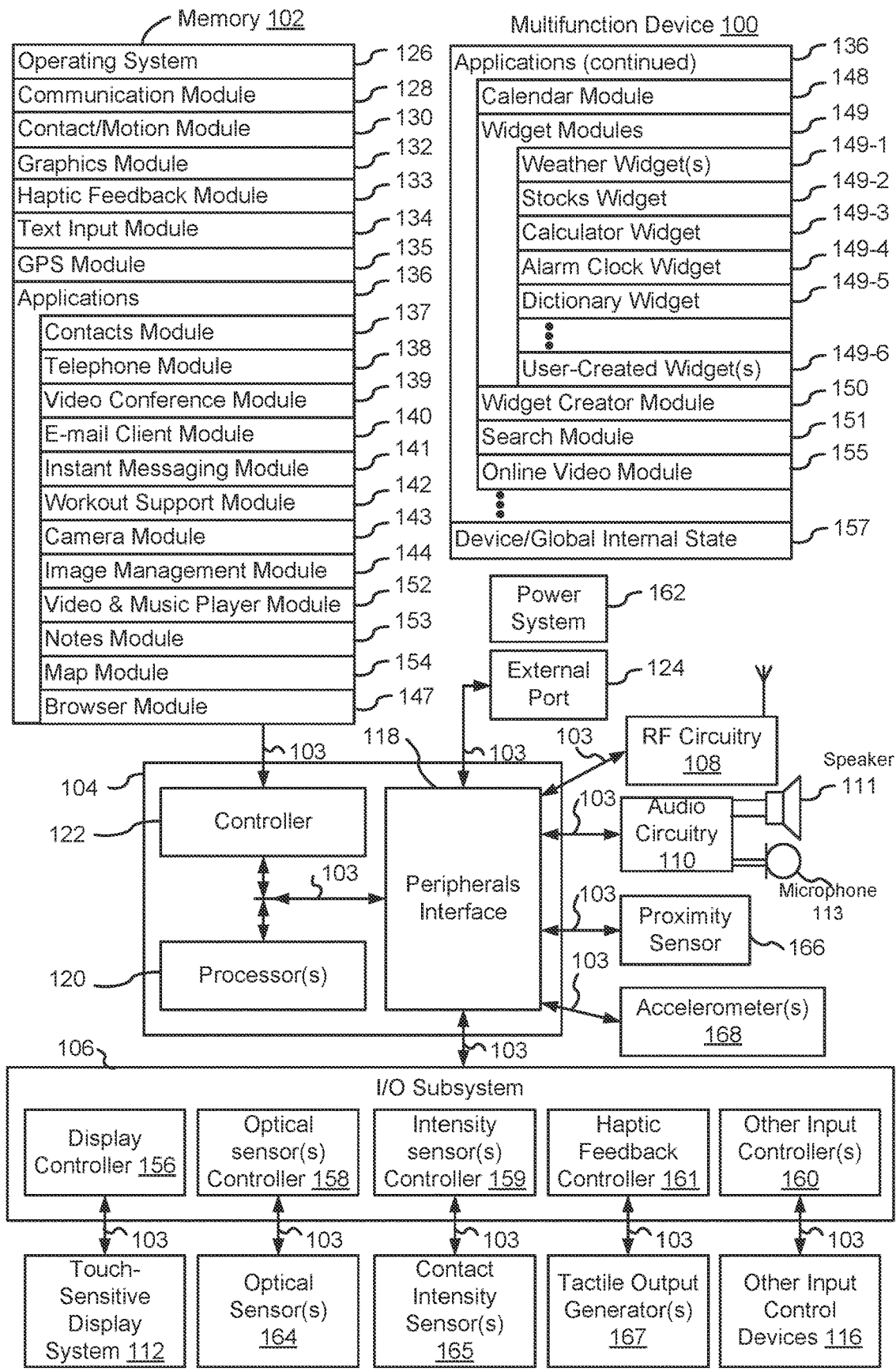
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions)

Figure 3:
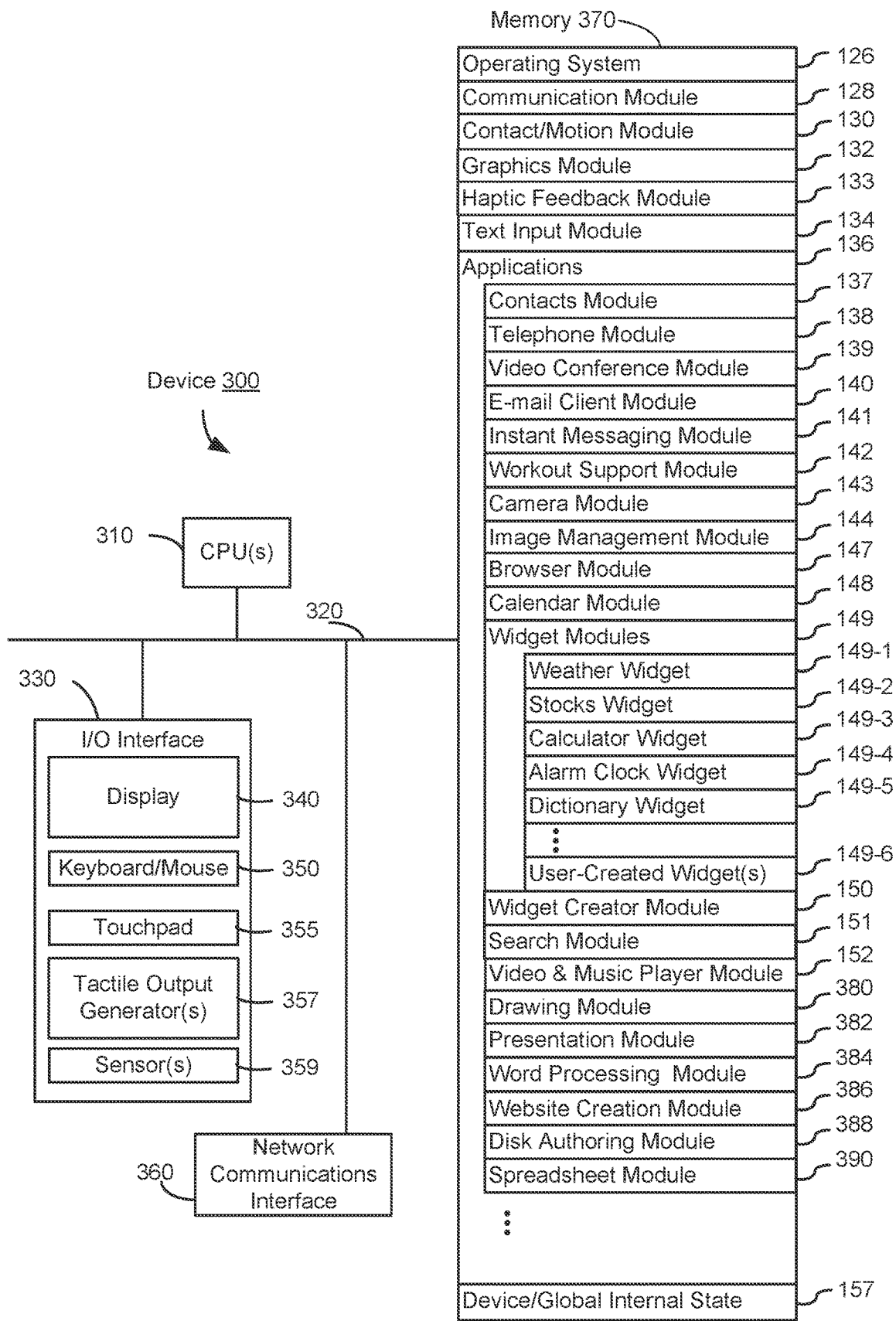
FIG. 3 is a block diagram of an exemplary multifunction device with a display and a touch-sensitive surface in accordance with some embodiments of the disclosure.

136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module and music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
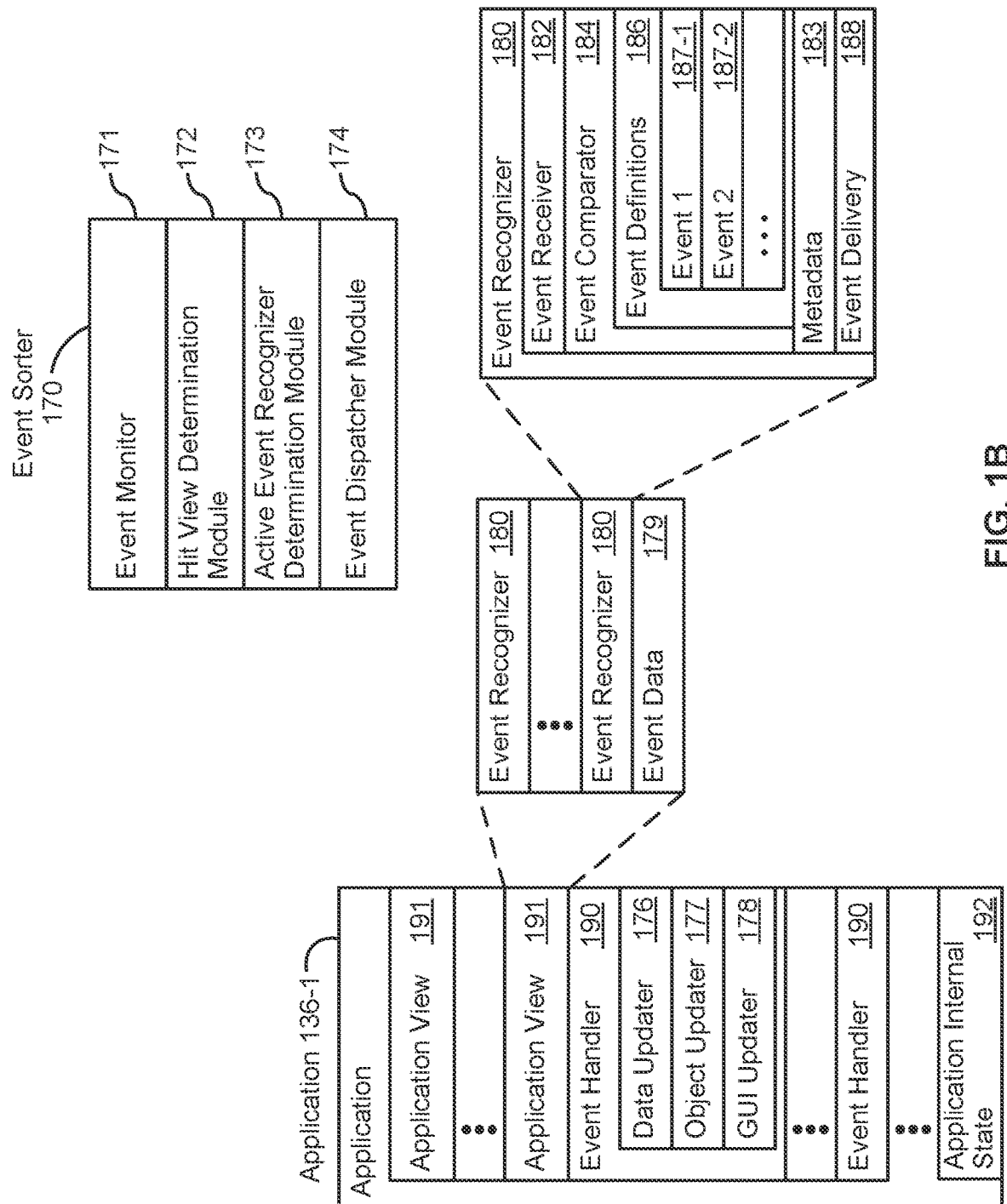
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
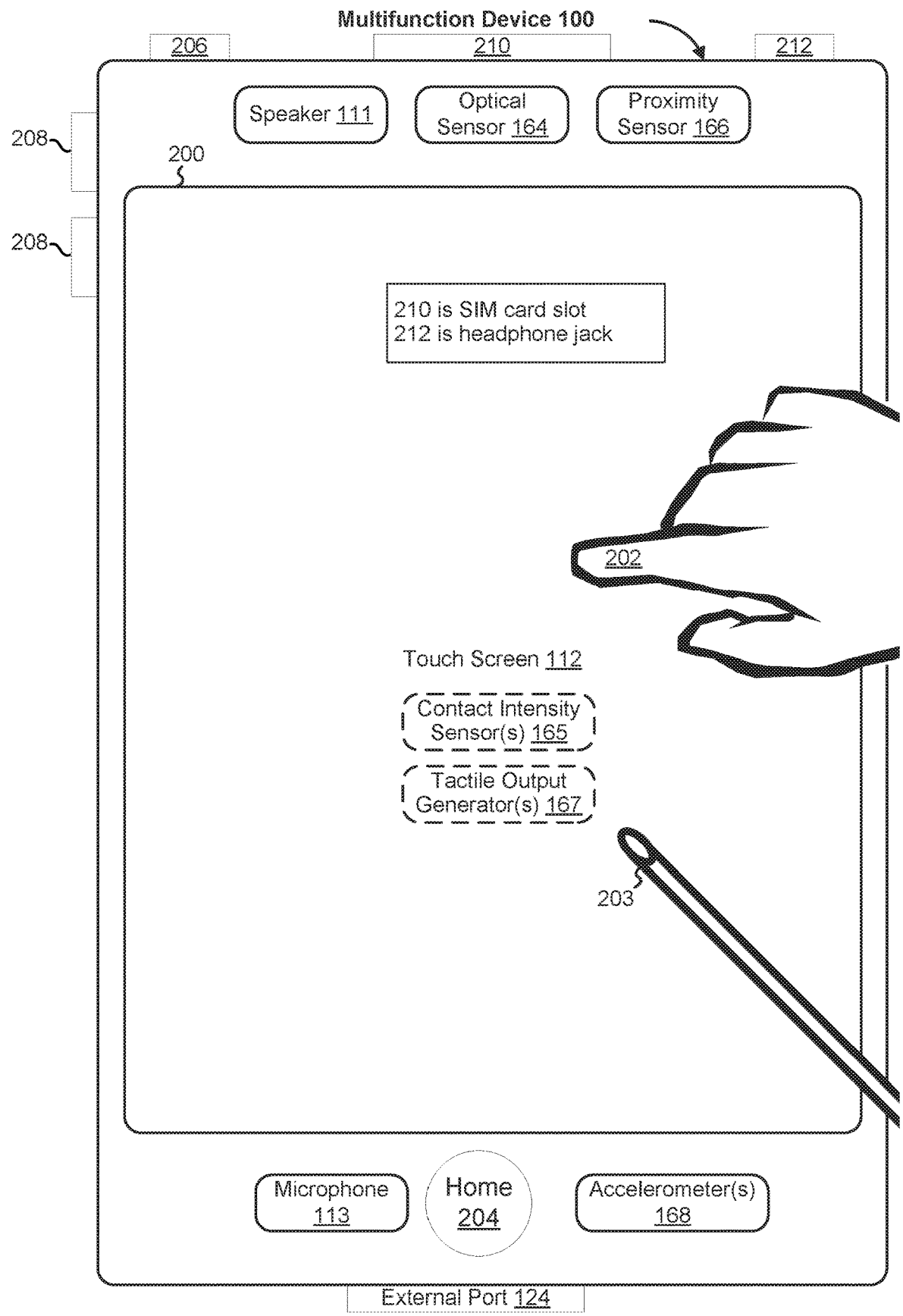
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
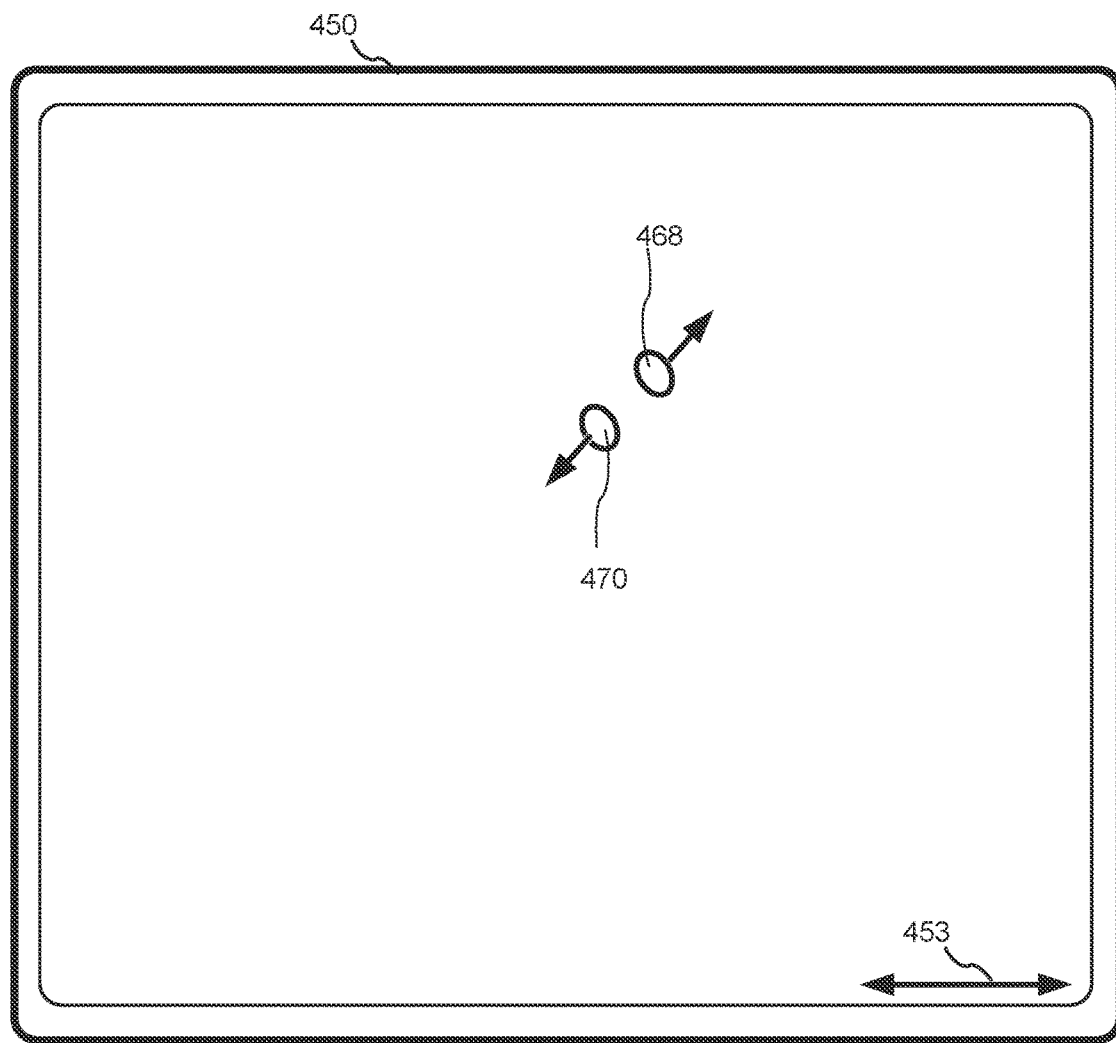
FIG. 4 illustrates an exemplary user interface for a multifunction device with a touch-sensitive surface that is separate from the display in accordance with some embodiments of the disclosure.
Figure 4:
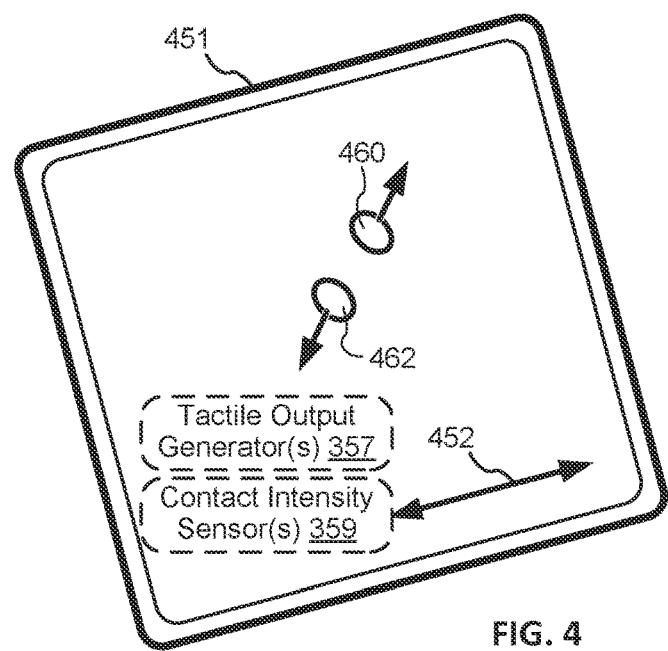

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
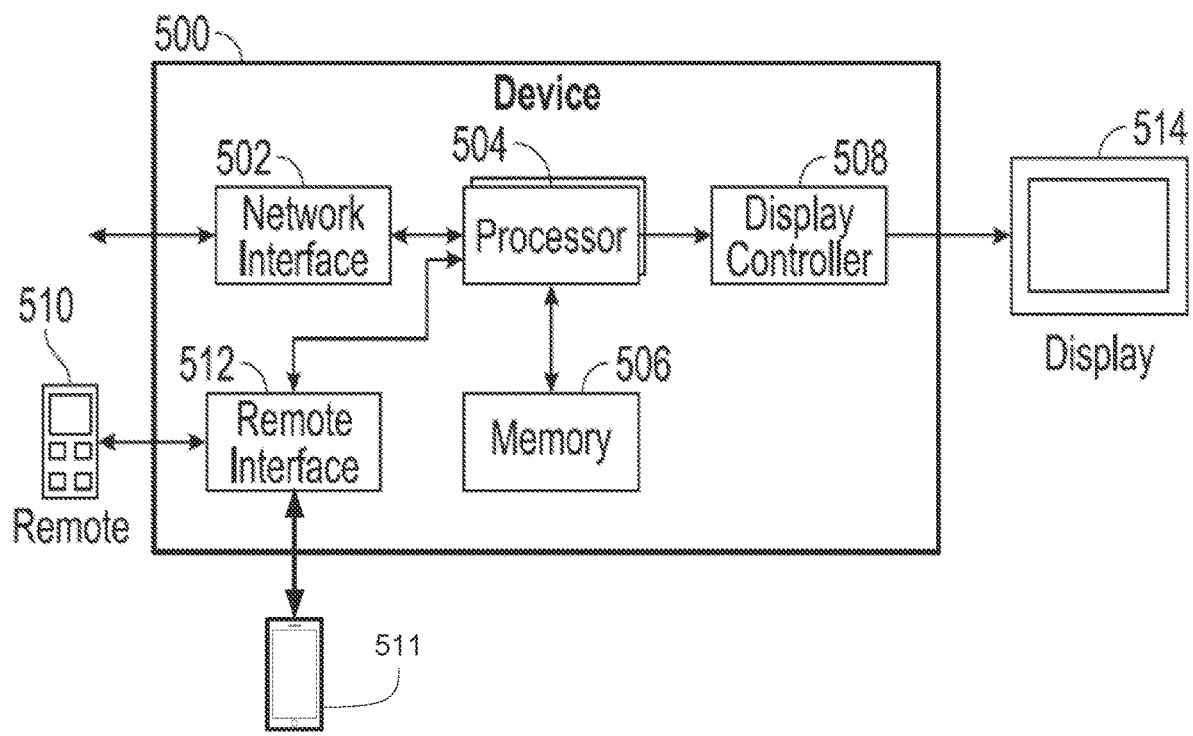
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multi-function device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
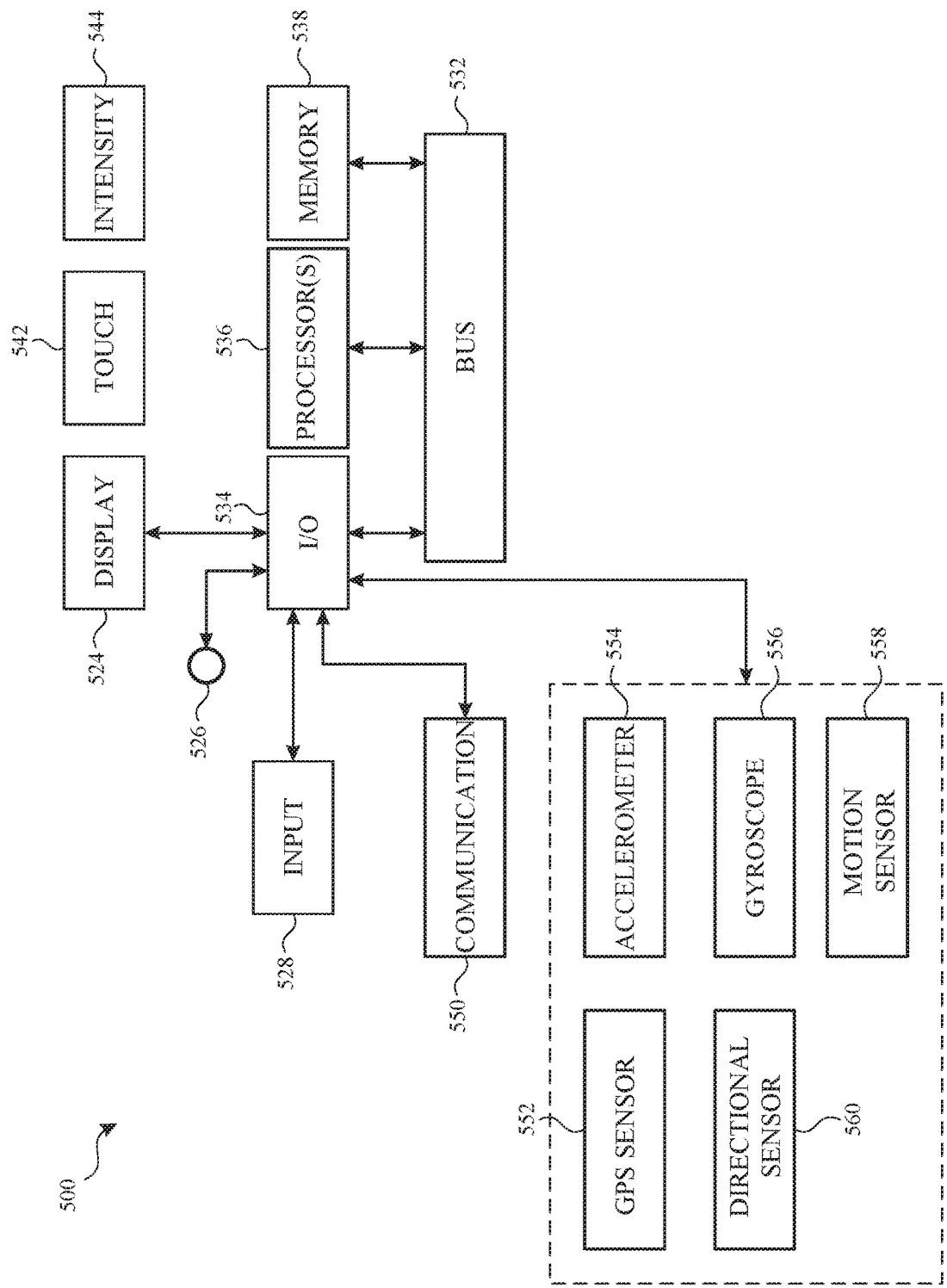

FIG. 5B depicts exemplary personal electronic device 500. In some embodiments, device 500 can include some or all of the components described with respect to FIGS. 1A, 1B, and 3. Device 500 has bus 532 that operatively couples I/O section 534 with one or more computer processors 536 and memory 538. I/O section 534 can be connected to display 524, which can have touch-sensitive component 522 and, optionally, intensity sensor 544 (e.g., contact intensity sensor). In addition, I/O section 534 can be connected with communication unit 50 for receiving application and operating system data, using Wi-Fi, Bluetooth, near field communication (NFC), cellular, and/or other wireless communication techniques. Device 500 can include input mechanisms 526 and/or 528. Input mechanism 526 is, optionally, a rotatable input device or a depressible and rotatable input device, for example. Input mechanism 528 is, optionally, a button, in some examples.

Input mechanism 528 is, optionally, a microphone, in some examples. Personal electronic device 500 optionally includes various sensors, such as GPS sensor 552, accelerometer 554, directional sensor 560 (e.g., compass), gyroscope 556, motion sensor 558, and/or a combination thereof, all of which can be operatively connected to I/O section 534.

Memory 538 of personal electronic device 500 can include one or more non-transitory computer-readable storage mediums, for storing computer-executable instructions, which, when executed by one or more computer processors 536, for example, can cause the computer processors to perform the techniques described below, including processes described with reference to FIGS. 6-9. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations, such as those described above with respect to FIGS. 1-3 and 5A.

As used here, the term "affordance" refers to a user-interactive graphical user interface object that is, optionally, displayed on the display screen of devices 100, 300, 500 and/or 511 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, 500, and/or 511) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 511.

User Interfaces and Associated Processes

User Interfaces for Downloading Episodes of a Content Series

Users interact with electronic devices in many different manners, including using an electronic device to find, browse, and play content in a content browsing and playback application. In some embodiments, a user can download one or more episodes of an episodic content series (e.g., television show) to an electronic device. The embodiments described below provide ways for downloading additional episodes of episodic content series, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
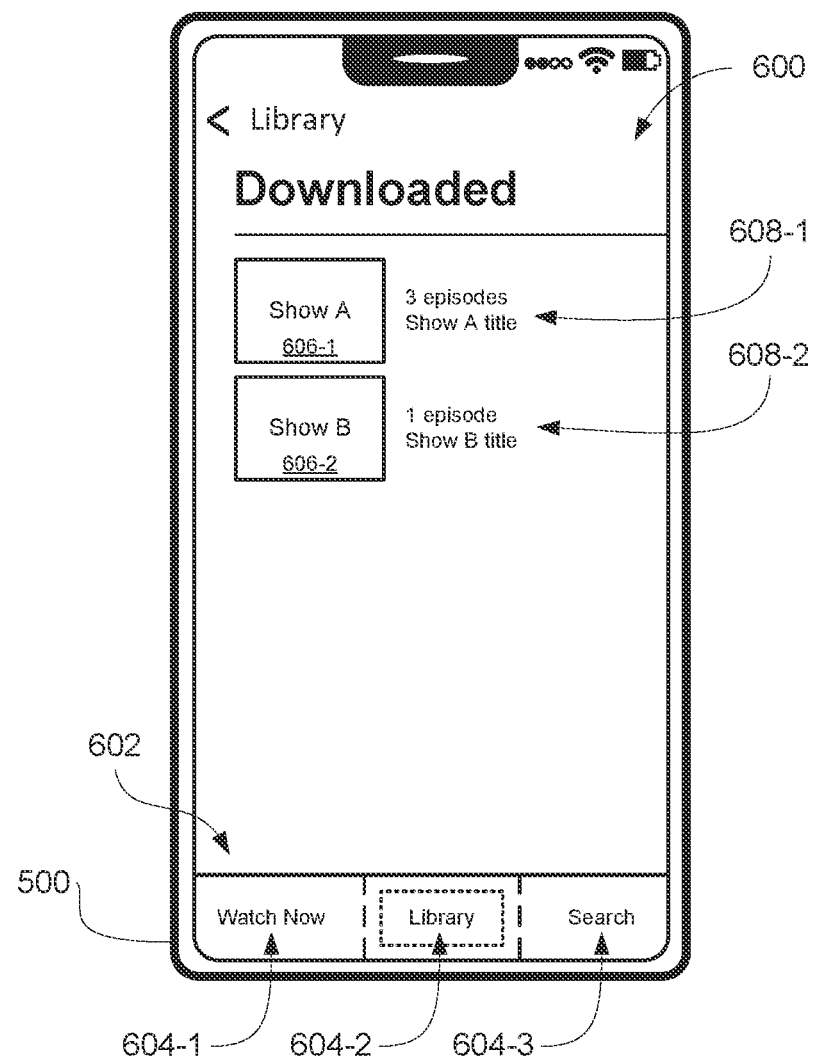
FIGS. 6A-6W illustrate exemplary ways in which an electronic device provides user interfaces for downloading episodes of episodic content series in accordance with some embodiments of the disclosure.
Figure 6B:
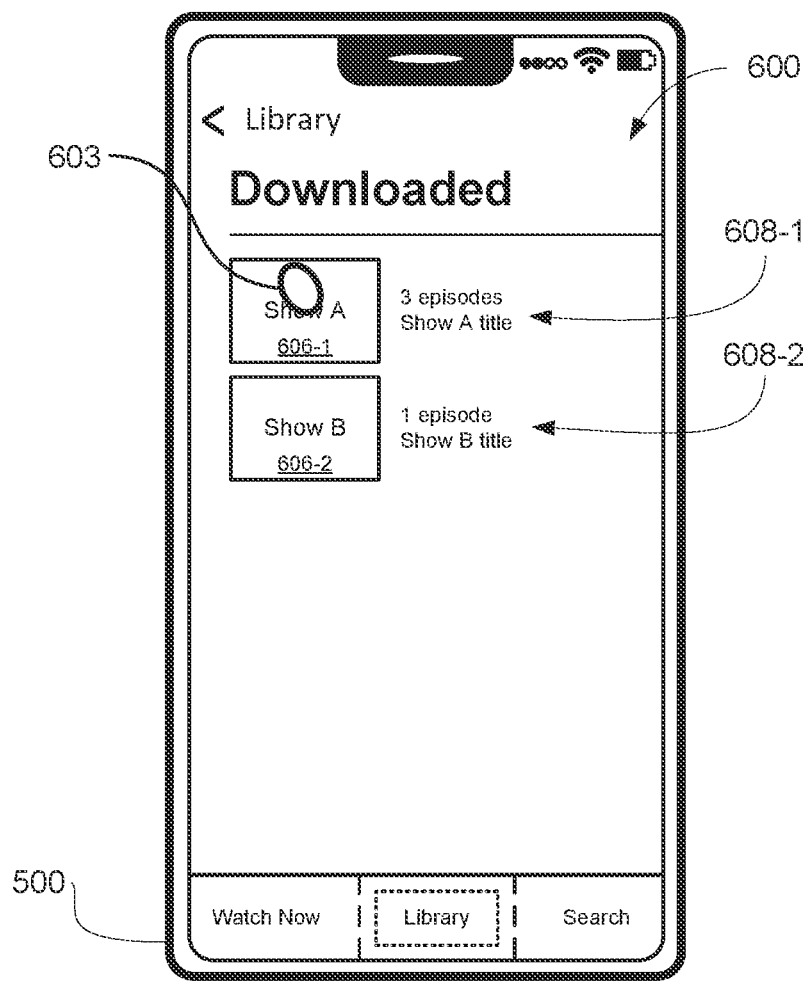
Figure 6C:
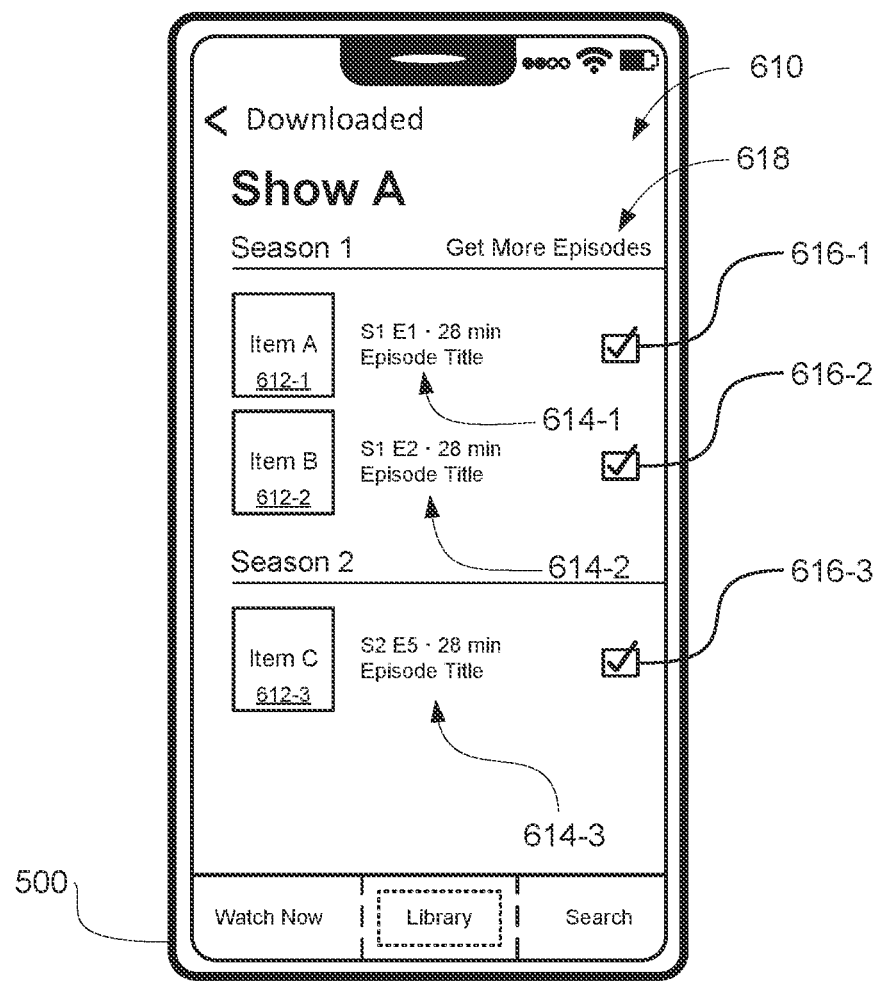
Figure 6D:
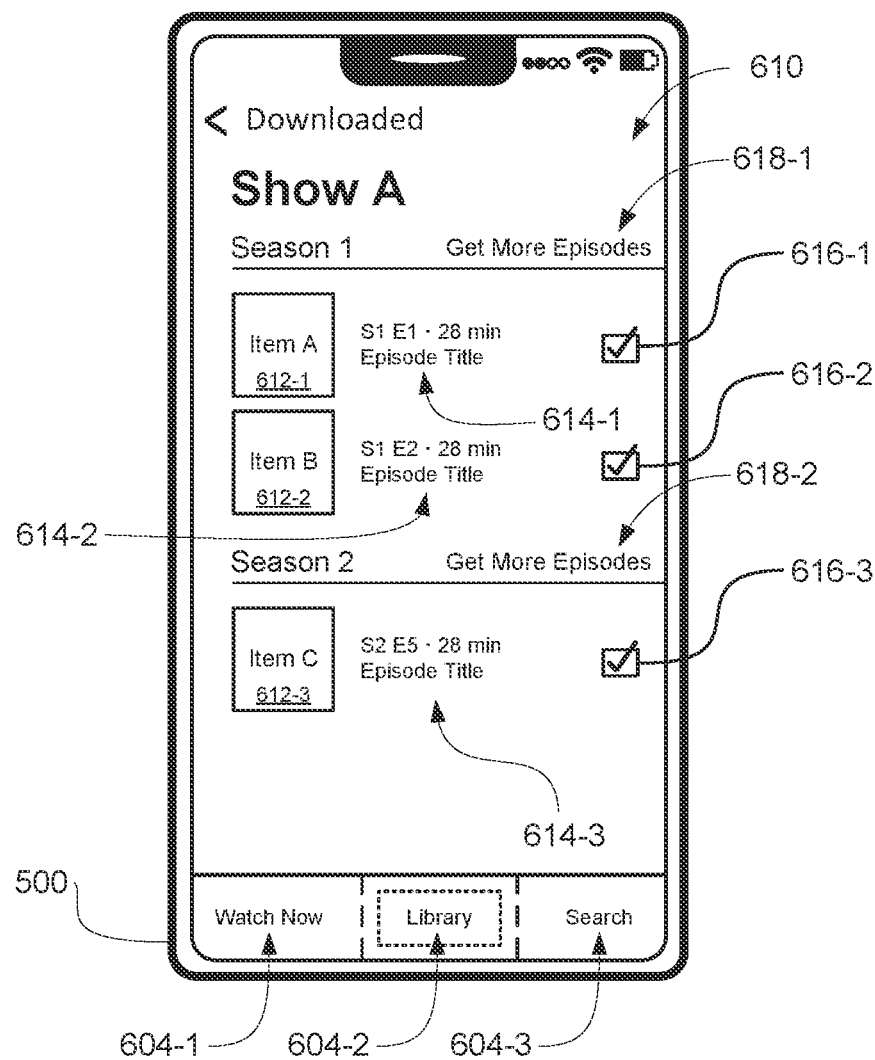
Figure 6E:
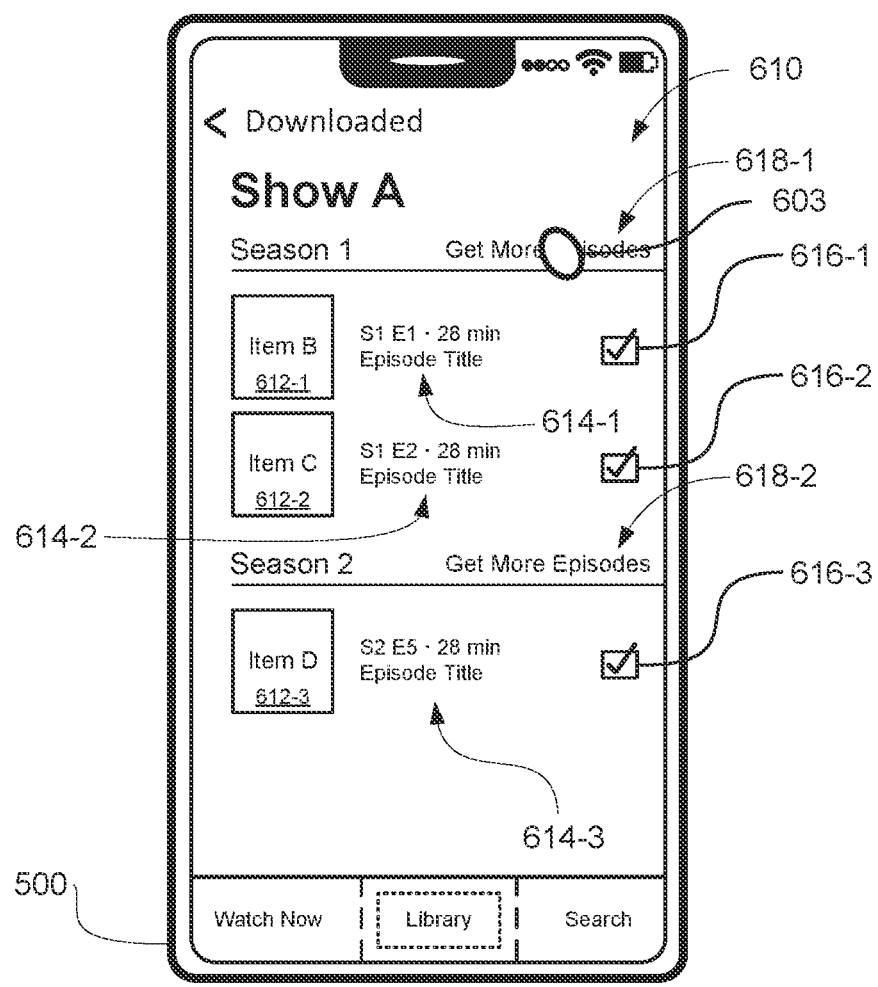
Figure 6F:
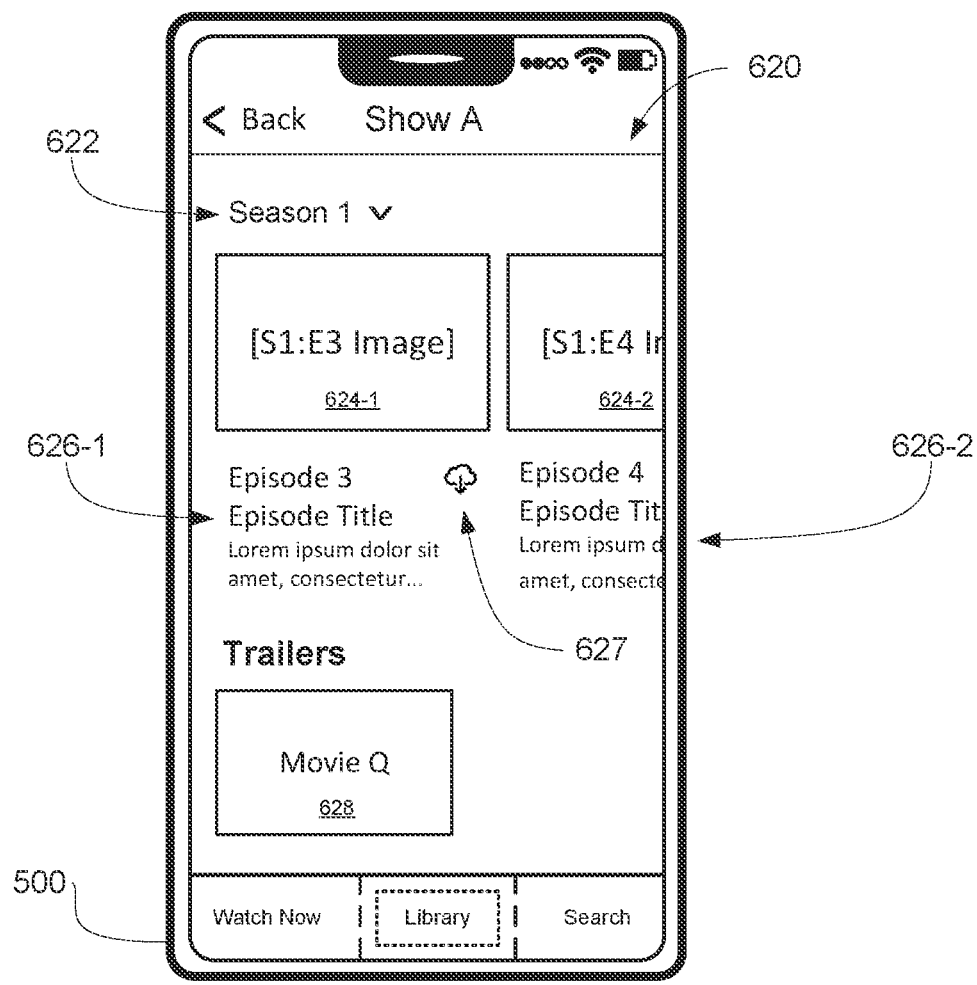
Figure 6G:
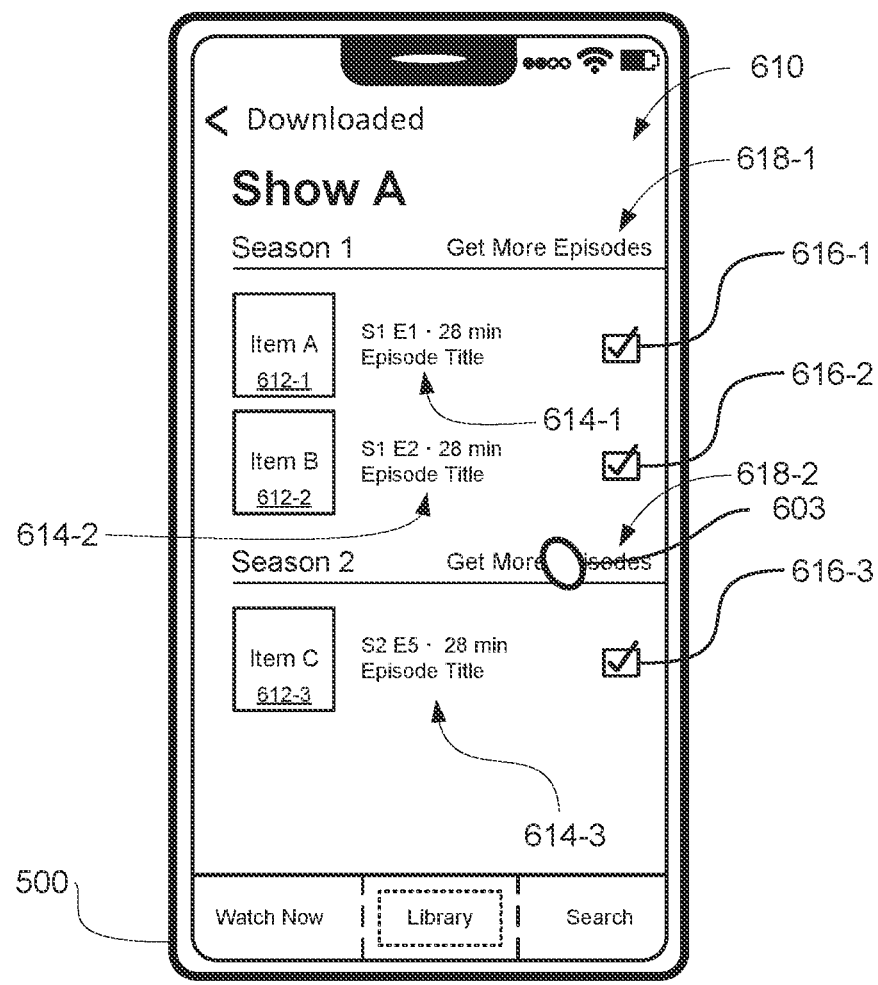
Figure 6H:
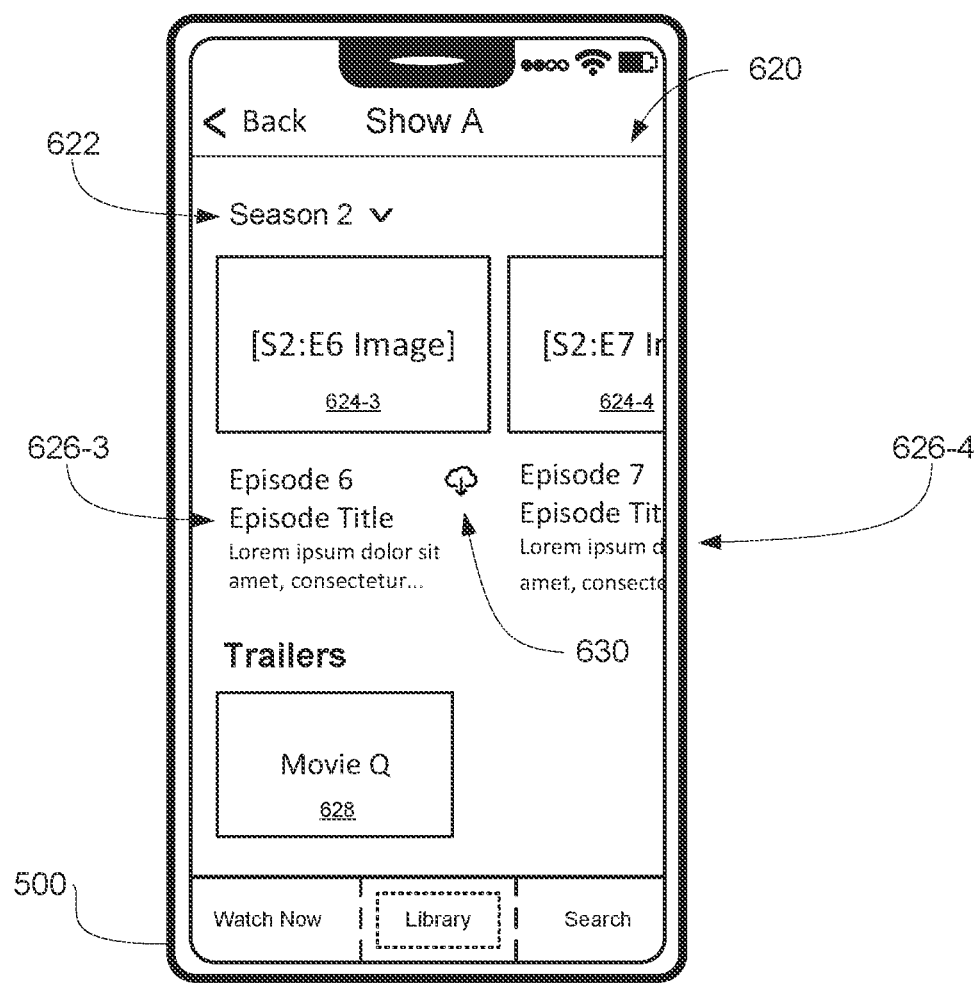
Figure 6I:
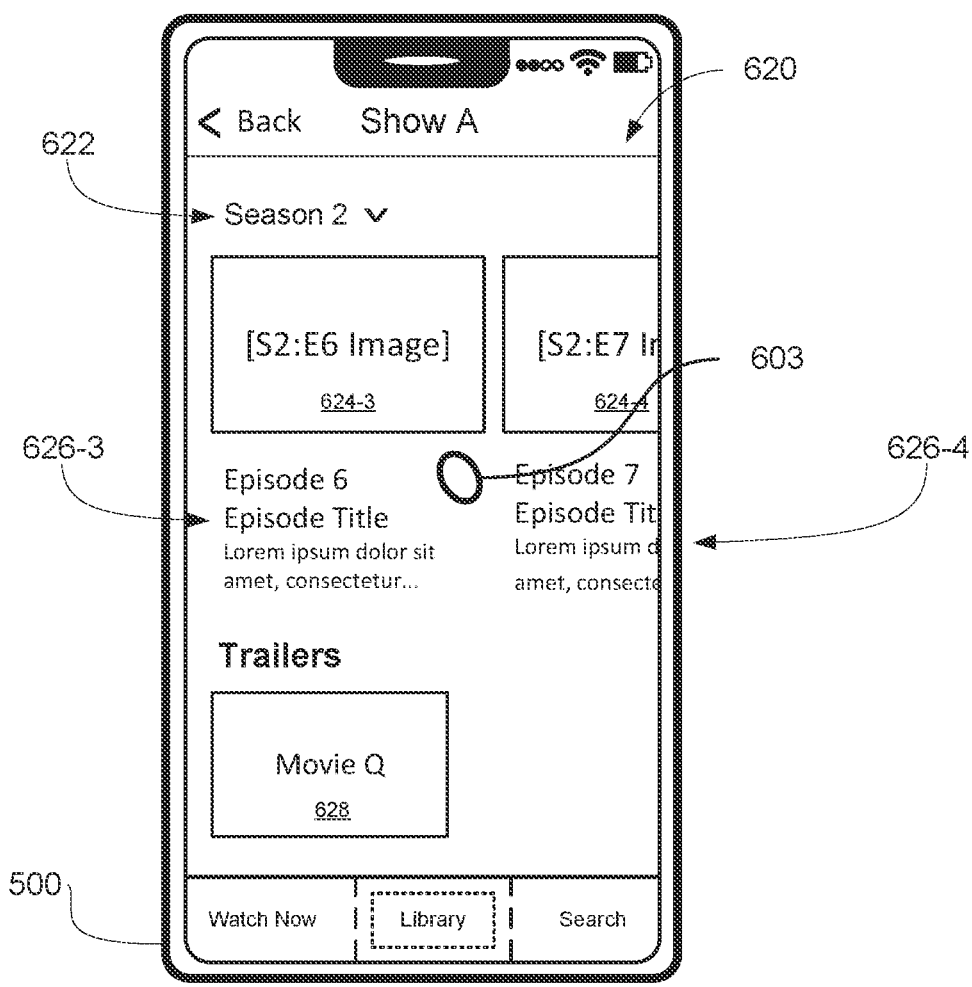
Figure 6J:
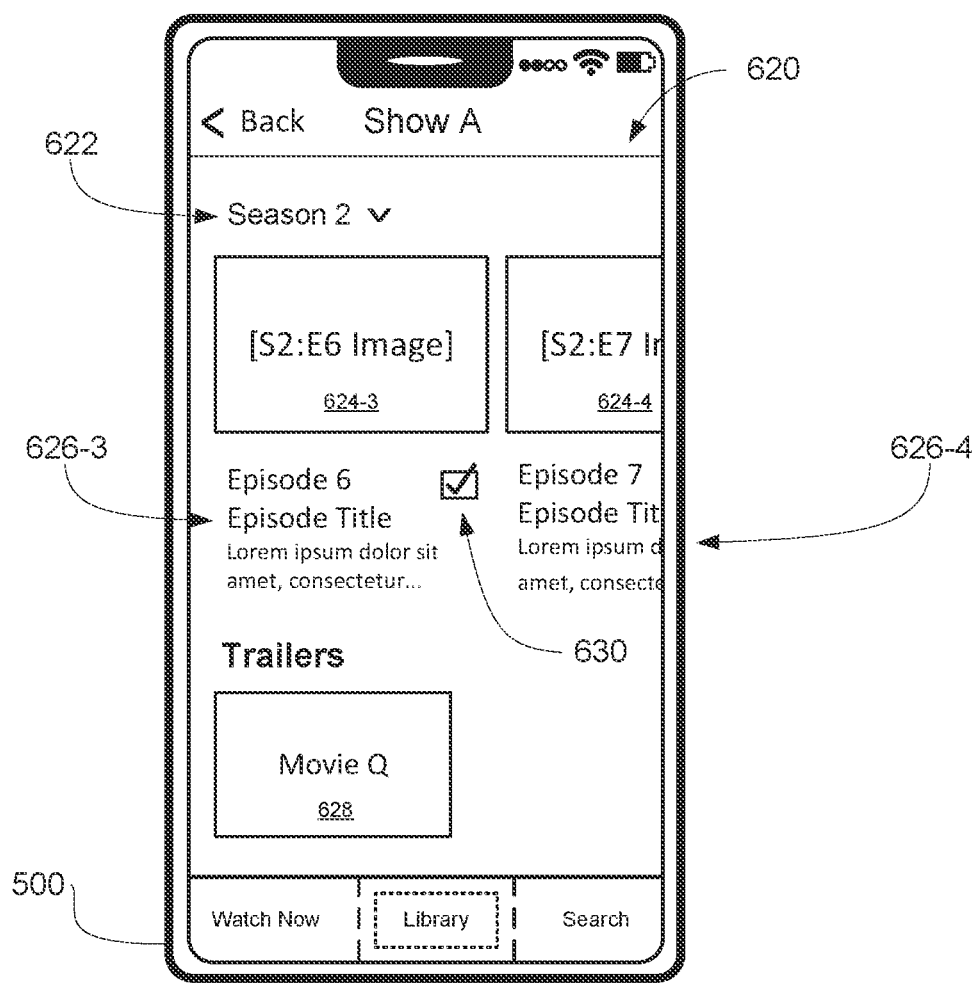
Figure 6K:
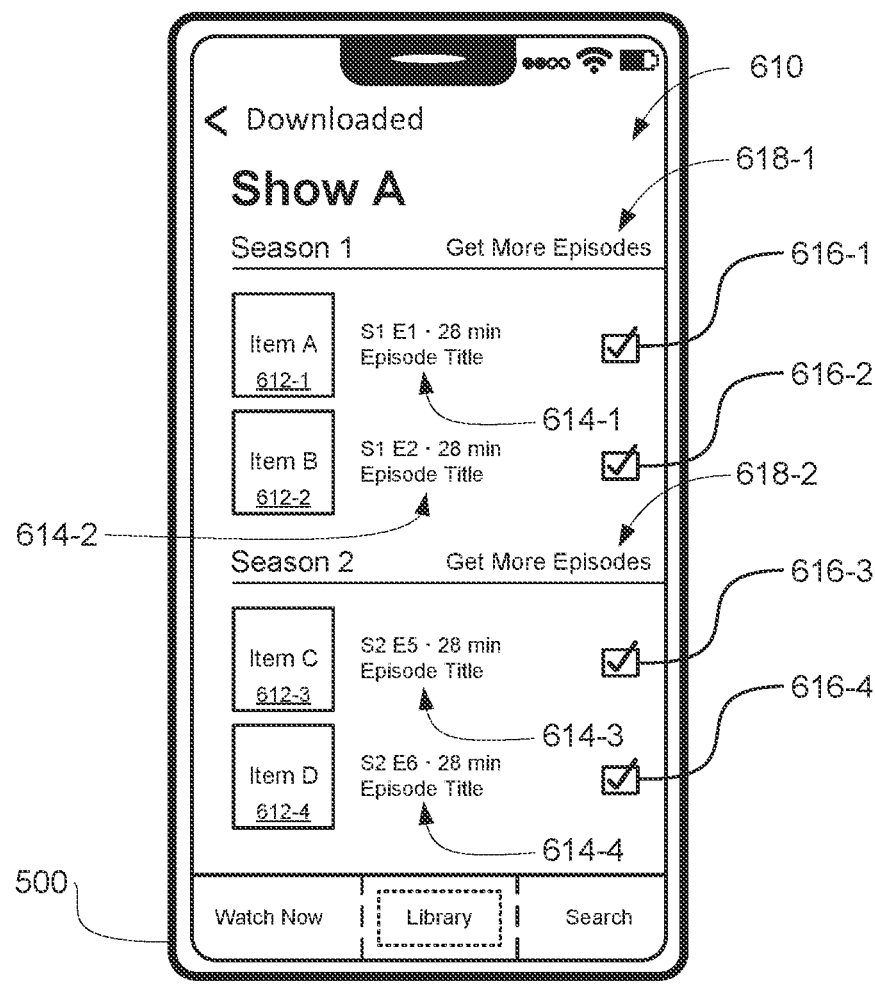
Figure 6L:
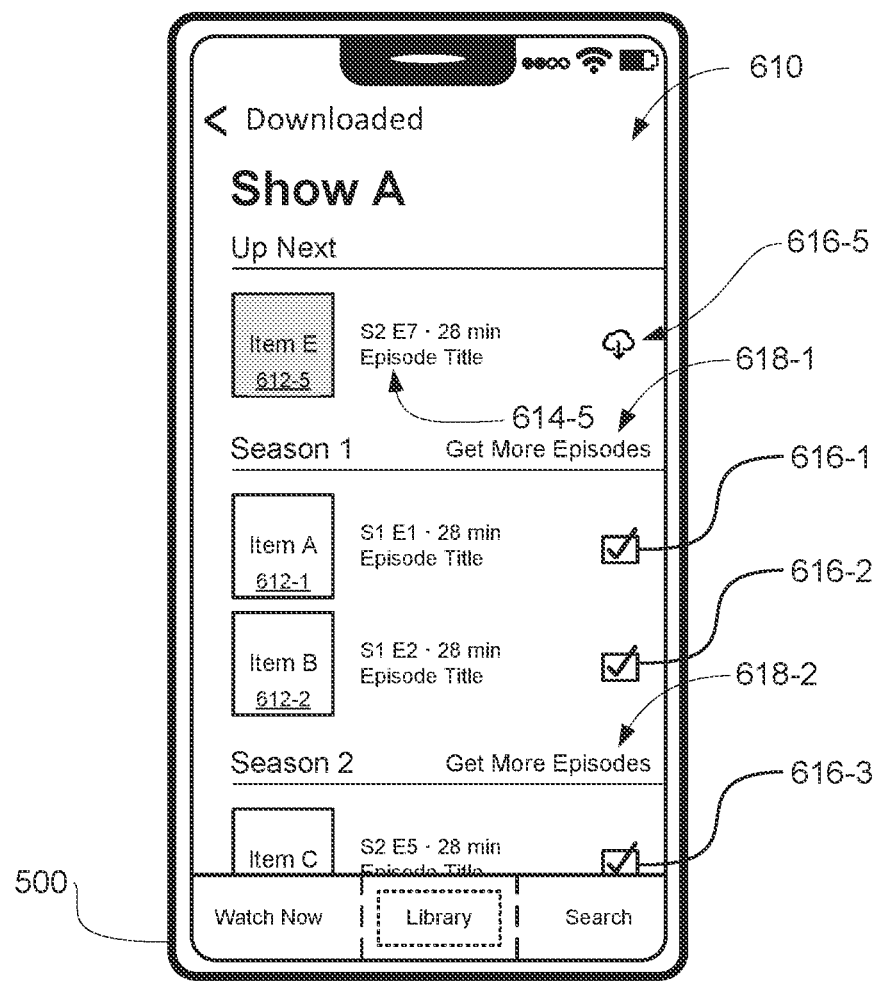
Figure 6M:
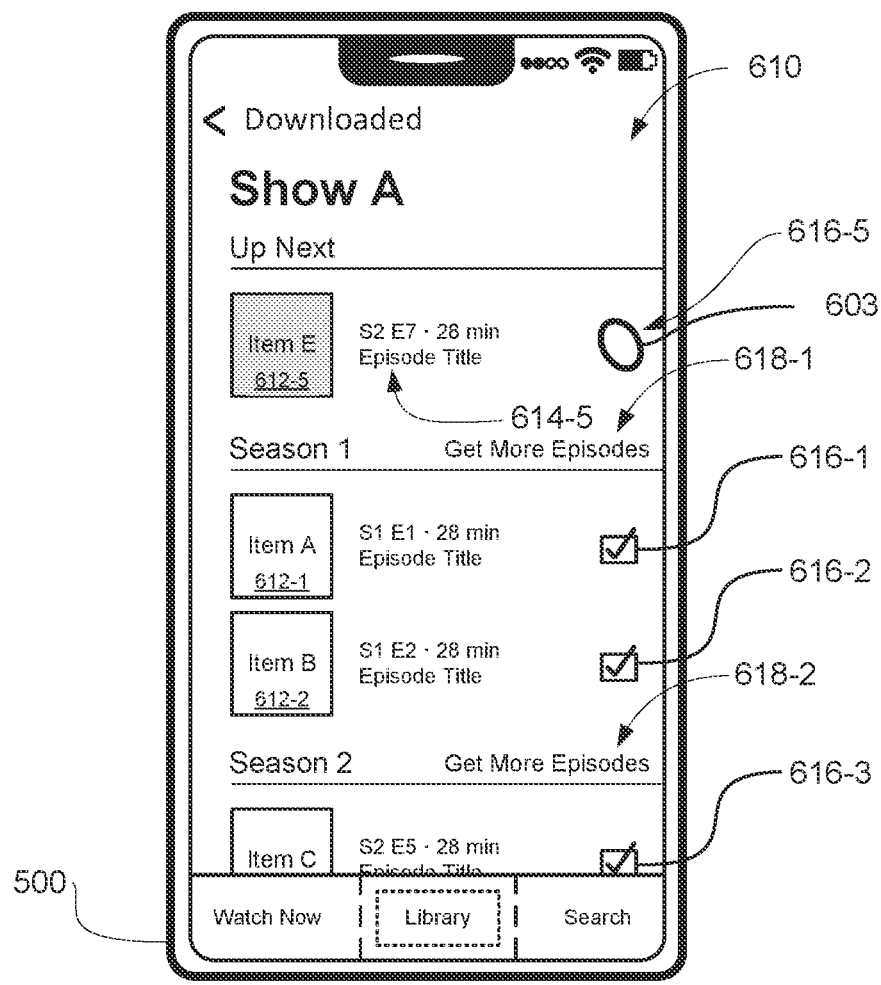
Figure 6N:
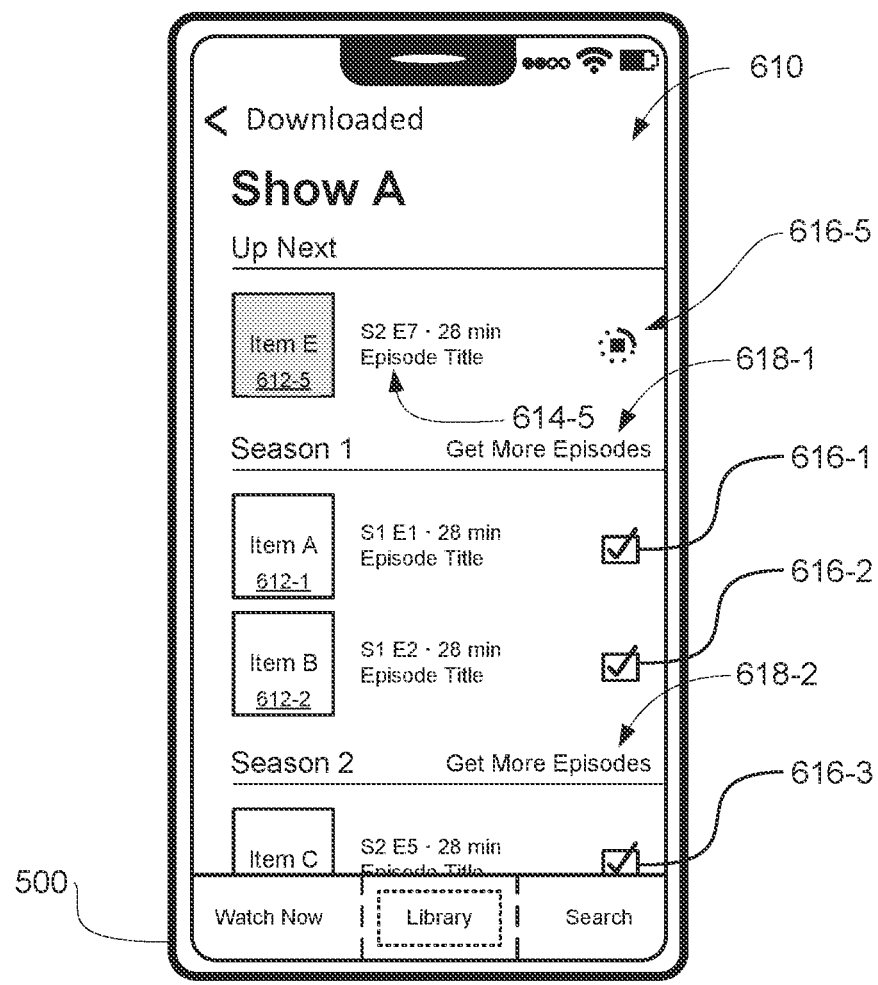
Figure 6O:
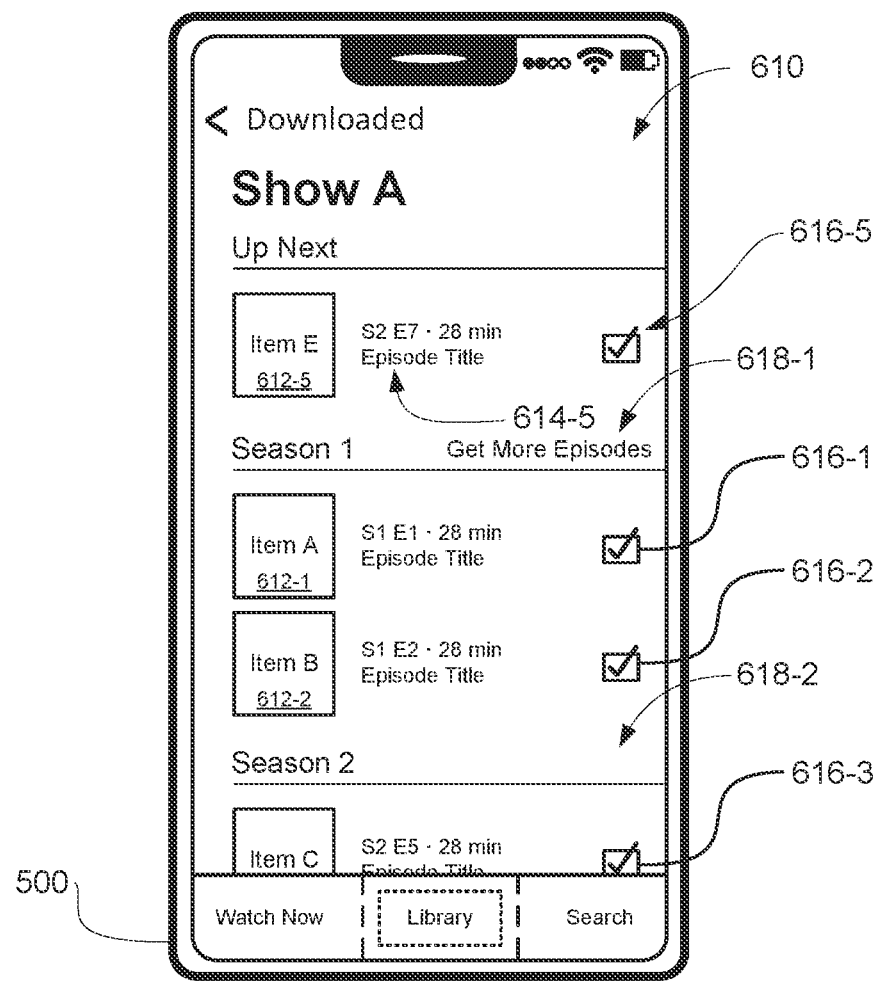
Figure 6P:
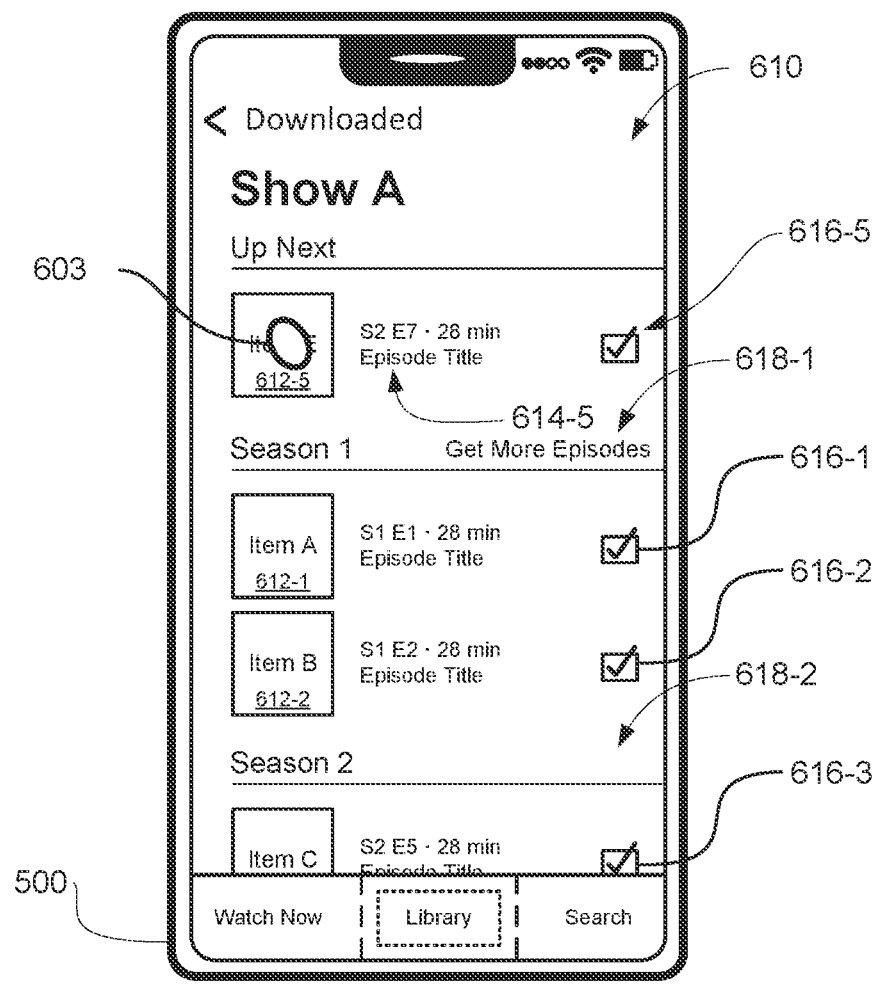
Figure 6Q:
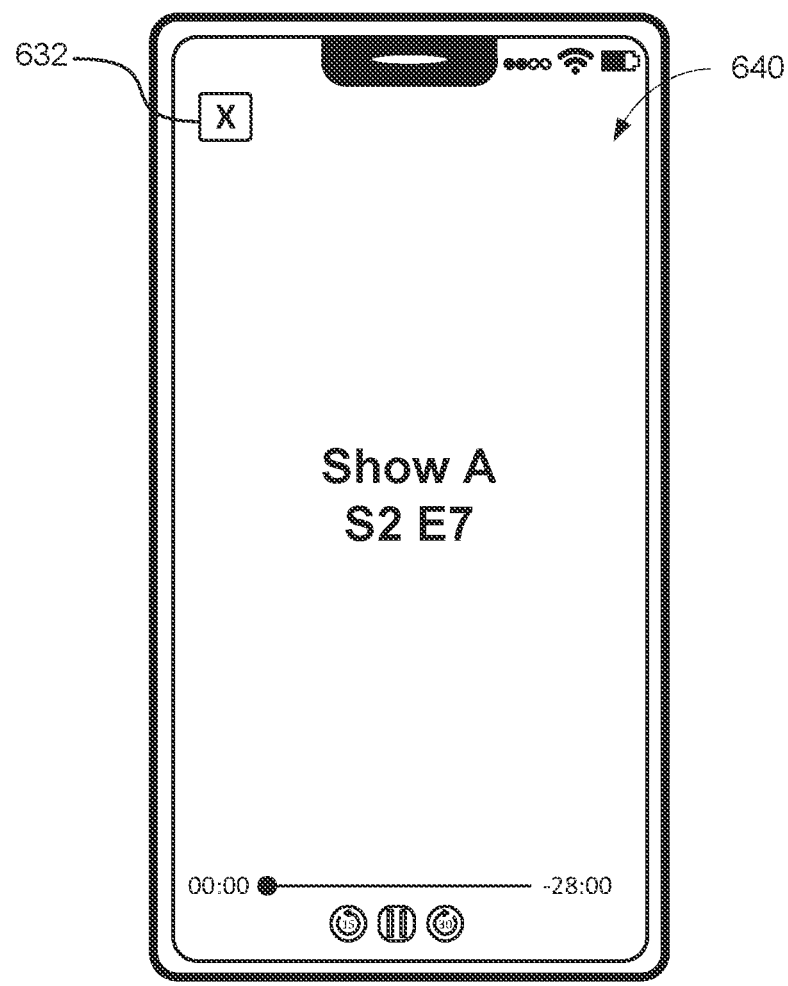
Figure 6R:
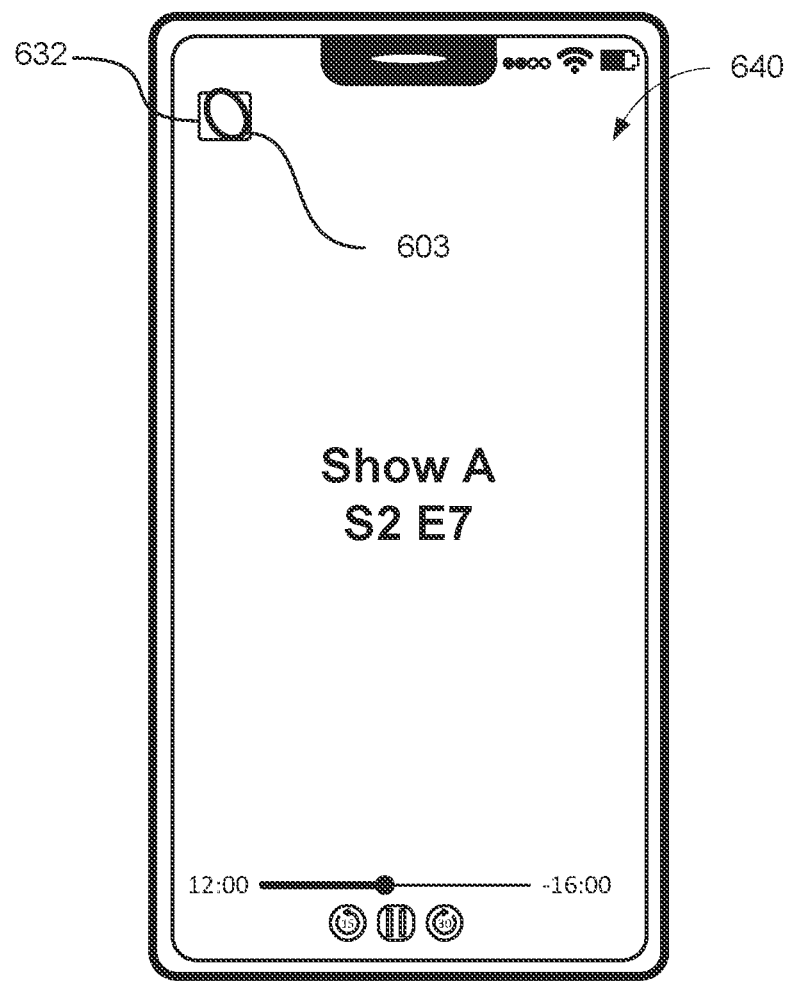
Figure 6S:
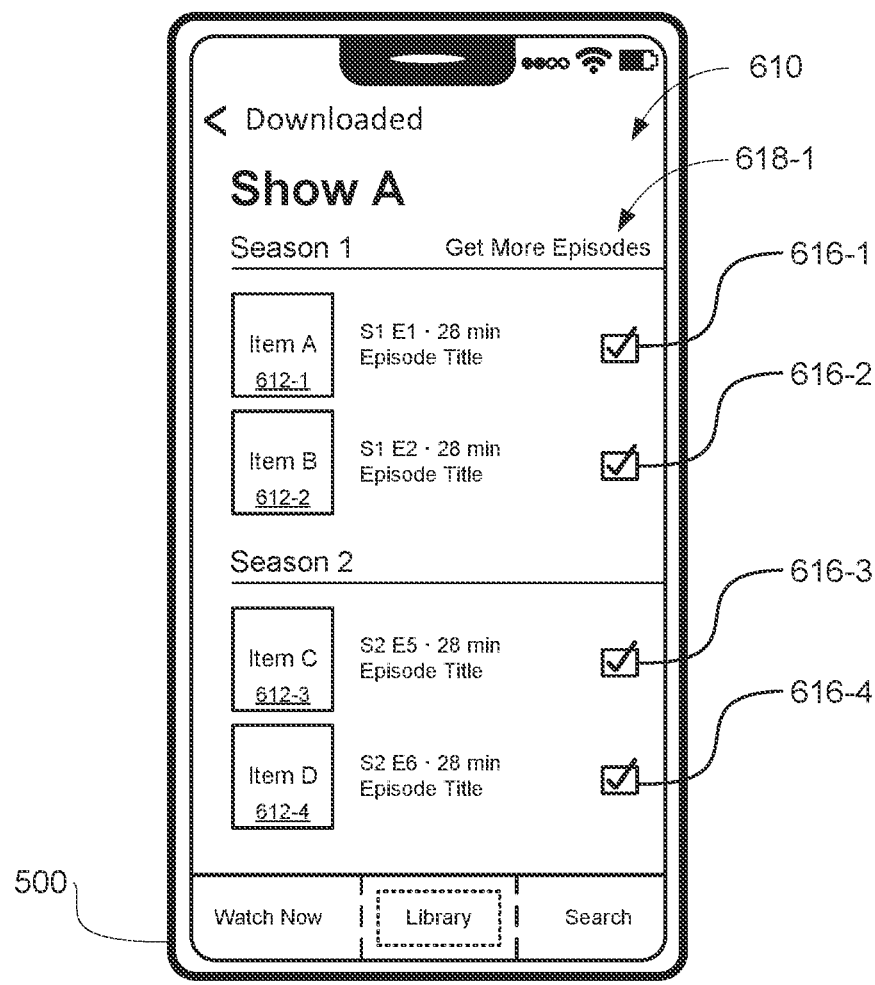
Figure 6T:
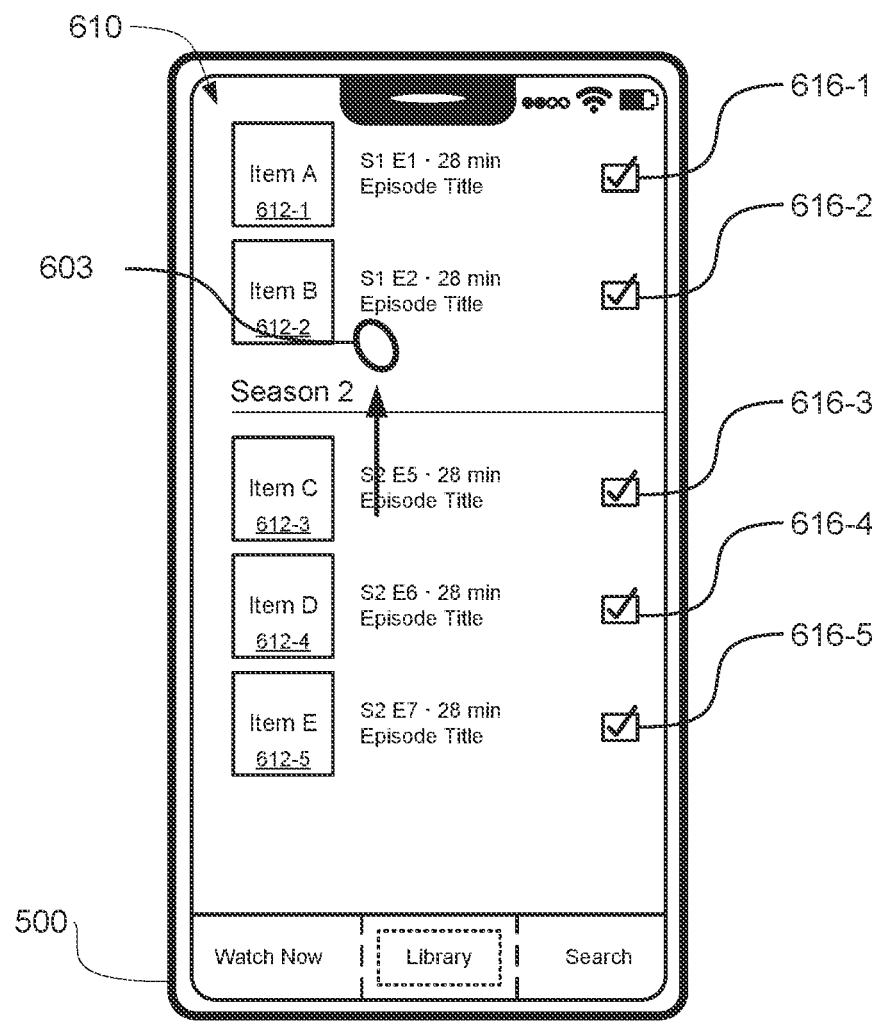
Figure 6U:
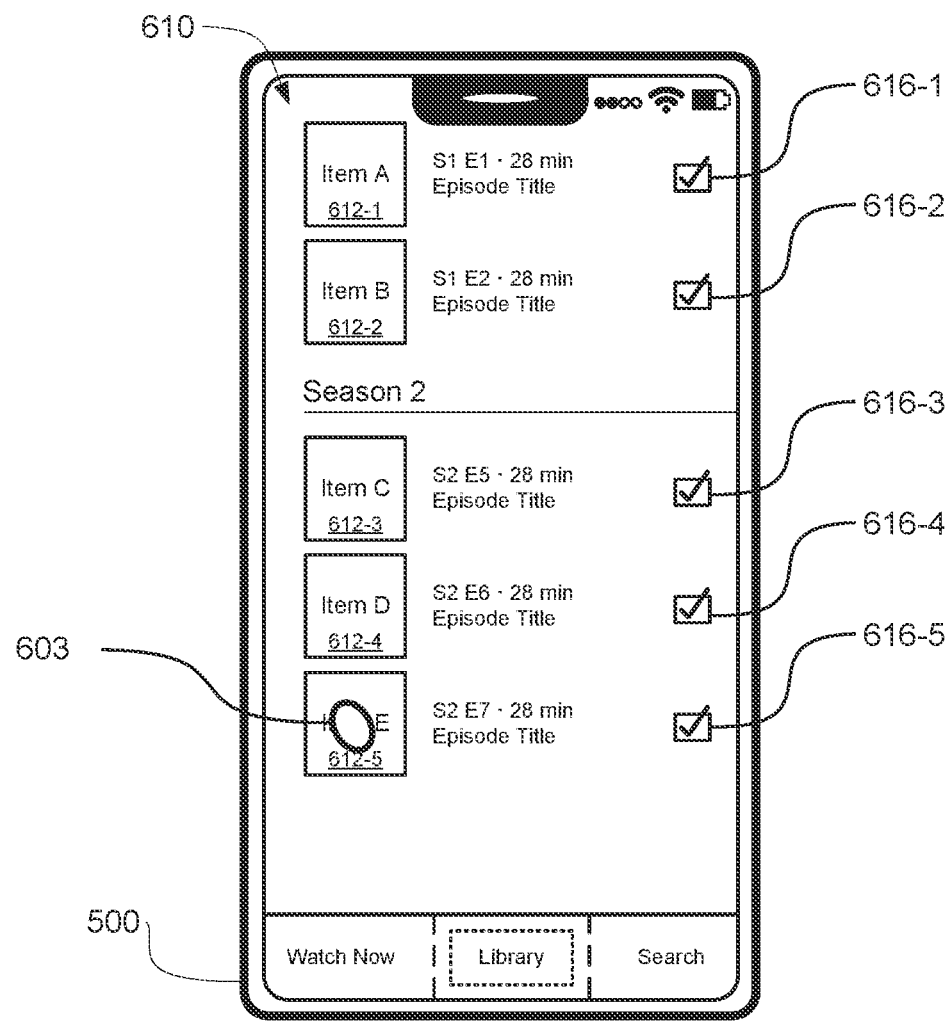
Figure 6V:
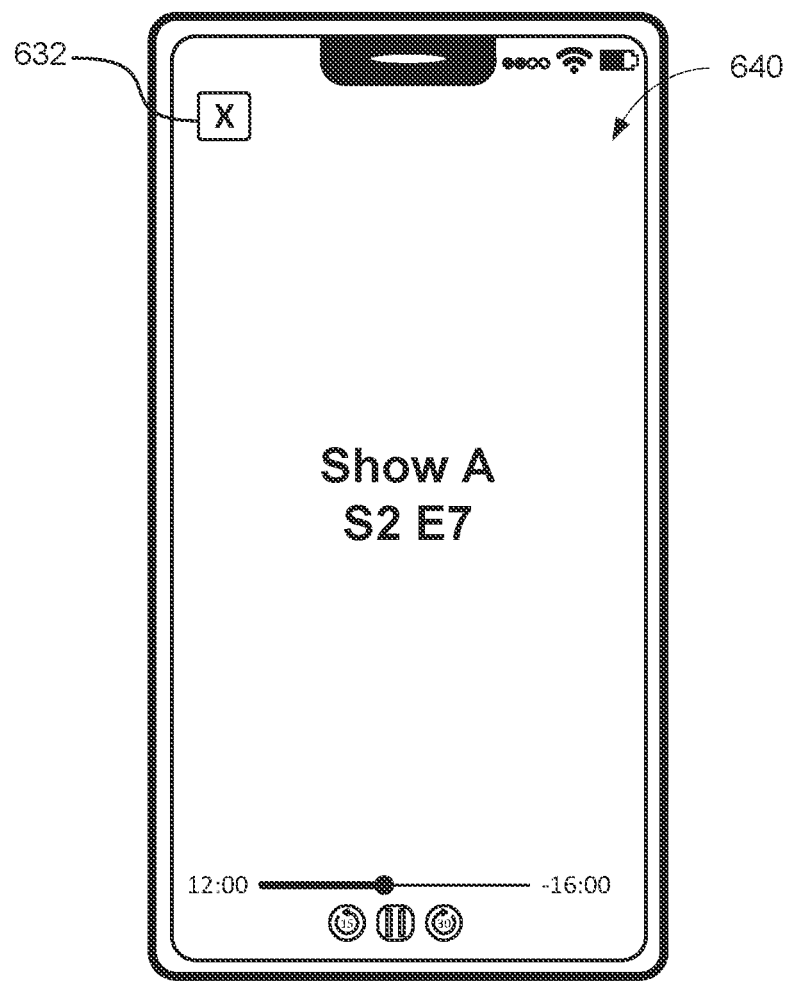
Figure 6W:
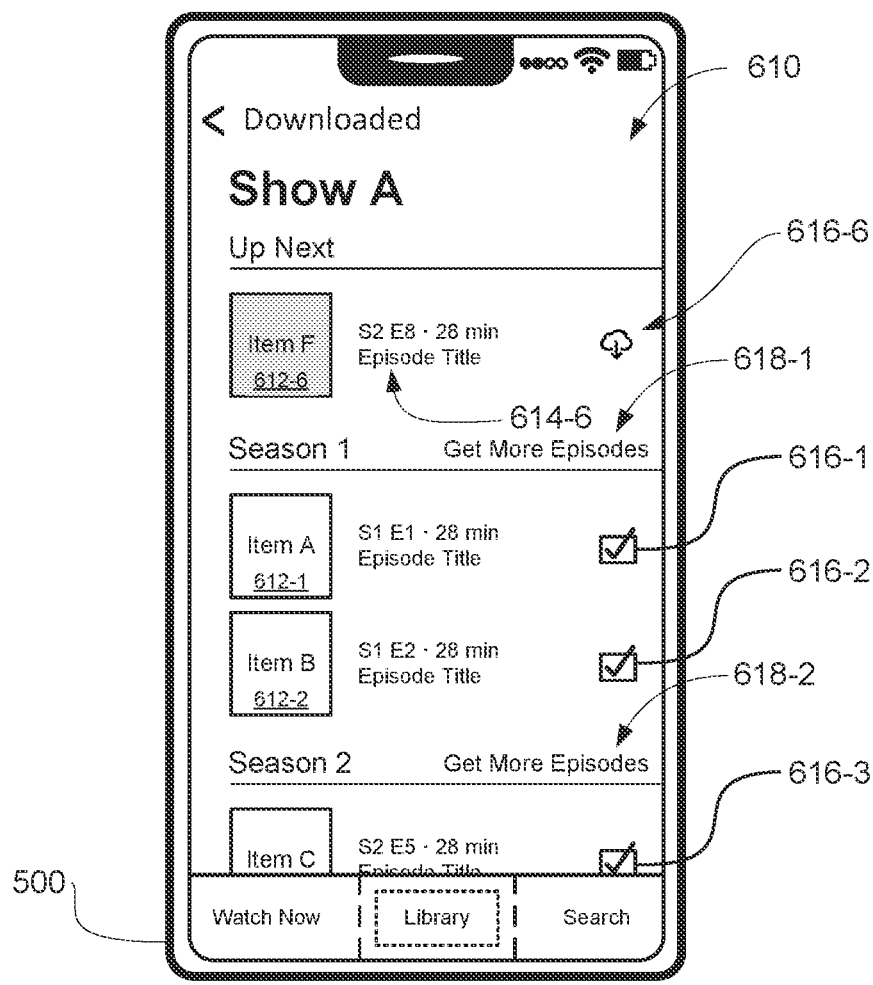

FIGS. 6A-6W illustrate exemplary ways in which an electronic device provides user interfaces for downloading episodes of episodic content series in accordance with some embodiments of the disclosure. The embodiments in these figures are used to illustrate the processes described below, including the processes described with reference to FIG. 7.

FIG. 6A illustrates electronic device 500 displaying user interface 600 (e.g., via a display device, via a display generation component, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device that is in communication with device 500.

In some embodiments, user interface 600 is a user interface of a content browsing and playback application (e.g., an application in which a user is able to browse for, access, download, and/or playback content). In some embodiments, the content browsing and playback application is an application installed on device 500. In some embodiments, user interface 600 includes navigation panel 602.

In some embodiments, navigation panel 602 includes one or more tabs that are selectable to display user interfaces associated with the respective tab. In FIG. 6A, navigation panel 602 includes a watch now tab 604-1, library tab 604-2, and search tab 604-3. As shown in FIG. 6A, the library tab 604-2 is selected (e.g., indicated by the dotted box) and user interface 600 is a user interface corresponding to the "Library" section of the content browsing and playback application. In some embodiments, the "Library" section of the content browsing and playback application corresponds to content that the user has added to the user's personal library (e.g., as opposed to content that is available via the content browsing and playback application, but the user has not indicated an interest in).

In some embodiments, user interface 600 is a user interface that displays content that has been downloaded on device 500. In some embodiments, user interface 600 displays one or more entries of content that are downloaded on device 500. As shown in FIG. 6A, content from Show A and Show B have been downloaded on device 500. Thus, user interface 600 includes a first entry corresponding to Show A (e.g., which includes representation 606-1 and textual description 608-1) and a second entry corresponding to Show B (e.g., which includes representation 606-2 and textual description 608-2). In some embodiments, Show A and Show B can be television series (e.g., episodic content series), movies, videos, etc. Thus, as shown in FIG. 6A, user interface 600 displays the shows for which the user has downloaded content (e.g., as opposed to displaying individual episodes or constituent parts of shows that has been downloaded on device 500). In some embodiments, user interface 600 does not include any entries for which content has not been downloaded on device 500. For example, if all downloaded episodes of Show B were removed (e.g., deleted) from device 500, then user interface 600 would be updated to remove the second entry (e.g., because no episodes of Show B are downloaded on device 500). Similarly, in some embodiments, if the user downloads an episode of Show C, then user interface 600 would be updated to add an entry for Show C.

In some embodiments, the entry corresponding to Show A includes representation 606-1 and textual description 608-1. In some embodiments, representation 606-1 is a still image, an animation, a video, or any other suitable graphic associated with Show A. In some embodiments, textual description 608-1 includes a title of Show A and an indication of how many episodes of Show A are downloaded on device 500. In some embodiments, the representations and/or the textual descriptions are selectable to display a user interface associated with the downloaded items of the respective show, as will be described in further detail below.

In FIG. 6B, a user input 603 is received selecting representation 606-1 corresponding to Show A. In response to receiving the user input 603, device 500 displays user interface 610, as shown in FIG. 6C. In some embodiments, user interface 610 is a user interface 610 associated with downloaded episodes of Show A. In some embodiments, user interface 610 does not include content associated with other shows (e.g., Show B, for example), and does not include episodes of Show A that are not downloaded on device 500. In FIG. 6C, device 500 has downloaded episode 1 and episode 2 from season 1 of Show A, and episode 5 from season 2 of Show A. Thus, user interface 601 includes an entry for season 1 episode 1, season 1 episode 2, and season 2 episode 5.

In some embodiments, each entry includes a representation, a textual description, and/or a download status indicator. For example, representation 612-1, textual description 614-1, and download status indicator 616-1 correspond to season 1 episode 1, representation 612-2, textual description 614-2, and download status indicator 616-2 correspond to season 1 episode 2, and representation 612-3, textual description 614-3, and download status indicator 616-3 correspond to season 2 episode 5. In some examples, the representations (e.g., representations 612-1, 612-2, and 612-3) are still images, animations, videos, or any other suitable graphic associated with the respective episode. In some examples, the textual descriptions (e.g., textual descriptions 614-1, 614-2, and 614-3) include a title of the respective episode, an indication of the respective season and episode of the entry, and/or an indication of the duration of the episode. In some embodiments, the representations and/or the textual descriptions are selectable to begin playback of the respective episode (e.g., such as described below with respect to FIG. 6Q).

In some embodiments, the download status indicators (e.g., download status indicator 616-1, 616-2, and 616-3) indicate the download status of the respective episode. For example, a check mark (as shown in FIG. 6C for download status indicators 616-1, 616-2, and 616-3) indicates that the respective episode is downloaded, a download icon indicates that the respective episode is not yet downloaded, and a download progress icon indicates that the respective episode is currently being downloaded. In some examples, user interface 610 would not display a download icon on any of the entries (e.g., because each entry in user interface 610 corresponds to an already downloaded episode).

In some embodiments, if episodes of multiple seasons are downloaded, then user interface 610 organizes the downloaded episodes into respective seasons. For example, in FIG. 6C, user interface 610 includes a section for season 1, which includes the entries for episode 1 and episode 2 of season 1, and a section for season 2, which includes the entry for episode 5 of episode 2.

In some embodiments, user interface 610 includes one or more download affordances, such as download affordance 618, for initiating a process to download additional episodes of Show A. In some embodiments, each season can include its own download affordance for downloading additional episodes from the respective season of Show A. In some embodiments, a download affordance is displayed in user interface 610 only if one or more episode download criteria are satisfied. In some embodiments, the one or more episode download criteria additionally or alternatively include a requirement that the episode that is immediately after one or more of the downloaded episodes for the respective season is available to download. In some embodiments, the one or more episode download criteria additionally or alternatively include a requirement that the user is entitled to download the respective episode (e.g., the episode immediately after the one or more downloaded episodes). For example, in FIG. 6C, because episode 1 and episode 2 of season 1 have been downloaded, the criteria include a requirement that episode 3 is available to download and that the user is entitled to access and download episode 3 (e.g., a user profile associated with the user indicates that the user has entitlement to access and download episode 3). As shown in FIG. 6C, because all episodes of season 1 are available to download (e.g., episode 3 is available to download and the user is entitled to download episode 3), user interface 610 includes download affordance 618 for downloading additional episodes of season 1. In some embodiments, download affordance 618 is selectable to initiate a process to download additional episodes of Show A, is selectable to initiate a process to download additional episodes of season 1 of Show A, or is selectable to initiate a process to download episode 3 of season 1 of Show A.

As described above, in some embodiments, each season can have its own download affordance and thus its own episode download criteria for displaying its respective download affordance. In FIG. 6C, because episode 5 of season 2 has been downloaded, the one or more episode download criteria for season 2 include a requirement that episode 6 is available to download and/or the user has entitlement to access and download episode 6. As shown in FIG. 6C, episode 6 of season 2 is not available for download. Thus, user interface 610 does not include a download affordance for season 2 (e.g., for downloading additional episodes of season 2).

In some embodiments, as will be described in more detail below with respect to FIGS. 6L-6W, user interface 610 includes an "Up Next" region that suggests an episode to download. In FIG. 6C, because the currently active user profile indicates that the user has not watched episode 5 of season 2 (e.g., the latest downloaded episode of season 2), user interface 610 does not include the "Up Next" region. Further details of the "Up Next" region will be described below with respect to FIGS. 6L-6W.

FIG. 6D illustrates an alternative embodiment of user interface 610 in which episode 6 of season 2 is available to download. As discussed above, because episode 5 of season 2 is downloaded on device 500, the one or more episode download criteria for season 2 include a requirement that episode 6 is available to download and that the user has entitlement to access and download episode 6 (e.g., a subscription that enables access and download of episode 6 has been purchased on the user's user profile). In FIG. 6D, because episode 6 is available to download and the user has entitlement to download episode 6, user interface 610 includes download affordance 618-2 that is selectable initiate a process to download additional episodes of season 2 of Show A, or is selectable to initiate a process to download episode 5 of season 2 of Show A.

In some embodiments, the one of more episode download criteria include a requirement that at least one episode of the season is available for download and has not been downloaded (e.g., any episode in the season, instead of the requirement that the episode immediately after the one or more downloaded episodes is available to download). For example, in FIG. 6D, if any of episodes 1-4 of season 2 are available for download, but episode 6 is not available for download, then user interface 610 includes download affordance 618-2 because there is still a downloadable episode that has not been downloaded (e.g., episodes 1-4), even though the episode immediately after the downloaded episodes is not available for download (e.g., episode 6).

In FIG. 6E, a user input 603 is received selecting download affordance 618-1 associated with season 1. In some embodiments, in response to receiving the user input, device 500 initiates a process to download additional episodes of season 1 of Show A and displays user interface 620, as shown in FIG. 6F. In some embodiments, user interface 620 is a user interface associated with Show A (e.g., a different user interface than user interface 610, which is associated with downloaded episodes from Show A). In some embodiments, user interface 620 includes information and content associated with Show A. In some embodiments, user interface 620 is the same as, similar to, or shares characteristics of user interface 800 described below with respect to FIG. 8. In FIG. 6F, user interface 620 includes a season selector 622, representations of one or more episodes in the respective season (e.g., representation 624-1 corresponding to episode 3 and representation 624-2 corresponding to episode 4), and trailer 628. In some embodiments, season selector 622 is selectable to display (optionally in a drop-down menu) one or more seasons in Show A, which are selectable to display the episodes of the respective season. In FIG. 6F, because season 1 is selected (as shown by season selector 622 displaying "Season 1"), the episodes of season 1 are displayed in user interface 620. In some embodiments, selecting another season in the season selector drop-down menu causes user interface 620 to replace the list of episodes in season 1 with a list of episodes in the newly selected season. In some embodiments, representation 624-1 corresponding to episode 3 is a still image, animation, video, or any other suitable graphic associated with the episode 3. In some embodiments, textual description 626-1 includes an indication of the episode number, the episode name, and a description of episode 3. In some embodiments, the entry for episode 3 includes a download affordance 627 that is selectable to initiate a process for downloading episode 3, as will be described below with respect to FIGS. 6I-6J. Similarly, representation 624-2 is a still image, animation, video, or any other suitable graphic associated with episode 4 and textual description 626-2 includes an indication of the episode number, episode name, and a description of episode 4. In some embodiments, the row of episodes is horizontally scrollable (e.g., via a horizontal swipe gesture on the touch screen) to display other episodes in season 1 (e.g., rightward swipe to reveal episodes before episode 3 and leftward swipe to reveal episodes after episode 4). In some embodiments, trailer 628 is a representation that is selectable to cause playback of a trailer associated with Show A. In some embodiments, user interface 620 includes representations of content related to Show A, representations of the cast and/or crew of Show A, etc.

In FIG. 6F, user interface 620 is automatically navigated (e.g., scrolled) downwards to reveal the portion of user interface 620 including the list of episodes (e.g., user interface 620 can be scrolled upwards to reveal portions of user interface 620 above what is shown in FIG. 6F). Additionally, as shown in FIG. 6F, in response to user input 603, the list of episodes is automatically navigated (e.g., horizontally scrolled) to display the episode immediately after the already downloaded episodes (e.g., episode 3, because episode 1 and episode 2 are already downloaded). In some embodiments, because the user selected download affordance 618-1 associated with season 1, user interface 620 is configured to display the respective episode from season 1 (e.g., season selector 622 is selecting season 1 and user interface 620 is navigated to display episode 3 of season 1). In some embodiments, if the user selected download affordance 618-2 associated with season 2, then user interface 620 would be configured to display the appropriate episode from season 2, as will be described in further detail with respect to FIGS. 6G-6H. Thus, in some embodiments, device 500 automatically navigates user interface 620 (optionally away from the default view of user interface 620) in response to the input detected in FIG. 6E to reveal download affordance 627 to download episode 3 (e.g., the episode after the downloaded episodes).

FIGS. 6G-6H illustrate an embodiment in which a user selects the download affordance for a different season. In FIG. 6G, user input 603 is received selecting download affordance 618-2 associated with season 2. In some embodiments, in response to receiving the user input, device 500 initiates a process to download additional episodes of season 2 of Show A and displays user interface 620, as shown in FIG. 6H. As shown in FIG. 6H, user interface 620 is automatically navigated such that season 2 is selected by season selector 622 (e.g., as shown by season selector 622 displaying "Season 2") such that the list of episodes is displaying the episodes of season 2. For example, in FIG. 6H, user interface 620 includes representation 624-3 corresponding to episode 6 of season 2 and representation 624-4 corresponding to episode 7 of season 2. As shown in FIG. 6H, the list of episodes is automatically navigated (e.g., horizontally scrolled) to display episode 6. Episode 6 is the episode immediately after the already downloaded episodes of season 2 (e.g., episode 5). Thus, in some embodiments, user interface 620 is automatically navigated to reveal download affordance 630 to download episode 6.

In FIG. 6I, user input 603 is received selecting download affordance 630. In some embodiments, in response to the user input, device 500 initiates a process to download episode 6 on device 500. In FIG. 6J, after download of episode 6 is completed, download affordance 630 is updated to display a check mark (e.g., similar to FIG. 6C) to indicate that episode 6 has been downloaded. Thus, in response to the user input, episode 6 is downloaded without navigating to or displaying another user interface.

FIG. 6K illustrates user interface 610 after episode 6 of season 2 has been downloaded (as described above with respect to FIGS. 6H-6J). In FIG. 6K, user interface 610 now displays an entry for episode 6 of season 2 because episode 6 of season 2 is now downloaded on device 500. Thus, user interface 610 includes representation 612-4, textual description 614-4, and download status indicator 616-4 corresponding to episode 6 of season 2. Similarly, if an episode is removed from device 500 (e.g., deleted), user interface 610 is updated to remove the corresponding entry. In some embodiments, the download status indicator (e.g., download status indicators 616-1, 616-2, 616-3, and 616-4) is selectable to initiate a process to remove the respective episode from device 500 (optionally display an overlay that includes a selectable option to confirm removal of the respective episode).

FIGS. 6L-6W illustrate an embodiment of user interface 610 that includes a suggested episode for download. In FIG. 6L, device 500 displays user interface 610 including the representations of downloaded episodes described above with respect to FIGS. 6A-6K. In FIG. 6L, episode 5 and episode 6 of season 2 are downloaded on device 500 (e.g., as described above in FIG. 6K), episode 7 of season 2 is available for download, and the user profile associated with device 500 has completed playback of episode 6 of season 2.

In some embodiments, in accordance with a determination that episode 7 of season 2 is available for download and the user profile indicates that the user has completed watching episode 6 of season 2 (e.g., episode 6 of season 2 has completed playback while the user's profile is active on device 500 or another device), user interface 610 includes a suggested episode to download. In some embodiments, the suggested episode to download is displayed above the currently downloaded episodes (e.g., in an "Up Next" region of user interface 610).

As shown in FIG. 6L, the suggested episode to download is episode 7 of season 2, the next episode after the downloaded episode that the user has most recently watched. Thus, device 500 suggests to the user the episode immediately after the most recently watched episode that has been downloaded on device 500. For example, if the user most recently watched episode 6 of season 2 (e.g., if device 500 or another device's most recently played episode while the user's profile is active is episode 6 of season 2) and episode 6 of season 2 is downloaded on device 500 (while the user's user profile is active), then the suggested episode to download is episode 7 of season 2. On the other hand, if the user's most recently watched episode is episode 2 of season 1, then even though the user has downloaded episode 5 of season 2 (and optionally even if the user has watched episode 5 of season 2, but before the user then watched episode 2 of season 1), the suggested episode to download is episode 3 of season 1. Thus, in some embodiments, device 500 always suggests the very next episode after the most recently watched episode, regardless of whether the next episode is the furthest episode in the series that the user has watched.

In some embodiments, the suggested episode is not based on the most recently watched episode and is, instead, based on the furthest episode in the series that the user has watched. Thus, in this embodiment, even if the user returned to watch episode 2 of season 1, device 500 will suggest episode 7 of season 2 to download if the furthest episode in the series the user has watched is episode 6 of season 2.

As described above, in some embodiments, the representation of the suggested episode to download is displayed only in accordance with a determination that one or more suggested episode download criteria are satisfied. In some embodiments, the one or more suggested episode download criteria include a requirement that the user's most recently watched (e.g., completed watching) episode (or the user's furthest watched episode) is an episode that is downloaded on device 500. In some embodiments, the one or more suggested episode download criteria additionally or alternatively include a requirement that the episode after the most recently watched episode is not already downloaded on device 500. In some embodiments, the one or more suggested episode download criteria additionally or alternatively include a requirement that the suggested episode to download is available to download. In some embodiments, the one or more suggested episode download criteria additionally or alternatively include a requirement that the user is entitled to access and download the suggested episode to download.

Returning to FIG. 6L, the entry of the suggested episode for download includes representation 612-5, textual description 614-5, and download affordance 616-5. In some embodiments, representation 612-5 is a still image, animation, video, or any other suitable graphic associated with episode 7 of season 2. In some embodiments, representation 612-5 is displayed with a visual characteristic different from the visual characteristic of representations 612-1 and 612-2. For example, in FIG. 6L, representation 612-5 is displayed with a gray tint (or grayscale) as compared to representations 612-1 and 612-2. In some embodiments, representation 612-5 is displayed with the gray tint because the respective episode has not been downloaded. In some embodiments, textual description 614-5 includes a title of the respective episode, an indication of the respective season and episode of the entry, and/or an indication of the duration of the episode. In some embodiments, representation 612-5 and/or textual description 614-5 are selectable to cause playback of the respective episode (e.g., episode 7 of season 2) without downloading the respective episode. In some embodiments, representation 612-5 and/or textual description 614-5 are selectable to initiate a process to download the respective episode. In some embodiments, download affordance 616-5 is similar to download affordance 627 and/or download affordance 630 and is selectable to initiate a process to download episode 7 of season 2.

For example, in FIG. 6M, user input 603 is received selecting download affordance 616-5. In some embodiments, in response to the user input, device 500 initiates a process to download episode 7 of season 2 on device 500, as shown in FIG. 6N. In FIG. 6N, download affordance 616-5 is updated to indicate the download progress of episode 7 of season 2. In some embodiments, while downloading, download affordance 616-5 displays a circular progress indicator. In some embodiments, while downloading download affordance 616-5 is selectable to pause and/or cancel the download of episode 7. In some embodiments, after download of episode 7 completes, download affordance 616-5 is updated to display a check mark (e.g., similar to FIG. 6C) to indicate that episode 7 has been downloaded, as shown in FIG. 6O. Thus, in response to the user input, episode 7 is downloaded without navigating to or displaying another user interface.

As shown in FIG. 6O, in some embodiments, after episode 7 of season 2 has been downloaded, device 500 maintains display of the entry for episode 7 in the "Up Next" region of user interface 610. In some embodiments, representation 612-5 is updated such that it no longer has a gray tint (e.g., because the episode is now downloaded), and is displayed with a same appearance (e.g., color, shading, etc.) as the other representations of episodes in user interface 610. In some embodiments, representation 612-5 maintains a gray tint, even after downloading completes. In some embodiments, representation 612-5 maintains a gray tint for a threshold amount of time (e.g., 1 second, 3 seconds, 5 seconds, 10 seconds, etc.) after downloading completes before representation 612-5 is modified to no longer have a gray tint. In FIG. 6O, episode 8 of season 2 is not available to download (e.g., the user is not entitled to access and download episode 8 of season 2 or episode 8 of season 2 is not available to the public to download). Thus, in accordance with a determination that episode 8 of season 2 is not available to download, download affordance 618-2 is no longer displayed in user interface 610. In some embodiments, because episode 7 of season 2 has been downloaded and episode 8 of season 2 is not available to download, the requirement that the episode immediately after the one or more downloaded episodes for the respective season is available to download is no longer satisfied.

In some embodiments, after episode 7 of season 2 has been downloaded, if episode 8 of season 2 is available to download (e.g., the user is entitled to access and download episode 8 of season 2 and/or episode 8 of season 2 is available to the public to download), then download affordance 618-2 is maintained in user interface 610. In such embodiments, if season 8 of season 2 is available, then the requirement that an episode immediately after the downloaded episodes for the respective season is available to download remains satisfied. In such embodiments, download affordance 618-2 is selectable to display user interface 620 navigated to episode 8 of season 2.

In FIG. 6P, user input 603 is received selecting representation 612-5 corresponding to episode 7 of season 2 after the episode has been downloaded. In some embodiments, in response to the user input, device 500 begins playback of episode 7 of season 2, as shown in FIG. 6Q. In some embodiments, because episode 7 of season 2 has been downloaded on device 500, playback is achieved using the downloaded version (e.g., as opposed to streaming from an external content provider). In FIG. 6Q, device 500 displays user interface 640 corresponding to a content playback user interface for playing episode 7 of season 2. In some embodiments, user interface 640 is a user interface of the content browsing and playback application. In some embodiments, user interface 640 is a system user interface (e.g., a user interface associated with the device and not any application in particular). In some embodiments, user interface 640 is a content playback user interface of a content provider application (e.g., an application associated with a content provider for accessing and viewing content provider by the respective content provider). In some embodiments, user interface 640 includes one or more options for controlling playback of the content item. For example, in FIG. 6Q, user interface 640 includes exit affordance 632 that is selectable to end playback of the episode. In some embodiments, the one or more options are not always displayed in user interface 640 and can cease to be displayed after a threshold amount of time of no input activity on the touch screen (e.g., 2 seconds, 4 seconds, 6 seconds, 10 seconds, etc.).

In FIG. 6R, after partially playing episode 7 of season 2, user input 603 is received on exit affordance 632. In some embodiments, in response to the user input, device 500 ends playback of episode 7, as shown in FIG. 6S. In FIG. 6S, after exiting playback, device 500 displays the user interface that was displayed before playback began (e.g., user interface 610). As shown in FIG. 6S, once playback of episode 7 begins, episode 7 is no longer the "Up Next" episode and thus a representation of episode 7 is no longer displayed in the "Up Next" section and is optionally moved to its appropriate location in the season 2 section (e.g., user interface 610 optionally no longer has an "Up Next" section). In some embodiments, because the user did not complete playback of episode 7, the user's most recently watched (and completed) episode is episode 6 and episode 7 (e.g., the next episode after the most recently watched episode) is already downloaded on device 500.

In some embodiments, even if device 500 had not downloaded episode 7 on device 500, if the user partially watches episode 7 (e.g., by selecting representation 612-5 without first downloading episode 7), then the entry for episode 7 is removed from display in user interface 610. In some embodiments, if device 500 had not downloaded episode 7 on device 500 and the user selects representation 612-5 to begin playback of episode 7 but does not complete playback, then the entry for episode 7 is maintained in the "Up Next" section (e.g., to continue to give the user the opportunity to download episode 7).

In FIG. 6T, a user input 603 corresponding to an upward swipe is received. In response to the upward swipe input, device 500 scrolls user interface 610 upwards, as shown. In some embodiments, because episode 7 of season 2 has been downloaded on device 500, episode 7 is added to the list of downloaded episodes in the season 2 section. Thus, in some embodiments, after downloading and partially watching episode 7 of season 2, the entry for episode 7 is moved to its respective position in the list of downloaded episodes.

In FIG. 6U, a user input 603 is received selecting representation 612-5. In some embodiments, in response to receiving the user input, device 500 continues playback of episode 7 of season 2, as shown in FIG. 6V. In FIG. 6V, device 500 displays user interface 640 corresponding to a content playback user interface for playing episode 7 of season 2. As shown in FIG. 6V, playback of episode 7 continues from the previous position that playback ended (e.g., 12:00 minutes into episode 7).

In FIG. 6W, device 500 is displaying user interface 610 after device 500 has completed watching episode 7 of season 2 (e.g., while the user's user profile is active). As shown in FIG. 6W, because episode 8 of season 2 is available to download and the user profile indicates that the user has watched (completed watching) episode 7 of season 2, user interface 610 includes episode 8 of season 2 as a suggested episode to download (e.g., in the "Up Next" portion). In some embodiments, as shown, a maximum of one episode is displayed in the "Up Next" portion of user interface 610 at any time (e.g., either there is no "Up Next" portion or one episode is displayed in the "Up Next" portion). In some embodiments, a plurality of episodes is displayed in the "Up Next" portion of the user interface 610. For example, one episode can be displayed for each season based on the user's viewing history for the respective season (e.g., if the user has watched up to episode 4 of season 1, then the "Up Next" portion of user interface 610 can have an entry for episode 5 of season 1, and if the user has watched up to episode 2 of season 2, then the "Up Next" portion of user interface 610 can concurrently have an entry for episode 3 of season 2).

Thus, as described above, in some embodiments, in accordance with a determination that one or more first criteria are satisfied, user interface 610 includes one or more affordances (such as download affordance 618-1 and download affordance 618-2) that are selectable to display a user interface associated with the respective show (e.g., the show's product page, the show's canonical page, a page dedicated to the show, etc.), from which the user is able to download additional episodes of the show. In some embodiments, in accordance with a determination that one or more second criteria are satisfied, user interface 610 includes a suggested episode to download and a download affordance (such as download affordance 616-5 and 616-6) that is selectable to begin download of the suggested episode (e.g., without first navigating to another user interface).

In some embodiments, in addition to or alternatively to displaying the next episode as a suggested episode in the "Up Next" region of user interface 610 (e.g., as in FIG. 6L and FIG. 6W), the electronic device automatically downloads the next episode, without requiring a user input to cause download of the episode (e.g., without requiring the user to select a download affordance such as download affordance 616-5 and download affordance 616-6). In some embodiments, in accordance with a determination that one or more criteria are satisfied (e.g., the same criteria that cause display of the suggested episode in the "Up Next" region of user interface 610 and/or the download affordance), the electronic device automatically downloads the suggested episode onto the electronic device. For example, the electronic device automatically downloads the next episode in response to determining that the user has completed watching a previously downloaded episode (e.g., if the user has downloaded season 2 episode 6 but has not yet downloaded season 2 episode 7 and upon completion of playback of season 2 episode 6, the electronic device automatically downloads season 2 episode 7). In some embodiments, user interface 610 does not display a download affordance (e.g., such as download affordance 616-5 in FIG. 6L) and instead, displays a download progress indicator (e.g., such as in FIG. 6N). In some embodiments, upon the download completing, the device displays a check mark to indicate that the episode has finished downloading (e.g., such as in FIG. 6O). In some embodiments, the downloaded episode remains displayed in the "Up Next" region of user interface 610 until the user begins playback of the respective episode, at which point the episode is displayed in the list of downloaded episodes that is optionally organized by seasons (e.g., such as described in FIGS. 6P-6T).

In some embodiments, instead of displaying the suggested episode in the "Up Next" region of user interface 610, because the electronic device is or has automatically downloaded the suggested episode, the suggested episode is displayed at its respective position in the list of downloaded episodes (e.g., such as in FIG. 6T), for example, without requiring the user to at least partially watch the suggested episode.

In some embodiments, the suggested episode is automatically downloaded in response to the user completing playback of the preceding episode (optionally one or more preceding episodes). In some embodiments, the suggested episode is automatically downloaded in response to playback of the preceding episode (optionally one or more preceding episodes) reaching a threshold playback position (e.g., 10 seconds, 30 seconds, 60 seconds, 3 minutes before the end of the media item and/or before the credits).

In some embodiments, upon completion of playback of the one or more preceding episodes (which optionally causes the next episode to be suggested to the user and/or automatically downloaded), the electronic device automatically deletes the completed episode from the electronic device (e.g., deletes the local copy of the one (or more) preceding episode). Thus, in some embodiments, the electronic device avoids increasing the storage usage when automatically downloading episodes. For example, when the user completes playback of season 2, episode 6, and the electronic device automatically begins download of season 2, episode 7, the electronic device optionally deletes the local copy of season 2, episode 6 from local storage. In some embodiments, the previous episode is deleted in response to the next episode beginning automatic download (e.g., as soon as the next episode begins downloading). In some embodiments, the previous episode is deleted in response to the next episode completing automatic download (e.g., when download of the next episode successfully completes). In some embodiments, the previous episode is deleted in response to the user beginning playback of the next episode.

In some embodiments, the above-described automatic download and/or automatic deletion feature is performed on the electronic device only if the criteria that triggered the automatic download and/or automatic deletion is performed at the electronic device. For example, if the user completed playback of season 2, episode 6 using the electronic device, then the electronic device can trigger the automatic download and/or automatic deletion feature described above. However, if the user completed playback of season 2, episode 6 using another device that is logged into the same user profile (e.g., a set-top box, another mobile phone, etc.) as the electronic device, then the electronic device optionally does not trigger the automatic download and/or automatic deletion features. In some embodiments, the above-described automatic download and/or automatic deletion features are performed at the electronic device without regard to whether the actions that caused the criteria to be satisfied were performed at the electronic device or on another electronic device that is logged into the same user profile as the electronic device. For example, watching season 2, episode 6 using a set-top box that is linked to the same user profile as the electronic device can cause the electronic device to automatically download season 2, episode 7 and automatically delete its own local copy of season 2, episode 6.

In some embodiments, a user can have a user profile or user account that stores information about and associated with the user. In some embodiments, a user's viewing history, viewing preferences, purchase history, entitlements, subscriptions, and/or other information is stored on the user's user profile (e.g., stored on the user profile, associated with the user profile, etc.). In some embodiments, device 500 and other electronic devices can be configured with the user's user profile. In some embodiments, when a user's profile is active on a device, the device is configured to access and store data on the user's profile. For example, when a user's profile is active on a device, playback of content on the device is attributed to the user and the user's profile stores the playback in the user's viewing history. In some embodiments, access of content is based on the subscriptions stored in the user profile. For example, a user can subscribe the user's profile to a primary content provider (e.g., purchase the subscription onto the user's account) such that the user profile, when active on a device, allows the device to access content through the primary content provider using the subscription stored on the user's profile. In some embodiments, if a user's profile is inactive on a device (e.g., the profile is disabled, another profile is active, or the user has disabled collection of personal information), then playback of content on the device is not attributed to the user nor is it stored to the user's viewing history (and optionally the device does not access the user's profile to determine entitlement or playback status).

As used herein, determining a user's viewing history (e.g., whether the user has completed watching or partially watched a particular content item) and/or entitlements (e.g., whether the user has purchased access to a particular content item, whether the user has purchased a subscription to a content provider that provides access to content items) can be performed using the data stored on the user's profile. For example, a device can determine whether a user has viewed or partially viewed a particular content item (such as an episode of a show, or all episodes of a particular season of a show, etc.) by accessing the user's viewing history on the user's profile and determining whether the user's profile indicates that the user has viewed or partially viewed the content item. Similarly, in some embodiments, a device can determine whether a user is entitled or not entitled to access content is based on whether the user's profile indicates that the user does or does not have entitlement (e.g., using the entitlement or subscription information is stored in the user profile). Thus, as used herein, a user having watched or not having watched a content item and a user having or not having entitlement to content can be determined based on whether the active user profile (that is associated with the user) indicates that the user has watched the content item or has purchased entitlement to content.

Figure 7:
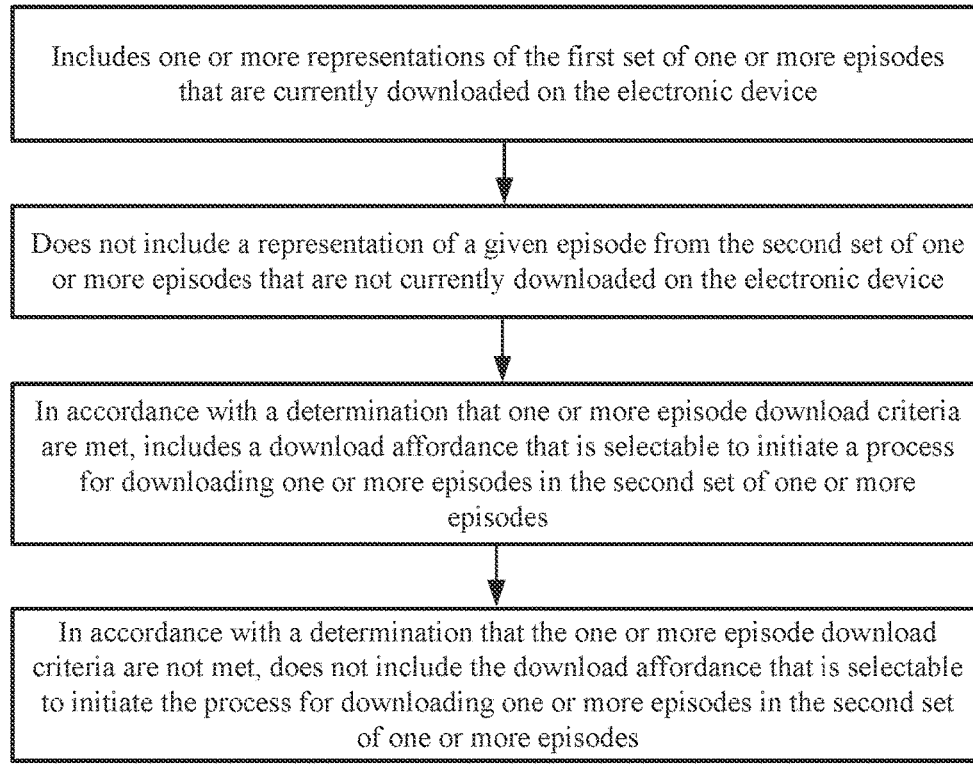
FIG. 7 is a flow diagram illustrating a method of providing user interfaces for downloading episodes of episodic content series in accordance with some embodiments of the disclosure.

FIG. 7 is a flow diagram illustrating a method 700 of providing user interfaces for downloading episodes of episodic content series in accordance with some embodiments of the disclosure. The method 700 is optionally performed at an electronic device such as device 100, device 300, device 500, and device 511 as described above with reference to FIGS. 1A-1B, 2-3, 4A-4B and 5A-5B. Some operations in method 700 are, optionally combined and/or the order of some operations is, optionally, changed.

As described below, the method 700 provides user interfaces for downloading episodes of episodic content series. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., Apple TV, Mac, or iOS device, such as device 100, device 300, device 500, and/or device 511) in communication with a display generation component and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) displays (702), via the display generation component, a user interface associated with an episodic series of content, such as user interface 610 in FIG. 6C (e.g., a user interface for a particular episodic series of content that indicates the episodes that the user has downloaded to the electronic device), wherein the episodic series of content includes a plurality of episodes from a given season of the episodic series of content, including a first set of one or more episodes that are currently downloaded on the electronic device and a second set of one or more episodes that are not currently downloaded on the electronic device (e.g., one or more episodes of the episodic series of content are accessible on the electronic device).

In some embodiments, a display generation component is a display integrated with the electronic device (optionally a touch screen display) and/or an external display such as a monitor, projector, television, etc.

In some embodiments, the user interface is a dedicated user interface for displaying downloaded content (e.g., a user interface that displays only downloaded content and does not display content that has not been downloaded). In some embodiments, the user interface is a product page for the episodic series of content (which optionally includes information about the episodic series of content) and includes a portion that displays episodes that have been downloaded. In some embodiments, once an episode is downloaded on the electronic device, the user is able to playback the respective episode without an active connection to an external content server. In some embodiments, a user is able to playback a respective episode without first downloading the episode. In such embodiments, a user is able to receive content streamed from a content server.

In some embodiments, the user interface includes one or more representations of the first set of one or more episodes that are currently downloaded on the electronic device (704), such as season 1 episode 1 and 2 and season 2 episode 5 in FIG. 6C (e.g., the user interface displays only episodes that have been downloaded). In some embodiments, the downloaded content spans multiple seasons and is organized into different seasons (e.g., different regions of the user interface display downloaded episodes from different seasons of the episodic series of content). In some embodiments, the downloaded content are all within a single season and the user interface does not included different regions for different seasons (e.g., the user interface only includes one region for the single season, or the user interface does not include any region identifying the single season).

In some embodiments, a season of an episodic series of content is a set of episodes organized together and defined as a "season". In some embodiments, which episodes are in a season and the number of episodes in a season are predetermined by the content provider (e.g., distributor or producer of the series). In some embodiments, a season is a collection of episodes that are released within a predetermined time frame (e.g., from September to May, during a "fall" season, during a "spring" season, during a calendar year, within a year, within half a year, etc.). In some embodiments, a season is a collection of episodes within a particular story arc (e.g., narrative arc). In some embodiments, a season can have any number of episodes (e.g., such as a traditional season which typically has 22 to 24 episodes, a miniseries, a limited series, etc.). It is understood that although this disclosure uses the term "seasons", other terminology used around the world can refer to the same concept, such as the term "series" (e.g., series 1 and series 2, instead of season 1 and season 2, etc.).

In some embodiments, the user interface does not include a representation of a given episode from the second set of one or more episodes that are not currently downloaded on the electronic device (706), such as season 2 episodes 1-4 in FIG. 6C (e.g., the user interface does not display at least one episode of the given season that has not been downloaded on the device). In some embodiments, the user interface only displays episodes that have been downloaded and does not display any episodes that have not been downloaded.

In some embodiments, in accordance with a determination that one or more episode download criteria are met, the user interface includes a download affordance that is selectable to initiate a process for downloading one or more episodes in the second set of one or more episodes (708), such as download affordance 618 in FIG. 6C and download affordance 616-5 in FIG. 6L (e.g., a link or button that is selectable to initiate a process to download more episodes of the episodic series of content to the electronic device).

In some embodiments, the one or more episode download criteria include a requirement that there is an episode in the episodic series of content that the user has not downloaded to the electronic device. In some embodiments, the one or more episode download criteria include a requirement that the undownloaded episode is for a season that the user has watched. In some embodiments, the one or more episode download criteria include a requirement that the undownloaded episode is after the latest watched episode for a particular season. In some embodiments, the one or more episode download criteria include a requirement that the user has credentials to download and/or watch the respective episode and/or series. In some embodiments, the one or more episode download criteria include a requirement that the undownloaded episode is available to be downloaded.

In some embodiments, the downloaded content is organized into seasons and each season is displayed with a selectable link to download additional episodes for the respective season. In some embodiments, the download affordance is a download icon that is selectable to download the next episode that the user has not yet watched or downloaded. In some embodiments, if the one or more episode download criteria are not satisfied, the download affordance is not displayed. In some embodiments, each download affordance has its own episode download criteria which, when satisfied, causes the respective download affordance to be displayed (e.g., the download affordance for each season has its own criteria that must be satisfied for the respective download affordance for the respective season to be displayed).

In some embodiments, in accordance with a determination that the one or more episode download criteria are not met, the user interface does not include the download affordance that is selectable to initiate the process for downloading one or more episodes in the second set of one or more episodes (710), such as the lack of download affordance 618-2 for season 2 in FIG. 6C (e.g., if the episode download criteria are not met, do not display a download affordance for downloading additional episodes of the episodic series of content). For example, if the user does not have entitlement to access and/or download episodes of the episodic series of content or if the user has downloaded all available episodes of the episodic series of content, the user interface does not include the download affordance.

The above-described manner of displaying a download affordance for downloading additional episodes of an episodic series of content (e.g., by conditionally displaying a download affordance that is selectable to download additional episodes) provides the user with a quick and efficient manner of downloading episodes that the user is likely to download next (e.g., by displaying the download affordance for shows that the user has previously watched and/or downloaded but not displaying the download affordance if the user is not likely to or unable to download more episodes), which simplifies the interaction between the user and the electronic device and enhances the operability of the electronic device and makes the user-device interface more efficient (e.g., by providing the user with an option for downloading additional episodes on the user interface of downloaded episodes in situations when it is likely that the user will download an episode, without requiring the user to perform additional inputs to navigate to the series' product page or another user interface for downloading episodes), which additionally reduces power usage and improves battery life of the electronic device by enabling the user to use the electronic device more quickly and efficiently while reducing errors in the usage of the device.

In some embodiments, the plurality of episodes from the given season of the episodic series of content comprises a sequence of episodes, such as the episodes in season 1 or the episodes in season 2 in FIG. 6C (e.g., the episodes from the given season are arranged in a logical or numerical sequence). In some embodiments, the sequence is arranged chronologically based on release date of the episode such that an episode before a respective episode in the sequence was released before the respective episode and an episode after the respective episode in the sequence was released after the respective episode. For example, episode 1 is arranged before episode 2, which is arranged before episode 3, and so on and so forth. In some embodiments, the sequence is arranged based on an ordering provided by the content provider or producer of the episodic series of content (optionally regardless of release date of the respective episodes in the season).

In some embodiments, the one or more episode download criteria includes (e.g., the episode download criteria includes at least one of the following requirements) a requirement that a user of the electronic device has entitlement to download the one or more episodes in the second set of one or more episodes, such as described in FIG. 6C (e.g., the user has a subscription to a content provider that provides the episodic series of content that enables the user to access and download episodes of the episodic series of content).

In some embodiments, the user has entitlement if the user has purchased access to the episodic series of content (e.g., purchased access to individual episodes, purchased access to the given season, or purchased access to the entire series). In some embodiments, the electronic device determines whether the user has entitlement based on the user's purchase profile or subscription information. In some embodiments, the electronic device determines entitlement by determining whether the subscription or purchase information associated with the user's profile (e.g., the user's account) provides the user with access to download the second set of one or more episodes. In some embodiments, certain subscriptions provide entitlement to access and watch respective episodes but does not provide access to download episodes. In some embodiments, a subscription to a primary content provider provides the user with entitlements to access and download content from secondary content providers. In some embodiments, different levels of subscriptions to a primary content provider provides varying entitlements to a varying number of secondary content providers. In some embodiments, a primary content provider is a provider that bundles together content from a plurality of secondary content providers and sells the bundle as a package (e.g., as a subscription). In some embodiments, a primary content provider or secondary content providers can sell individual content items (e.g., a la carte), the purchase of which provides the user with entitlement to access and download the purchased content item.

In some embodiments, the one or more episode download criteria additionally or alternatively includes a requirement that the user of the electronic device has viewed a respective episode in the first set of one or more episodes, previous to an episode in the second set of one or more episodes in the sequence of episodes of the plurality of episodes, such as the user having viewed episode 6 of season 2 as described in FIG. 6L (e.g., the user has completed watching a respective downloaded episode that is immediately before an undownloaded episode).

For example, the requirement is satisfied if the user has downloaded and watched episode 3 and episode 4 is not downloaded. In some embodiments, the criteria includes a requirement that the undownloaded episode has not been watched (e.g., episode 4 has not been watched). In some embodiments, the criteria includes an additional requirement that the respective episode is the furthest watched downloaded episode. For example, if the user has downloaded episode 1 through 3, then the criteria includes a requirement that the user has watched episode 3 (e.g., the furthest downloaded episode that is immediately before an undownloaded episode, episode 4). In some embodiments, if the user has not watched a downloaded episode immediately before an undownloaded episode, then the user interface does not include the download affordance. In some embodiments, if the user has satisfied this requirement (and optionally the other requirements in the episode download criteria), then the download affordance is displayed and is selectable to initiate a process to download the undownloaded episode that is next after the respective episode (e.g., episode 4 in the examples discussed above).

In some embodiments, the one or more episode download criteria additionally or alternatively includes a requirement that the one or more episodes in the second set of one or more episodes are available for download, such as described in FIG. 6C (e.g., an undownloaded episode is available for download).

In some embodiments, an undownloaded episode is not available for download if the user is not entitled to download the episode (e.g., does not have a subscription to a content provider that provides access to the episode or has not purchased access to the episode). In some embodiments, an undownloaded episode is not available for download if the episode is not yet released. In some embodiments, an undownloaded episode is not available for download if the content provider does not allow for download of the undownloaded episode. In some embodiments, an episode is not available for download if the user has already downloaded the episode on the device. In some embodiments, other conditions can cause an episode to not be available for download. In some embodiments, the criteria includes a further requirement that the undownloaded episode that is immediately after the respective episode (e.g., episode 4 in the example described above) is available for download. In some embodiments, if the undownloaded episode that is immediately after the respective episode is not available for download, the user interface does not include the download affordance.

In some embodiments, the episode download criteria includes any combination of the above requirements. In some embodiments, how the requirements below are satisfied can cause different episodes to be selected as the episode to be downloaded. For example, if a respective episode is not available to be downloaded, the system may select another episode that is available to be downloaded.

The above-described manner of displaying a download affordance for downloading additional episodes (e.g., only if additional episodes are available for download, the user has entitlement to download, and/or the user has viewed the already downloaded episodes) provides the user with a quick and efficient manner of downloading episodes that the user is likely and able to download next (e.g., by only displaying the download affordance if the episode that the user is likely to watch next is not downloaded and is available to download and not displaying the download affordance if the user is not likely to download additional episodes), which simplifies the interaction between the user and the electronic device and enhances the operability of the electronic device and makes the user-device interface more efficient (e.g., without providing the user with a download affordance that the user is likely not to use or requiring the user to perform additional inputs or navigate to another user interface to determine whether additional episodes are available to download), which additionally reduces power usage and improves battery life of the electronic device by enabling the user to use the electronic device more quickly and efficiently while reducing errors in the usage of the device.

In some embodiments, while displaying the user interface including the download affordance, the device receives, via the one or more input devices, a user input selecting the download affordance, such as the selection of download affordance 618-1 in FIG. 6E and the selection of download affordance 616-5 in FIG. 6M (e.g., a user input selecting the link or download icon for downloading additional episodes).

In some embodiments, in response to receiving the user input selecting the download affordance, the device initiates a process for downloading the one or more episodes in the second set of one or more episodes, such as the display of user interface 620 scrolled to display download affordance 627 for downloading episode 3 of season 1 in FIG. 6F and beginning download of episode 7 of season 2 in FIG. 6N (e.g., initiating download of an episode that a user has not downloaded or watched, or displaying a product page for the episodic series of content from where the user is able to download the episode). In some embodiments, the episode to be downloaded is the next episode after an episode that the user has previously watched. In some embodiments, the product page is automatically scrolled/navigated to the episode to be downloaded (e.g., the next episode after the latest episode the user has watched) such that the user is able to download that next episode without needing to further navigate the product page (e.g., optionally by displaying an animation scrolling the product page from the top of the product page to the respective portion of the product page that displays the next episode). In some embodiments, automatically scrolling to the episode includes automatically vertically scrolling the user interface to the list of available episodes and automatically horizontally scrolling through the list of episodes to reach the episode to be downloaded. In some embodiments, the product page for the episodic series of content includes a list of the available episodes and/or the available seasons of the series. In some embodiments, the product page includes selectable options for downloading respective episodes or causing playback of respective episodes. In some embodiments, the product page provides information on how to watch respective episodes of the series (e.g., the content provider, the broadcast times, etc.). In some embodiments, the product page includes selectable options for purchasing access to respective episodes, to respective seasons, or to the entire series as a whole. In some embodiments, the product page includes information about the series, such as cast and crew information, related shows, ratings information, a description, a representative image or video, trailers, and/or bonus content, etc.

In some embodiments, the process for downloading the one or more episodes in the second set of one or more episodes includes, in accordance with a determination that a second episode in the second set of one or more episodes should be next to be downloaded (e.g., the first set of one or more episodes includes a first episode of the plurality of episodes and not a second episode of the plurality of episodes), displaying, via the display generation component, a first portion of a second user interface associated with the episodic series of content (e.g., a product page or canonical page associated with the episodic series of content), different from the user interface associated with the episodic series of content, wherein the first portion of the second user interface includes a representation of the second episode and a first selectable option that is selectable to initiate a process to download the second episode to the electronic device, such as the display of user interface 620 scrolled to display download affordance 627 for downloading episode 3 of season 1 in FIG. 6F (e.g., the product page is automatically scrolled to the portion of the user interface that includes a representation of the second episode, such as episode 2 in the example described above).

For example, the episodes that are downloaded on the device includes episode 1, but not episode 2. In some embodiments, the second episode should be next to be downloaded if the user has downloaded the episode before the second episode but not the second episode. In some embodiments, the second episode should be next to be downloaded regardless of the user's watch history (e.g., regardless of whether the user has watched the second episode, whether the user has watched the episode before the second episode, whether the user has watched any of the episodes of the series, etc.).

In some embodiments, the product page is different from the dedicated user interface for downloaded content. In some embodiments, the product page displays all available episodes in the series, without regard to whether respective episodes are downloaded or not downloaded. In some embodiments, the second user interface associated with the episodic series of content displays all available episodes in a given season in the series, without regard to whether the respective episodes are downloaded or not downloaded (e.g., the second user interface includes representations of the first set of episodes and representations of the second set of episodes).

In some embodiments, the second episode is an undownloaded episode that is the next episode after the first episode.

In some embodiments, displaying the first portion includes horizontally scrolling the list of episodes to display the second episode (e.g., the representation of the second episode is displayed at the front of the list of episodes), for example, at a leading position in a scrollable row of episodes. In some embodiments, the product page is automatically scrolled such that the user is able to download that next episode without needing to further navigate the product page (e.g., optionally by displaying an animation scrolling the product page from the top of the product page to the respective portion of the product page). In some embodiments, if the episodic series of content has multiple seasons, then the product page is configured to display the respective season of which the second episode is a part (e.g., without displaying the episodes of other seasons unless and until the user provides additional input to display those episodes). In some embodiments, the representation of the second episode is accompanied by a download affordance that is selectable to begin download of the second episode. In some embodiments, the download affordance is displayed only if the user is entitled to download the second episode and the second episode is available for download.

In some embodiments, the process for downloading the one or more episodes in the second set of one or more episodes includes, in accordance with a determination that a third episode in the second set of one or more episodes should be next to be downloaded (e.g., the first set of one or more episodes includes the first episode of the plurality of episodes and the second episode of the plurality of episodes), displaying, via the display generation component, a second portion of the second user interface, different from the first portion, wherein the second portion of the second user interface includes a representation of the third episode and a second selectable option that is selectable to initiate a process to download the fourth episode to the electronic device, similar to the display of user interface 620 scrolled to display download affordance 630 associated with episode 6 of season 2 in FIG. 6H (e.g., display the product page scrolled to a portion of the product page that is different from the first portion of the product page), wherein the third episode is different from the second episode.

For example, the episodes that are downloaded on the device includes episode 1 and episode 2). In some embodiments, the third episode should be next to be downloaded if the user has downloaded the episode before the third episode but not the third episode. In some embodiments, the third episode should be next to be downloaded regardless of the user's watch history (e.g., regardless of whether the user has watched the second episode, whether the user has watched the episode before the second episode, whether the user has watched any of the episodes of the series, etc.).

In some embodiments, the second portion of the product page includes a representation of the third episode (e.g., episode 3 in the example described above). In some embodiments, displaying the first portion includes horizontally scrolling the list of episodes to display the third episode (e.g., the representation of the third episode is displayed at the front of the list of episodes). In some embodiments, scrolling to display the third episode causes the second episode not to be displayed in the list (e.g., the second episode is horizontally scrolled out of the user interface). In some embodiments, the representation of the third episode may still be displayed in the user interface (but not displayed at the front or "head" of the list) based on the number of representations of episodes in the list of episode that are concurrently displayed. For example, if the user interface displays three episodes at a time, then the list of episodes in the second portion includes representations of episodes 3-5. In some embodiments, if the episodic series of content has multiple seasons, then the product page is configured to display the respective season of which the third episode is a part. In some embodiments, the representation of the third episode is accompanied by a download affordance that is selectable to begin download of the third episode. In some embodiments, the download affordance is displayed only if the user is entitled to download the third episode and the third episode is available for download. In some embodiments, displaying the download affordance that is selectable to display the product page is regardless of the user's playback or watch history. In some embodiments, displaying the download affordance that is selectable to display the product page is based at least in part on the user's watch history (e.g., if the has already watched the third episode, even though it is not downloaded, then do not display the download affordance or selecting the download affordance does not initiate a process to download the third episode and optionally initiates a process to download the next episode after the third episode that is not downloaded and has not been watched). In some embodiments, the watch history of the user includes the user's viewing activity on the electronic device. In some embodiments, the watch history of the user includes the user's viewing activity on other electronic devices that have logged into the same user profile and/or account with a content provider as the electronic device. In some embodiments, if the user has downloaded every available downloadable episode, then the user interface does not include the download affordance that is selectable to display the product page.

The above-described manner of navigating the user to a respective portion of the product page (e.g., by automatically navigating to the respective portion of the product page that includes the representation and selectable option for downloading an undownloaded episode) provides the user with a quick and efficient manner of downloading episodes that the user is likely to download next, which simplifies the interaction between the user and the electronic device and enhances the operability of the electronic device and makes the user-device interface more efficient (e.g., without requiring the user to perform additional navigation inputs to find the next episode to download), which additionally reduces power usage and improves battery life of the electronic device by enabling the user to use the electronic device more quickly and efficiently while reducing errors in the usage of the device.

In some embodiments, the process for downloading the one or more episodes in the second set of one or more episodes includes beginning download of a respective episode in the second set of one or more episodes without navigating away from the user interface associated with the episodic series of content, such as the downloading of episode 7 of season 2 in FIG. 6N (e.g., beginning download of the respective episode without navigating to another user interface). In some embodiments, the device initiates the download and maintains display of the user interface associated with the episodic series of content. In some embodiments, while the download is in progress, the user is able to manually navigate away from the user interface to another user interface without causing the download to pause or cancel (e.g., the download continues without interruption even if the user navigates away). In some embodiments, the user interface displays a download progress indication while the download is in progress and updates the indication when download completes to indicate that the download is complete and that the respective episode is now downloaded on the device.

The above-described manner of downloading a respective episode (e.g., by beginning download without displaying another user interface) provides the user with a quick and efficient manner of downloading a particular episode that the user is likely to download next (e.g., by providing shortcut to immediately begin download of the episode), which simplifies the interaction between the user and the electronic device and enhances the operability of the electronic device and makes the user-device interface more efficient (e.g., without requiring the user to navigate to a product page to find the respective episode to download and without displaying another user interface which can be distracting or interrupt the user's browsing session), which additionally reduces power usage and improves battery life of the electronic device by enabling the user to use the electronic device more quickly and efficiently while reducing errors in the usage of the device.

In some embodiments, in accordance with the determination that the one or more episode download criteria are met, the user interface associated with the episodic series of content includes a representation of the respective episode, and the download affordance is displayed with the representation of the respective episode, such as representation 612-5 and download affordance 616-5 in FIG. 6L (e.g., the respective episode is a suggested or recommended episode to download).

In some embodiments, the respective episode is an undownloaded episode that is the next episode after the user's most recently watched episode. For example, if a user has downloaded episodes 3, 4, 5, and 8 of a given season and the user most recently watched episode 3, then the representation is not displayed (because episode 4 is already downloaded, so the episode download criteria is not satisfied). If, on the other hand, the user most recently watched episode 5, then a representation of episode 6 is displayed (because the next episode to watch is episode 6, assuming episode 6 is available for download). If, however, the user watched episode 5, and then skips to and watches episode 8, then even though the user has not watched episodes 6 and 7, the user interface optionally displays a representation of episode 9 because it is the next episode to watch (assuming that episode 9 is available for download). In some embodiments, the representation of the respective episode is displayed with a different visual characteristic than the representations in the user interface of episodes that have been downloaded. For example, the representation is displayed greyed out or de-emphasized as compared to the representations in the user interface of episodes that have been downloaded to visually distinguish the representation of the respective episode, which is not downloaded, from the other representations in the user interface, which correspond to episodes that are downloaded on the device. In some embodiments, the representation of the respective episode is displayed in an "Up Next" region or section. In some embodiments, at most, only one episode is displayed in the "Up Next" at any time. In some embodiments, the respective episode in the "Up Next" region can be an episode from any season of the series based on the user's most recently watched episode. For example, if the user watched episode 3 of season 1 and then watches episode 1 of season 2, then the respective episode is optionally episode 2 of season 2 (provided episode 2 satisfies the one or more episode download criteria).

In some embodiments, in accordance with the determination that the one or more episode download criteria are not met, the user interface associated with the episodic series of content does not include a representation of the respective episode, such as in FIG. 6C (e.g., if the respective episode is not available for download, if the user is not entitled to download the respective episode, and/or there is no respective episode that satisfies the episode download criteria, the user interface does not include the representation of the respective episode).

In some embodiments, if the episode download criteria are not met, the user interface does not include any representation of the respective episode. For example, if the user has not watched a downloaded episode that has an undownloaded episode immediately after it, then the one or more episode download criteria are not met. In some embodiments, if the respective episode is already downloaded on the device (e.g., there is no episode immediately after a watched episode that is not downloaded), then the one or more episode download criteria are not met. In some embodiments, if the respective episode is not available for download (e.g., the user is not entitled to download or the content provider disallows download of the respective episode), then the one or more episode download criteria are not met. In some embodiments, when the episode download criteria are not met, the representation of the respective episode is not displayed. In some embodiments, when the episode download criteria are not met, the download affordance is not displayed. In some embodiments, the episode download criteria for displaying the representation of the respective episode and the accompanying download affordance is a different episode download criteria for displaying the download affordance that is selectable to display the product page, as discussed above. In some embodiments, as described above, multiple download affordance can be displayed in the user interface and each download affordance has its own set of episode download criteria. For example, the episode download criteria associated with the representation of the respective episode includes watch history requirements and requirements that the respective episode is available for download. On the other hand, the episode download criteria associated with a respective season of the series does not include watch history requirements but includes a requirement that any undownloaded episode in the respective season is available for download (and not just a specific respective episode). In some embodiments, the user's watch history is determined based on the viewing activity on the device. In some embodiments, the user's watch history is determined based on the viewing activity on the device and on other devices which are logged into the same user profile as the device.

The above-described manner of displaying a suggested episode to download (e.g., by displaying a representation of a respective episode that the user has not yet watched and/or downloaded) provides the user with a quick and efficient manner of downloading an episode that the user is likely to download next, which simplifies the interaction between the user and the electronic device and enhances the operability of the electronic device and makes the user-device interface more efficient (e.g., by only displaying the representation and download affordance if the user is likely to download and watch the respective episode, without requiring the user to perform additional inputs to navigate to another user interface to find the next available episode to download), which additionally reduces power usage and improves battery life of the electronic device by enabling the user to use the electronic device more quickly and efficiently while reducing errors in the usage of the device.

In some embodiments, the plurality of episodes from the given season of the episodic series of content comprises a sequence of episodes, such as the episodes in season 1 or the episodes in season 2 in FIG. 6C (e.g., the episodes from the given season are arranged in a logical and/or numerical sequence). In some embodiments, the sequence is arranged chronologically based on release date of the episode such that an episode before a respective episode in the sequence was released before the respective episode and an episode after the respective episode in the sequence was released after the respective episode. For example, episode 1 is arranged before episode 2, which is arranged before episode 3, and so on and so forth. In some embodiments, the sequence is arranged based on an ordering provided by the content provider or producer of the episodic series of content (optionally regardless of release date of the respective episodes in the season).

In some embodiments, a user account associated with the electronic device includes an indication that a given episode in the first set of one or more episodes has been most recently watched, such as the user having watched episode 6 of season 2 in FIG. 6L (e.g., the currently active user profile and/or user account is associated with a user of the electronic device indicates that the user's most recently watched episode of the downloaded episode is the given episode). In some embodiments, a user's profile or account includes viewing or playback information, such as the user's playback history, the user's playback preferences, the user's most recently watched episode, etc.

In some embodiments, a next episode after the given episode in the sequence of episodes is not currently downloaded on the electronic device, such as episode 7 of season 2 in FIG. 6L (e.g., the next episode after the episode of the series that the user has most recently watched is not downloaded on the device). For example, the user has downloaded and watched episode 1 and episode 2 is available for download and not yet downloaded.

In some embodiments, in accordance with a determination that the given episode is a first episode of the plurality of episodes, the respective episode is a second episode in the second set of one or more episodes and the download affordance displayed with the representation of the respective episode is selectable to initiate a process for downloading the second episode, such as episode 7 of season 2 in FIG. 6L (e.g., if the user's most recently watched episode is a first episode and the respective episode that is suggested to the user to download is the next episode after the first respective episode).

In some embodiments, the respective episode is not yet downloaded on the device. In some embodiments, the user interface suggests the episode next after the first episode even if farther episodes have been downloaded and/or watched. For example, if a user has downloaded episode 1 and episode 3 in a given season and the user has only watched episode 1, then the user interface displays a representation of episode 2 to download (e.g., because it is the next episode to watch after episode 1, the most recently watched episode). In some embodiments, if a user has downloaded episode 1 and episode 3 in a given season and the user watched episode 3 and then watched episode 1 after having watched episode 3, then the user interface still displays a representation of episode 2 to download (e.g., because it is the next episode to watch after episode 1, the most recently watched episode). In some embodiments, if a user has downloaded episode 1 and episode 3 in a given season and the user has watched episode 2 and then watched episode 1 after having watched episode 2, then the user interface still displays a representation of episode 2 to download (e.g., because it is the next episode to watch after episode 1, the most recently watched episode). In some embodiments, if a user has downloaded episode 1 and episode 3 in a given season and the user has watched episode 2 and then watched episode 1 after having watched episode 2, the user interface does not display a representation of episode 2 to download because the user has already watched episode 2 (even though episode 2 is not the most recently watched episode and the user watched it before watching episode 1). In some embodiments, if a user has downloaded episode 1 and episode 3 in a given season and the user has watched episode 3 without ever having watched episode 1, then the user interface displays a representation of episode 4 to download (e.g., because it is the next episode to watch after episode 3, the most recently watched episode). It is understood that in some embodiments, the requirements of the episode download criteria must also be satisfied to display representation of the respective episode (e.g., the respective is available to download, the user is entitled to download, etc.). In some embodiments, the representation of the respective episode is displayed even if one or more requirements of the one or more criteria are not satisfied (e.g., the representation is optionally displayed if the respective episode is available to download even if the user is not entitled to download). In some embodiments, the download affordance that is displayed with the representation of the second episode is selectable to begin download of the second episode (optionally without navigating to another user interface).

In some embodiments, in accordance with a determination that the given episode is a third episode of the plurality of episodes, the respective episode is a fourth episode in the second set of one or more episodes and the download affordance displayed with the representation of the respective episode is selectable to initiate a process for downloading the fourth episode, such as episode 8 of season 2 in FIG. 6W (e.g., if the user's most recently watched episode is an episode in the series different from the first episode, then the respective episode suggested to the user is an episode different from the second episode).

As described above, in some embodiments, the respective episode that is displayed and suggested to the user is based on the user's most recently watched episode and dynamically changes based on the user's viewing history (e.g., as the user watches episodes of the series, the displayed respective episode changes). It is understood that in some embodiments, the requirements of the episode download criteria must also be satisfied to display representation of the respective episode (e.g., the respective is available to download, the user is entitled to download, etc.). In some embodiments, the representation of the respective episode is displayed even if one or more requirements of the one or more criteria are not satisfied (e.g., the representation is optionally displayed if the respective episode is available to download even if the user is not entitled to download). In some embodiments, the respective episode displayed in the "Up Next" region can be the same respective episode that is displayed when the user selects the download affordance associated with specific seasons that is selectable to display the product page. For example, if the user has downloaded and watched episode 3 of season 2 and episode 3 of season 2 is the most recently watched and the furthest watched episode, then the "Up Next" region can display a representation of episode 4 of season 2 (optionally with a download affordance to begin download of episode 4 of season 2), and the region of the user interface associated with season 2 (which optionally includes a representation of episode 3 of season 2) can display a download affordance that is selectable to navigate to the product page automatically scrolled to display episode 4 of season 2. In some embodiments, the download affordance that is displayed with the representation of the second episode is selectable to begin download of the second episode (optionally without navigating to another user interface).

The above-described manner of selecting the respective representation to display in the user interface (e.g., by displaying a representation of a given episode if the user has most recently watched a particular episode and by displaying a representation of a different episode if the user has most recently watched another episode) provides the user with a quick and efficient manner of accessing the correct episode based on the user's particular viewing history, which simplifies the interaction between the user and the electronic device and enhances the operability of the electronic device and makes the user-device interface more efficient (e.g., without requiring the user to determine which episode the user most recently watched and then perform additional inputs to navigate to the series' product page or another user interface to find the next episode to download), which additionally reduces power usage and improves battery life of the electronic device by enabling the user to use the electronic device more quickly and efficiently while reducing errors in the usage of the device.

In some embodiments, the one or more representations of the first set of one or more episodes are displayed in a first portion in the user interface associated with downloaded episodes, and the representation of the respective episode is displayed in a second portion in the user interface, different from the first portion, such as the bottom portion of user interface 610 for downloaded episodes (e.g., "Season 1" and "Season 2" regions) and the top portion of user interface 610 (e.g., "Up Next" region), respectively, in FIG. 6L (e.g., the user interface is visually divided into at least two regions). In some embodiments, a first region is for displaying representations of episodes that are downloaded on the device. In some embodiments, a second region is for displaying a representation of a suggested episode to download, the suggested episode not yet downloaded on the device.

In some embodiments, after downloading the respective episode (e.g., after downloading the respective episode in response to the user's selection of the download affordance), in accordance with a determination that a user account associated with the electronic device does not include an indication that at least a portion of the respective episode has been played, the device maintains display of the representation of the respective episode in the second portion in the user interface, such as in FIG. 6O (e.g., after downloading the respective episode in response to the user's selection of the download affordance, the representation of the respective episode remains displayed in its original location in the user interface).

For example, the representation of the respective episode is displayed in the second portion of the user interface before download began, and after download completes, the representation of the respective episode remains displayed in the second portion. In some embodiments, a representation of the respective episode is also displayed in the first portion associated with downloaded episodes (e.g., because the respective episode is now downloaded on the device). For example, the representation of the respective episode can be displayed in the two portions of the user interface. In some embodiments, after the respective episode is downloaded, the representation of the respective episode is updated such that the representation is no longer greyed out as compared to the other representations in the user interface (e.g., the episodes that are downloaded on the device).

The above-described manner of displaying a representation of a suggested episode to download (e.g., maintaining the representation of the episode at the same location after download as before download) provides the user with a quick and efficient manner of accessing the suggested episode after download (e.g., by maintaining the representation at the same location such that the user need not navigate through the user interface to find the newly downloaded episode to begin playback), which simplifies the interaction between the user and the electronic device and enhances the operability of the electronic device and makes the user-device interface more efficient (e.g., without immediately removing the representation from display and forcing the user to search for the newly downloaded episode), which additionally reduces power usage and improves battery life of the electronic device by enabling the user to use the electronic device more quickly and efficiently while reducing errors in the usage of the device.

In some embodiments, after downloading the respective episode (e.g., after downloading the respective episode in response to the user's selection of the download affordance), in accordance with a determination that the user account includes the indication that at least a portion of the respective episode has been played, the device ceases display of the representation of the respective episode in the second portion in the user interface and displays the representation of the respective episode in the first portion in the user interface, such as in FIG. 6S. In some embodiments, the device moves the representation from the second portion to the first portion.

In some embodiments, after downloading the respective episode in response to the user's selection of the download affordance, the representation of the respective episode remains displayed in its original location in the user interface. In some embodiments, after the user begins playback of the respective episode, the representation of the respective episode is removed from the second portion of the user interface. In some embodiments, the representation of the respective episode is moved to the first portion of the user interface that lists the downloaded episodes. In some embodiments, the second portion is the "Up Next" portion of the user interface (e.g., that suggests the next episode for the user to download and watch), and when the user begins playback of the respective episode, the respective episode is no longer "Up Next" and thus is no longer displayed in the "Up Next" portion. In some embodiments, a representation of another episode replaces the representation of the respective episode in the second portion (e.g., and the "Up Next" section remains displayed). In some embodiments, no episode replaces the representation of the respective episode in the second portion (e.g., and the "Up Next" section optionally ceased to be displayed).

The above-described manner of displaying a representation of a suggested episode to download (e.g., removing the representation of the episode when the user begins playback of the newly downloaded episode and/or moving the representation to a portion of the user interface for downloaded episodes) provides the user with a quick and efficient manner of archiving the downloaded episode (e.g., by displaying the representation of the downloaded episode in its appropriate position in the list of downloaded episodes after the user has accessed the downloaded episode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, after downloading the respective episode (e.g., after downloading the respective episode in response to the user's selection of the download affordance), in accordance with a determination that the user account includes an indication that the respective episode has completed playback and in accordance with a determination that a second respective episode, next in a sequence of episodes of the plurality of episodes after the respective episode, is available for download (e.g., after downloading the respective episode, the user began and completed playback of the respective episode), the user interface includes a representation of the second respective episode, wherein the second respective episode is in the second set of one or more episodes, such as representation 612-6 associated with episode 8 of season 2 in FIG. 6W (e.g., the user interface includes a representation of the next episode after the downloaded and viewed respective episode).

In some embodiments, the next episode after the downloaded respective episode is available for download and the user is entitled to access and download the next episode. In some embodiments, the representation of the second respective episode replaces the representation of the respective episode that was removed from the second region of the user interface. Thus, in some embodiments, the second respective episode is now the "Up Next" episode because it is next in the sequence of episodes after the respective episode. In some embodiments, the representation of the second respective episode is displayed only if the user is entitled to download the episode, the episode is available for download, and/or the user has not already downloaded the episode. In some embodiments, the device displays the representation of the second respective episode and automatically downloads the second respective episode on the device, without requiring the user to select the download affordance for downloading the second respective episode.

In some embodiments, after downloading the respective episode (e.g., after downloading the respective episode in response to the user's selection of the download affordance), in accordance with the determination that the user account includes an indication that the respective episode has completed playback and in accordance with a determination that the second respective episode is not available for download, the user interface does not include the representation of the second respective episode, such as in FIG. 6C (e.g., if the episode after the respective episode is not available for download, if the user does not have entitlement to download the episode after the respective episode, if the user has already downloaded the episode after the respective episode, and/or if the episode is not available to be downloaded, then do not display a representation of the second respective episode).

In some embodiments, if no representation is displayed in the second portion of the user interface (e.g., the "Up Next" portion), then the second portion is removed from the user interface (e.g., the "Up Next" region is removed from the user interface until a future time when an episode satisfies the criteria to be displayed in the "Up Next" region).

The above-described manner of displaying a representation of the next suggested episode to download (e.g., by displaying a representation of the next episode after the previously suggested episode if the next episode is available for download) provides the user with a quick and efficient manner of downloading additional episodes of the series (e.g., by automatically determining that the user is likely interested in downloading the next episode after the user completed watching the previous episode and providing the user with the option to do so), which simplifies the interaction between the user and the electronic device and enhances the operability of the electronic device and makes the user-device interface more efficient (e.g., without requiring the user to navigate to another user interface to find the next episode after the previous suggested episode to download), which additionally reduces power usage and improves battery life of the electronic device by enabling the user to use the electronic device more quickly and efficiently while reducing errors in the usage of the device.

In some embodiments, in accordance with a determination that the episodic series of content includes a third set of one or more episodes from a second season of the episodic series of content, different from the given season, that are currently downloaded on the electronic device: the user interface includes a first portion associated with the given season and a second portion associated with the second season, the one or more representations of the one or more episodes in the first set displayed in the first portion of the user interface and one or more representations of the one or more episodes in the third set displayed in the second portion of the user interface (e.g., if episodes of a plurality of seasons are downloaded on the device, then the user interface is visually separated into regions corresponding to each season for which episodes are downloaded), the download affordance that is selectable to initiate the process for downloading the one or more episodes in the second set of one or more episodes is included in the first portion of the user interface (e.g., the download affordance associate with the given season is displayed in the first portion that is associated with the given region), and in accordance with a determination that one or more second episode download criteria associated with the second season are satisfied, the user interface includes a second download affordance in the second portion that is selectable to initiate a process for downloading one or more episodes from the second season that are not currently downloaded on the electronic device, such as download affordance 618-1 corresponding to season 1 and download affordance 618-2 corresponding to season 2 in FIG. 6D (e.g., if the one or more episode download criteria specific to the second season is satisfied, then the user interface includes a download affordance specific to the second season to download additional episodes of the second season).

In some embodiments, one or more episodes from a season of the episodic series different from the given season are downloaded on the device (e.g., in addition to the first set of episodes from the given season that are downloaded on the device). In some embodiments, if at least one episode is downloaded for three different seasons of a given show, then the user interface includes a region for the first season, a region for the second season, and a region for the third season and the downloaded episodes are displayed in their respective region. In some embodiments, the download affordance is selectable to download additional episodes of the given season, but not the second season. For example, selection of the download affordance displays the product page of the series navigated to display the respective episode (e.g., the next not-downloaded episode) of the given season.

In some embodiments, the download affordance specific to the second season is displayed in the second portion, accompanying the list of downloaded episodes from the second season. In some embodiments, the download affordance specific to the second season is selectable to download additional episodes of the second season, but not the first season. For example, selection of the download affordance specific to the second season displays the product page of the series navigated to display episodes (e.g., the next not-downloaded episode) of the second season. In some embodiments, the one or more episode criteria specific to the second season include one or more of a requirement that the user has entitlement to download one or more episodes from the second season that are not currently downloaded, a requirement that the user has viewed an episode in the third set of episodes that is previous to a undownloaded episode in the second season, and/or a requirement that one or more undownloaded episodes in the second season are available for download.

The above-described manner of displaying a download affordance for each season in the user interface provides the user with a quick and efficient manner of downloading additional episodes for specific seasons of the series (e.g., by visually organizing the user interface into seasons and providing download affordance for each season that are selectable to initiate a process to download episodes for their respective season), which simplifies the interaction between the user and the electronic device and enhances the operability of the electronic device and makes the user-device interface more efficient (e.g., without requiring the user to perform additional inputs to navigate to the desired season to download additional episodes), which additionally reduces power usage and improves battery life of the electronic device by enabling the user to use the electronic device more quickly and efficiently while reducing errors in the usage of the device.

In some embodiments, an electronic device (e.g., Apple TV, Mac, or iOS device, such as device 100, device 300, device 500, and/or device 511) in communication with a display generation component and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) displays, via the display generation component, a user interface associated with an episodic series of content, such as user interface 610 in FIG. 6C (e.g., a user interface for a particular episodic series of content that indicates the episodes that the user has downloaded to the electronic device), wherein the episodic series of content includes a plurality of episodes from a given season of the episodic series of content, including a first set of one or more episodes that are currently downloaded on the electronic device and a second set of one or more episodes that are not currently downloaded on the electronic device (e.g., one or more episodes of the episodic series of content are accessible on the electronic device).

In some embodiments, the user interface is a dedicated user interface for displaying downloaded content (e.g., a user interface that displays only downloaded content and does not display content that has not been downloaded). In some embodiments, the user interface is a product page for the episodic series of content (which optionally includes information about the episodic series of content) and includes a portion that displays episodes that have been downloaded. In some embodiments, once an episode is downloaded on the electronic device, the user is able to playback the respective episode without an active connection to an external content server. In some embodiments, a user is able to playback a respective episode without first downloading the episode. In such embodiments, a user is able to receive content streamed from a content server.

In some embodiments, the user interface includes one or more representations of the first set of one or more episodes that are currently downloaded on the electronic device, such as season 1 episode 1 and 2 and season 2 episode 5 in FIG. 6C (e.g., the user interface displays only episodes that have been downloaded). In some embodiments, the downloaded content spans multiple seasons and is organized into different seasons (e.g., different regions of the user interface display downloaded episodes from different seasons of the episodic series of content). In some embodiments, the downloaded content are all within a single season and the user interface does not included different regions for different seasons (e.g., the user interface only includes one region for the single season, or the user interface does not include any region identifying the single season).

In some embodiments, a season of an episodic series of content is a set of episodes organized together and defined as a "season". In some embodiments, which episodes are in a season and the number of episodes in a season are predetermined by the content provider (e.g., distributor or producer of the series). In some embodiments, a season is a collection of episodes that are released within a predetermined time frame (e.g., from September to May, during a "fall" season, during a "spring" season, during a calendar year, within a year, within half a year, etc.). In some embodiments, a season is a collection of episodes within a particular story arc (e.g., narrative arc). In some embodiments, a season can have any number of episodes (e.g., such as a traditional season which typically has 22 to 24 episodes, a miniseries, a limited series, etc.). It is understood that although this disclosure uses the term "seasons", other terminology used around the world can refer to the same concept, such as the term "series" (e.g., series 1 and series 2, instead of season 1 and season 2, etc.).

In some embodiments, the user interface does not include a representation of a given episode from the second set of one or more episodes that are not currently downloaded on the electronic device, such as season 2 episodes 1-4 in FIG. 6C (e.g., the user interface does not display at least one episode of the given season that has not been downloaded on the device). In some embodiments, the user interface only displays episodes that have been downloaded and does not display any episodes that have not been downloaded.

In some embodiments, in accordance with a determination that one or more episode download criteria are met, the electronic device automatically initiates a process for downloading one or more episodes in the second set of one or more episodes. In some embodiments, the one or more episode download criteria include a requirement that there is an episode in the episodic series of content that the user has not downloaded to the electronic device. In some embodiments, the one or more episode download criteria include a requirement that the undownloaded episode is for a season that the user has watched. In some embodiments, the one or more episode download criteria include a requirement that the undownloaded episode is after the latest watched episode for a particular season. In some embodiments, the one or more episode download criteria include a requirement that the user has credentials to download and/or watch the respective episode and/or series. In some embodiments, the one or more episode download criteria include a requirement that the undownloaded episode is available to be downloaded.

In some embodiments, the electronic device automatically downloads the undownloaded episode onto the electronic device, for example, without requiring the user to select a download affordance to initiate the process to download the undownloaded episode. In some embodiments, the electronic device downloads the undownloaded episode when playback of the episode immediately preceding the undownloaded episode has completed. In some embodiments, the electronic device downloads the undownloaded episode after playback of the episode immediately preceding the undownloaded episode reaches a threshold playback position (e.g., 10 seconds, 30 seconds, 60 seconds, 3 minutes before the end of the media item and/or before the credits). In some embodiments, the electronic device displays a representation of the undownloaded episode(s) in the user interface, optionally while the undownloaded episode(s) is being downloaded and/or after the undownloaded episode(s) have completed download.

In some embodiments, in accordance with a determination that the one or more episode download criteria are not met, the electronic device forgoes automatically initiating the process for downloading the one or more episodes in the second set of one or more episodes. In some embodiments, the electronic device does not display a representation of the undownloaded episode and does not automatically download the undownloaded episode.

The above-described manner of downloading a suggested next episode (e.g., by automatically downloading the episode in accordance with the download criteria being satisfied) provides the user with a quick and efficient manner of downloading additional episodes for specific seasons of the series (e.g., by automatically downloading the next episode that is available to download, without requiring the user to perform additional user inputs to download the next episode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, in accordance with the determination that the one or more episode download criteria are met, the electronic device automatically initiates a process to delete one or more episodes in the first set of one or more episodes from the electronic device. For example, the electronic device deletes (e.g., removes a local copy of) one or more of the episodes that were downloaded on the electronic device. In some embodiments, the electronic device automatically deletes the episode that immediately precedes the episode that the electronic device is automatically downloading. In some embodiment, the electronic device automatically deletes one or more downloaded episodes that the user has completed watching (e.g., playback has completed). In some embodiments, the electronic device automatically deletes the previously downloaded episode before automatically downloading the undownloaded episode, described above. In some embodiments, the electronic device automatically deletes the previously downloaded episode while the undownloaded episode is downloading. In some embodiments, the electronic device automatically deletes the previously downloaded episode after download of the undownloaded episode completes. In some embodiments, the previously downloaded episode is deleted on the electronic device that completed playback of the previously downloaded episode (e.g., thus causing the episode download criteria to be met). In some embodiments, the previously downloaded episode is deleted on the electronic device if the electronic device determines that the user (e.g., via the user's user profile) has completed playback of the previously downloaded episode (e.g., on any electronic device that is logged into the user's user profile).

The above-described manner of removing a previously downloaded episode (e.g., in response to the electronic device automatically downloading the next episode) provides the user with a quick and efficient manner of managing the episodes that are downloaded on the electronic device (e.g., by automatically removing episodes that the user has already watched to make room for episodes that the user has not yet watched, without requiring the user to perform additional inputs to manage the episodes that have been downloaded and/or remove episodes that the user has already watched), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the operation of the electronic device to provide user interfaces for downloading episodes of episodic content series described above with reference to method 700 optionally has one or more of the characteristics of presenting upcoming content for episodic content series, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 7 are, optionally, implemented by components depicted in FIGS. 1A-1B. For example, displaying operation 702 is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Upcoming Episodes of a Content Series

Users interact with electronic devices in many different manners, including using an electronic device to find, browse, and play content in a content browsing and playback application. In some embodiments, a content provider releases episodes of an episodic content series (e.g., a television show) for public consumption on a fixed schedule. The embodiments described below provide ways of indicating that an episode of an episodic content series is upcoming and/or releasing soon, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
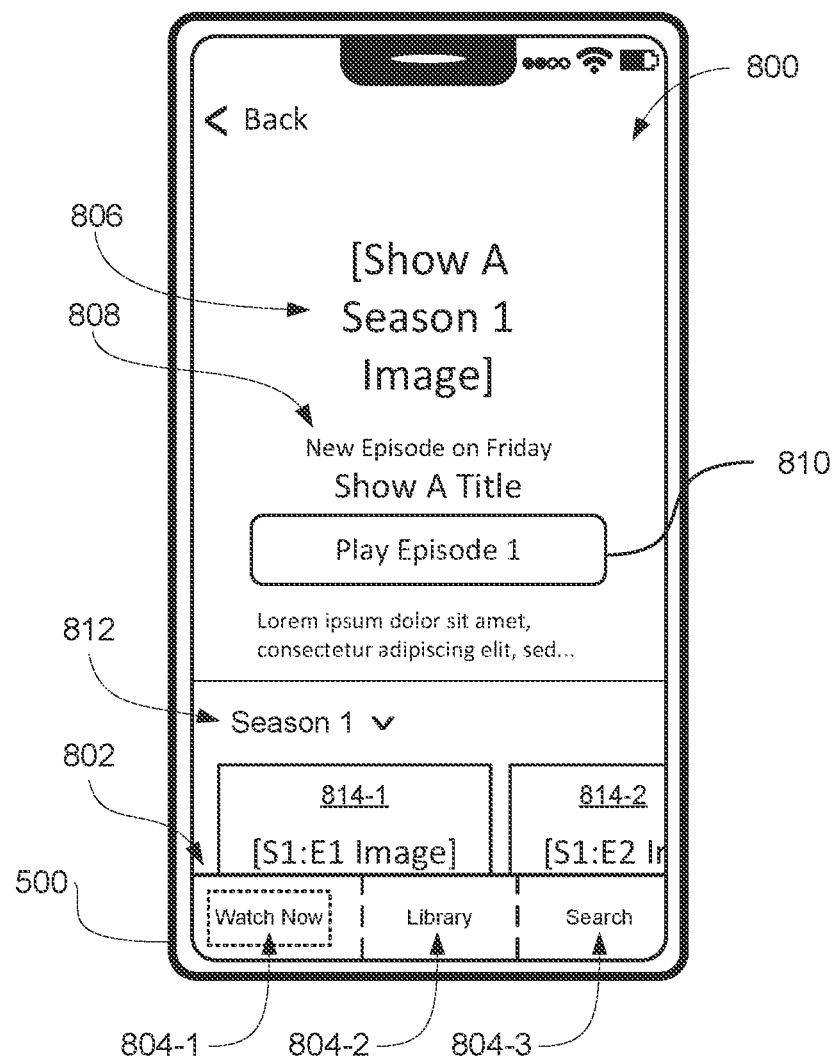
FIGS. 8A-8P illustrate exemplary ways in which an electronic devices presents upcoming content for episodic content series in user interfaces in accordance with some embodiments of the disclosure.
Figure 8B:
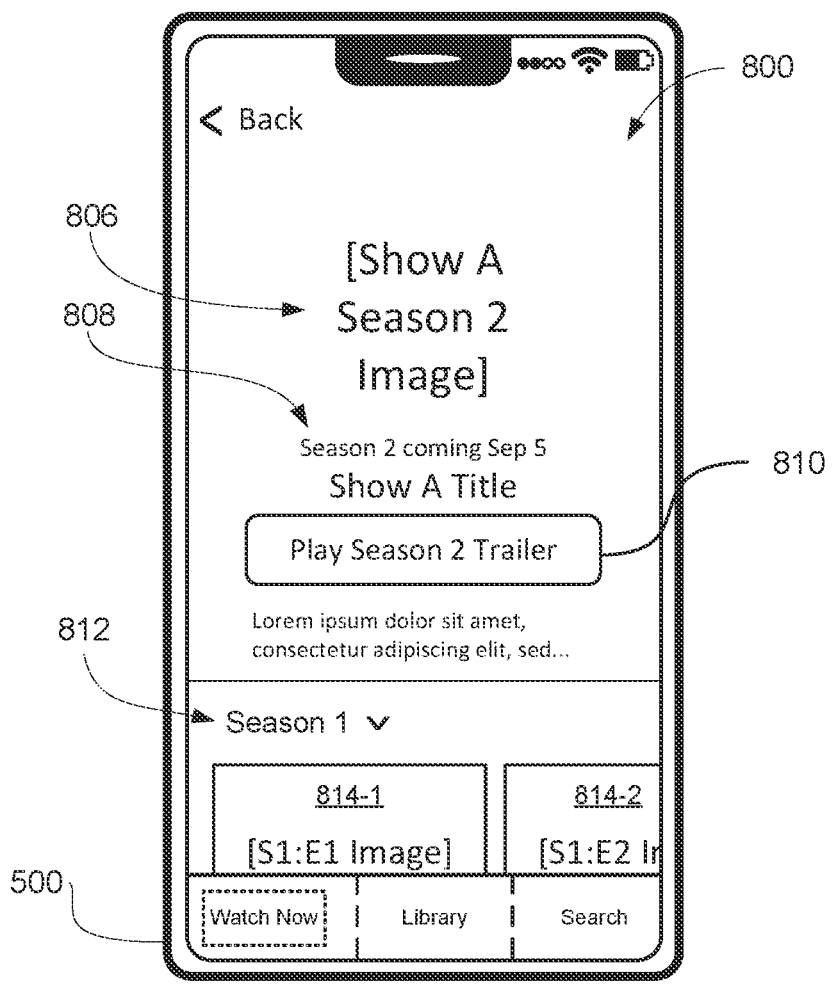
Figure 8C:
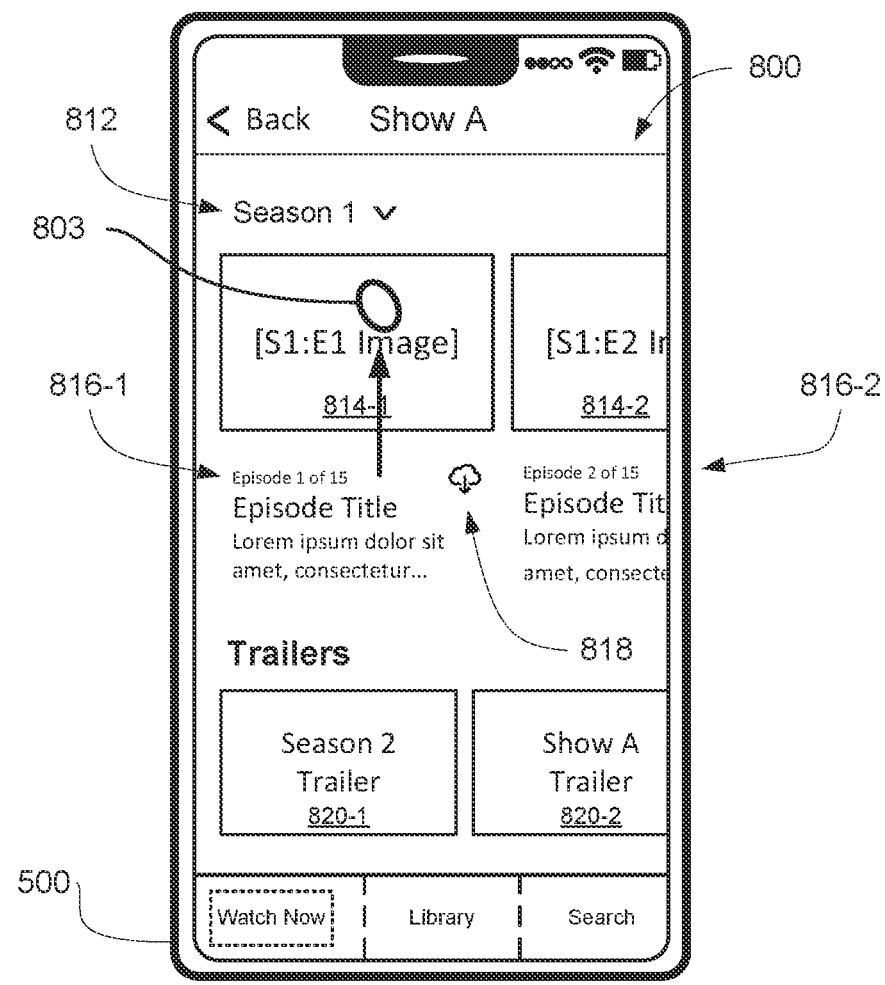
Figure 8D:
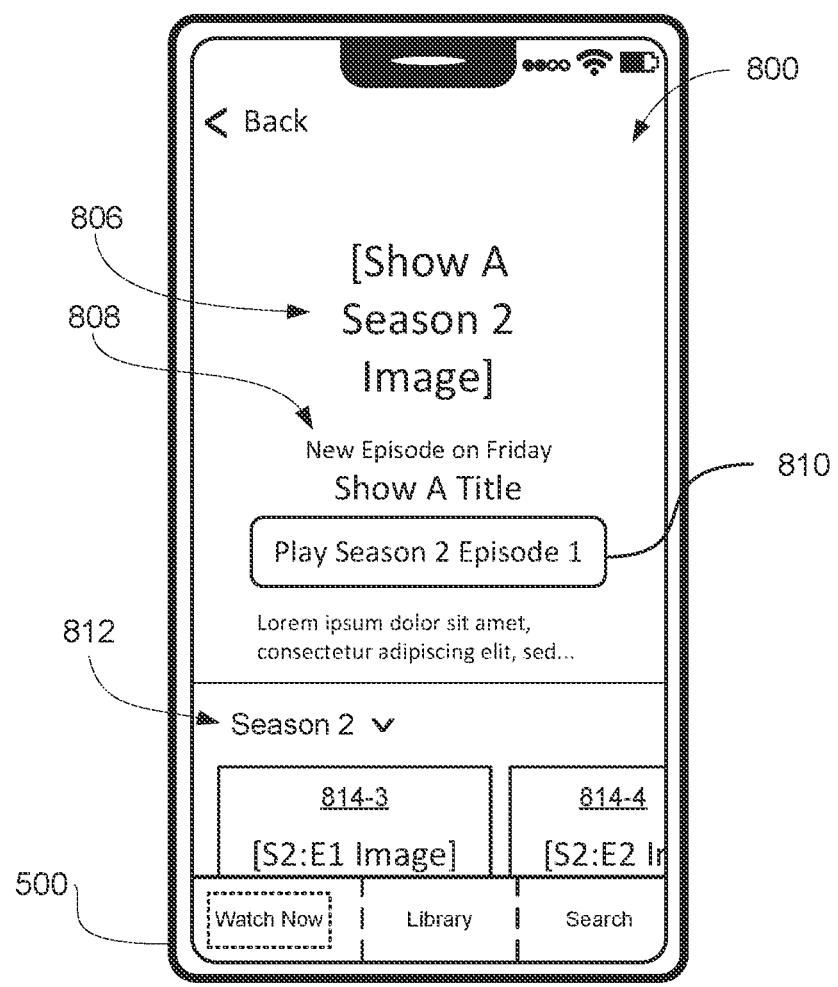
Figure 8E:
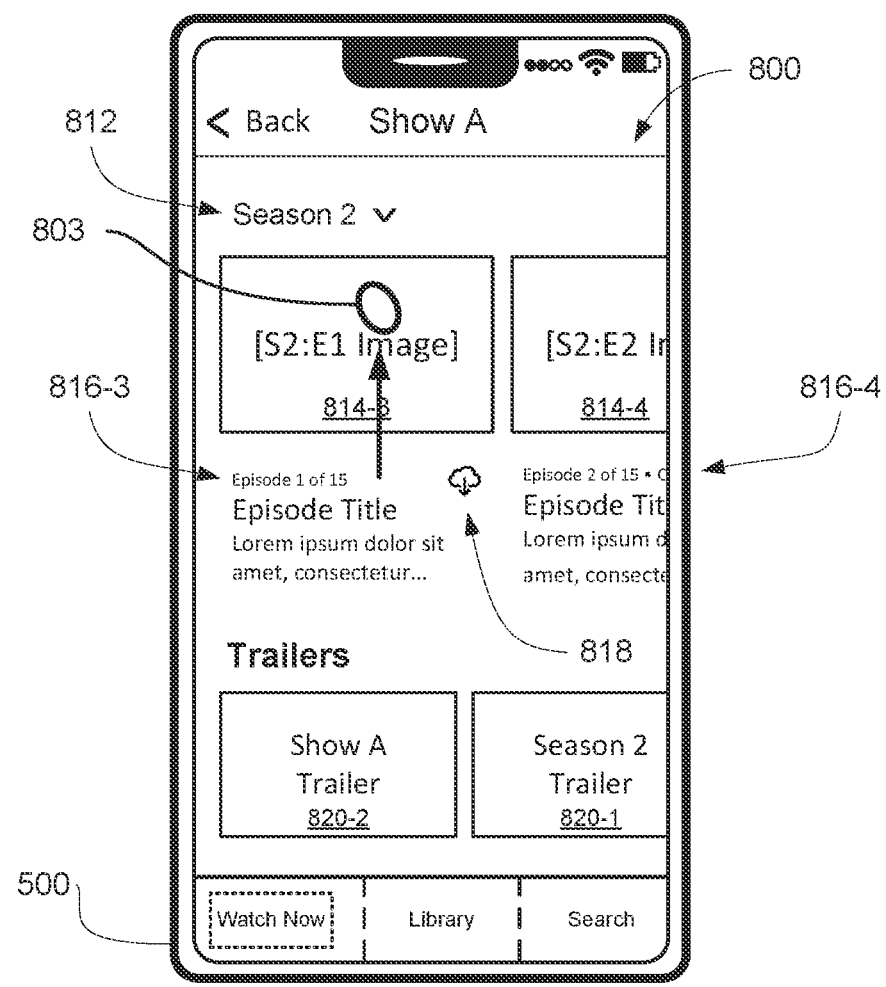
Figure 8F:
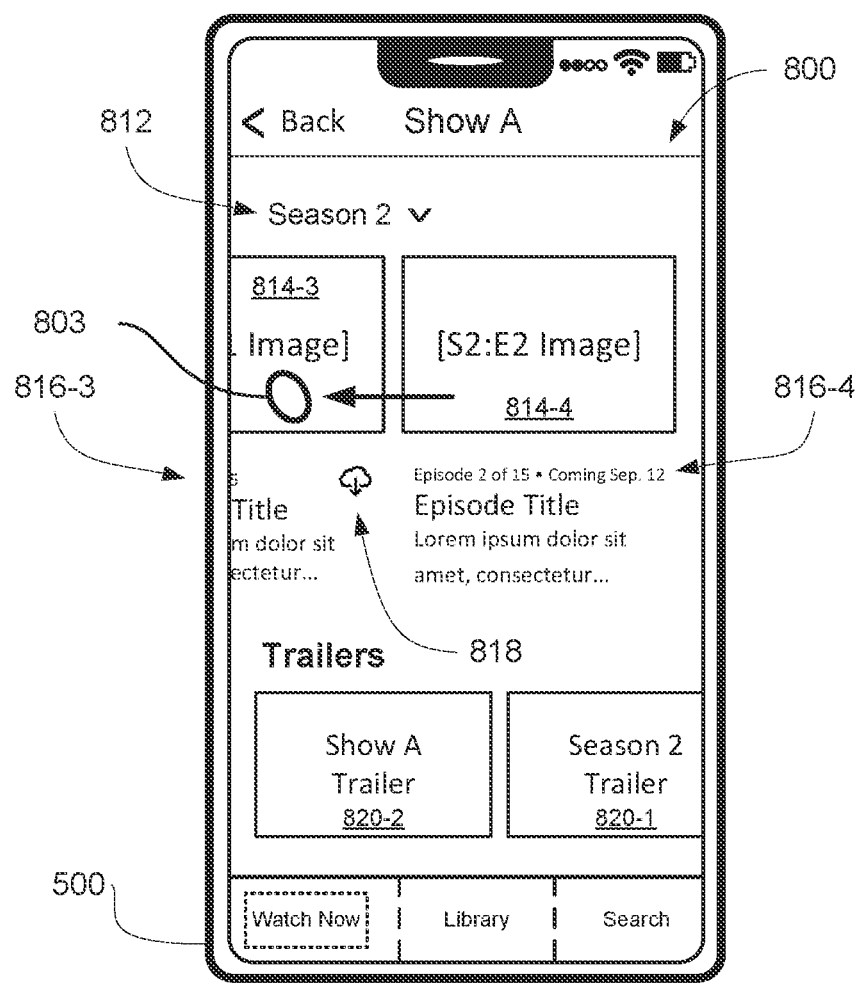
Figure 8G:
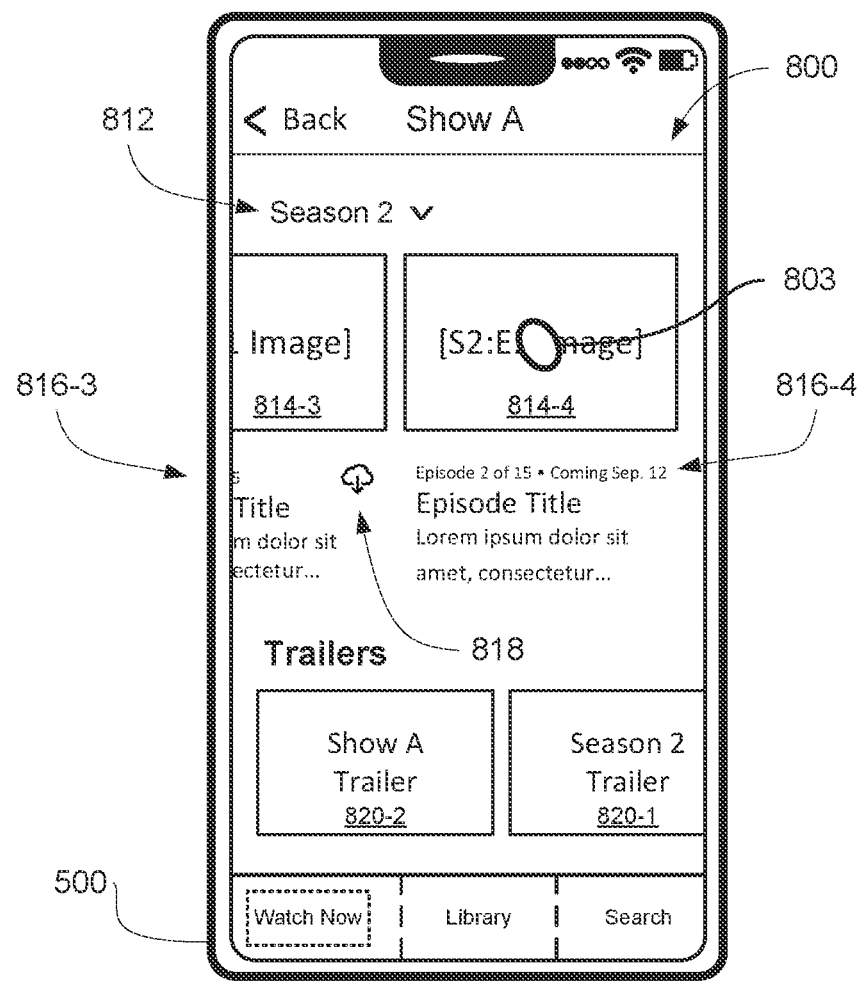
Figure 8H:
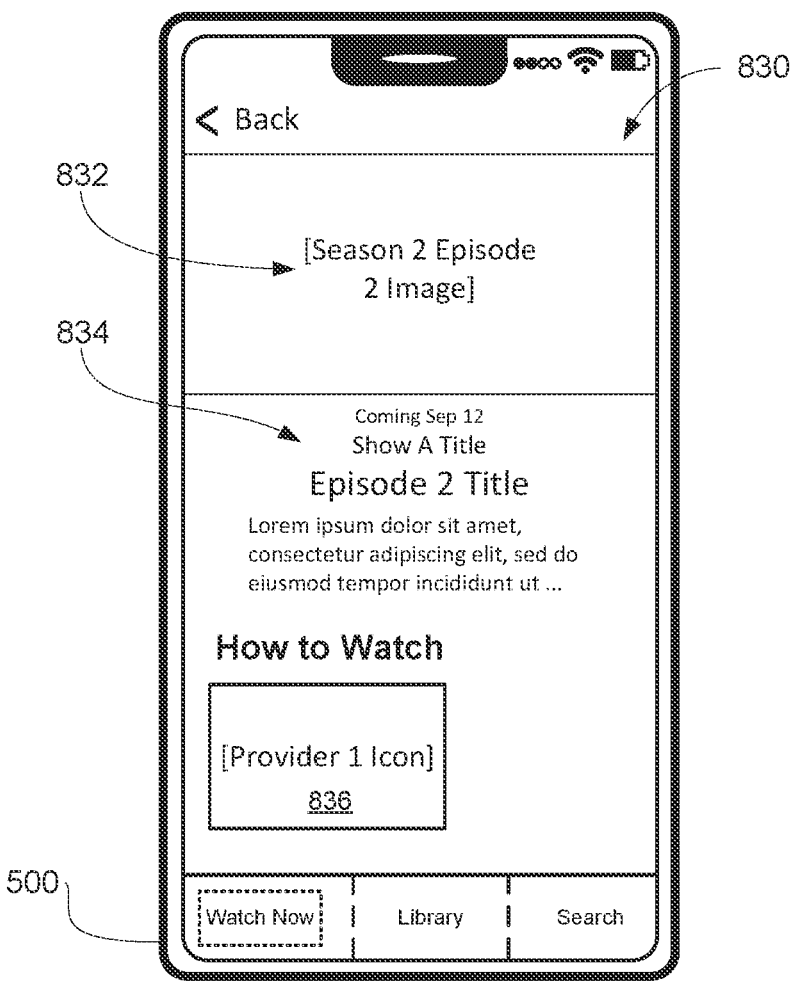
Figure 8I:
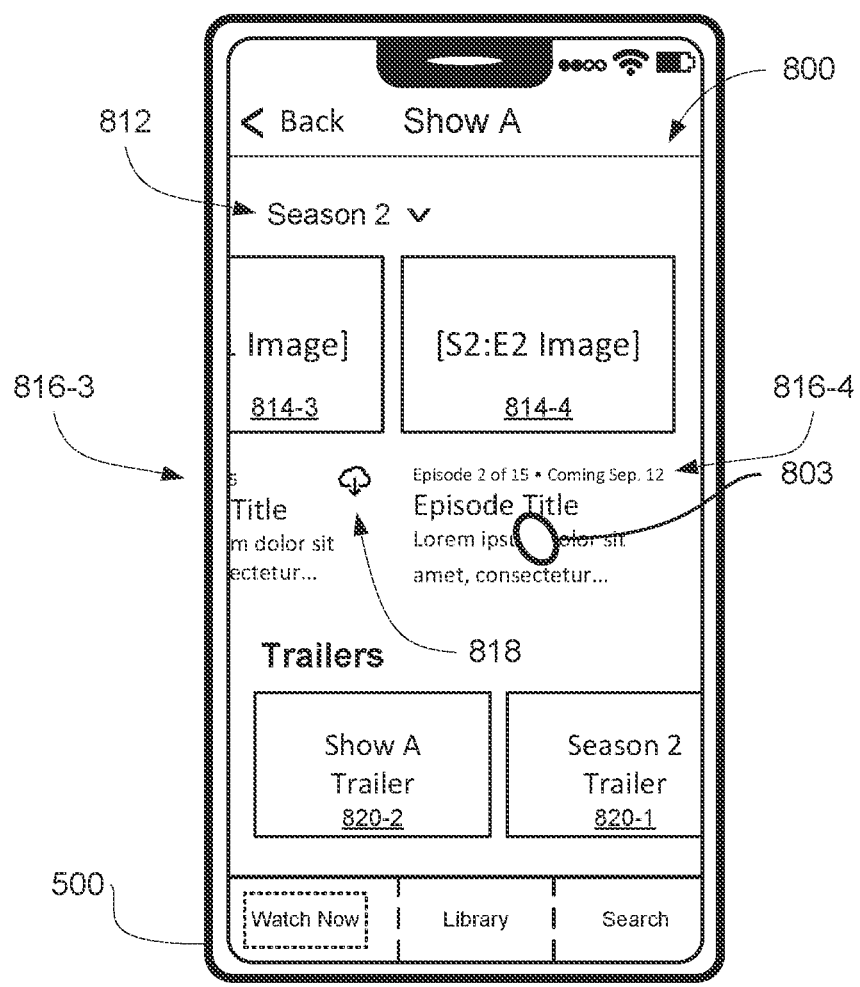
Figure 8J:
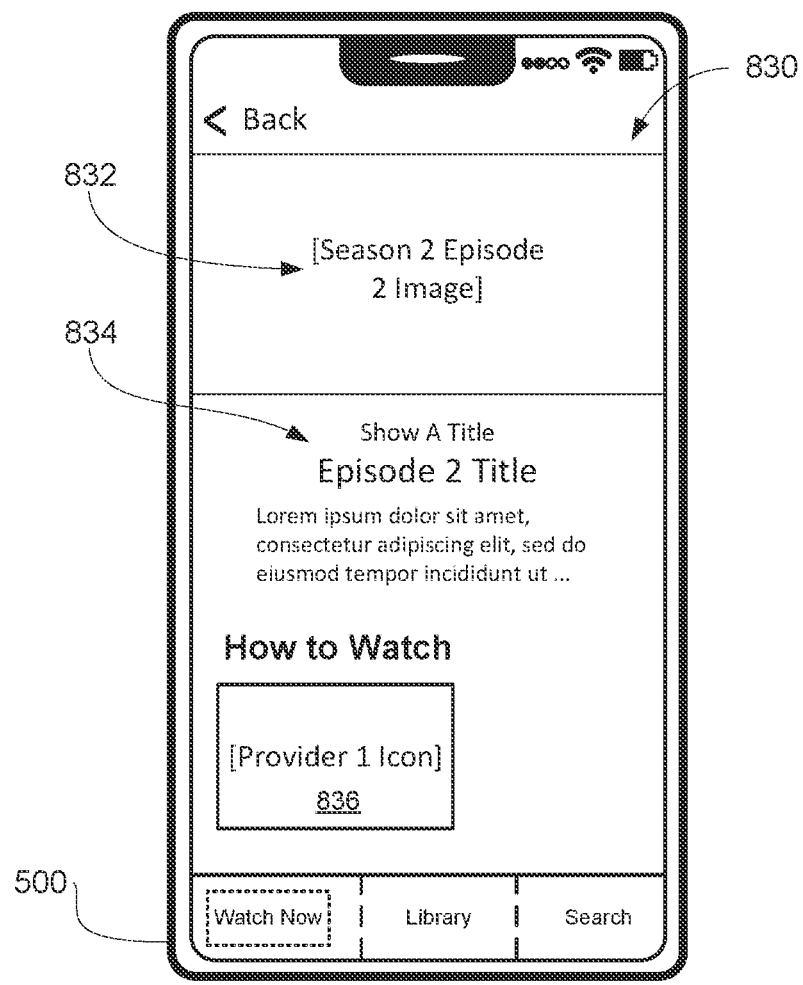
Figure 8K:
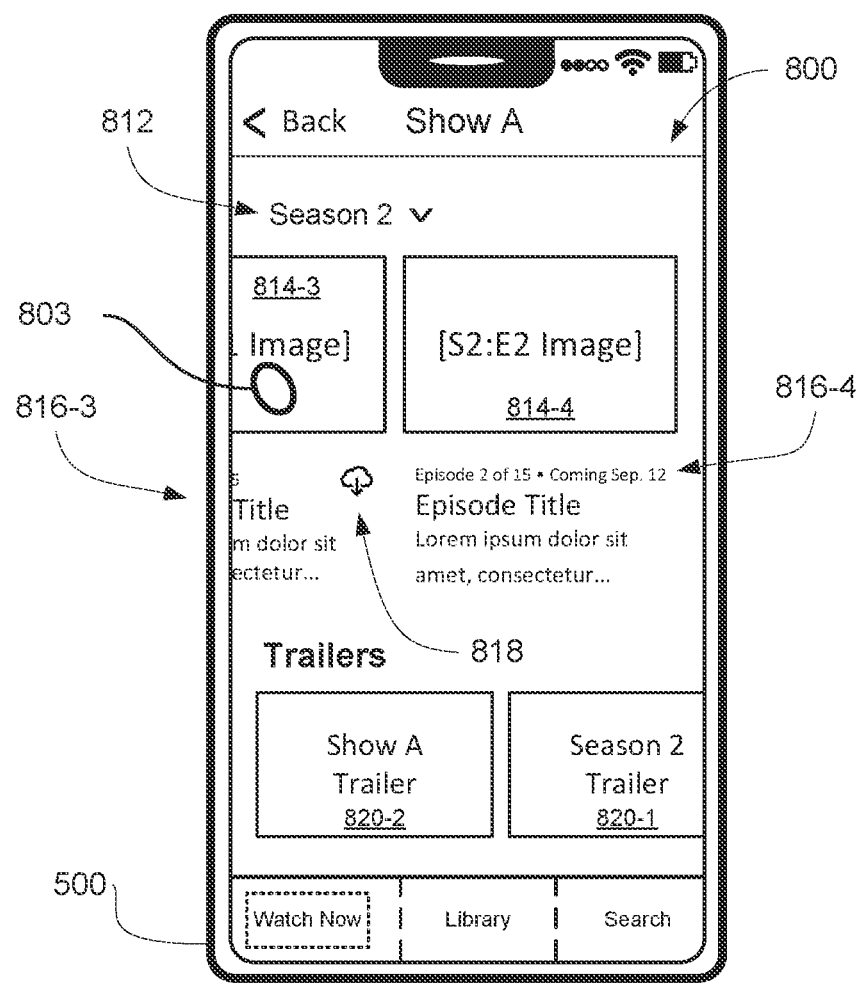
Figure 8L:
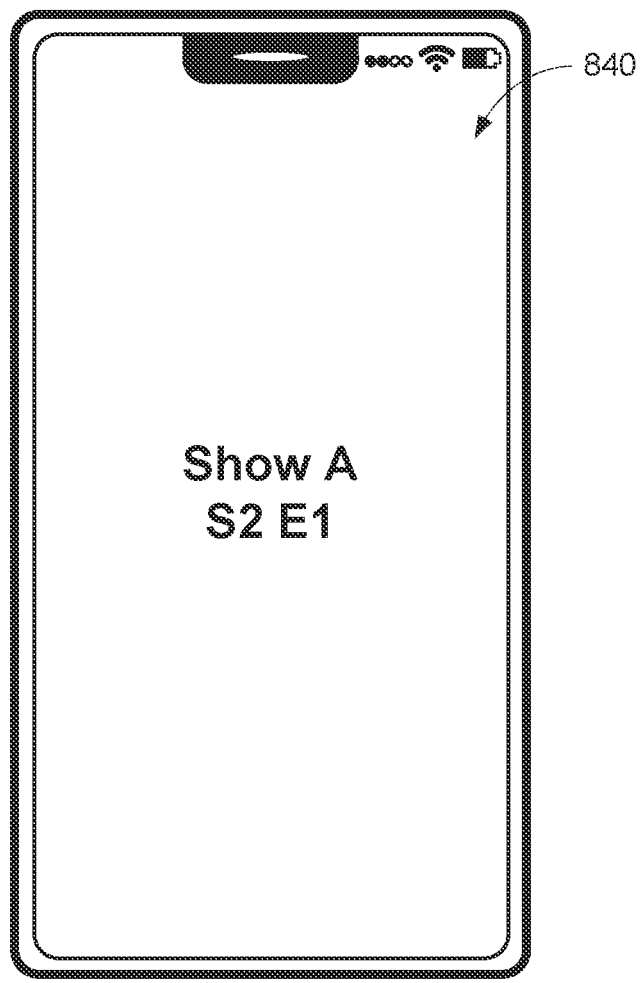
Figure 8M:
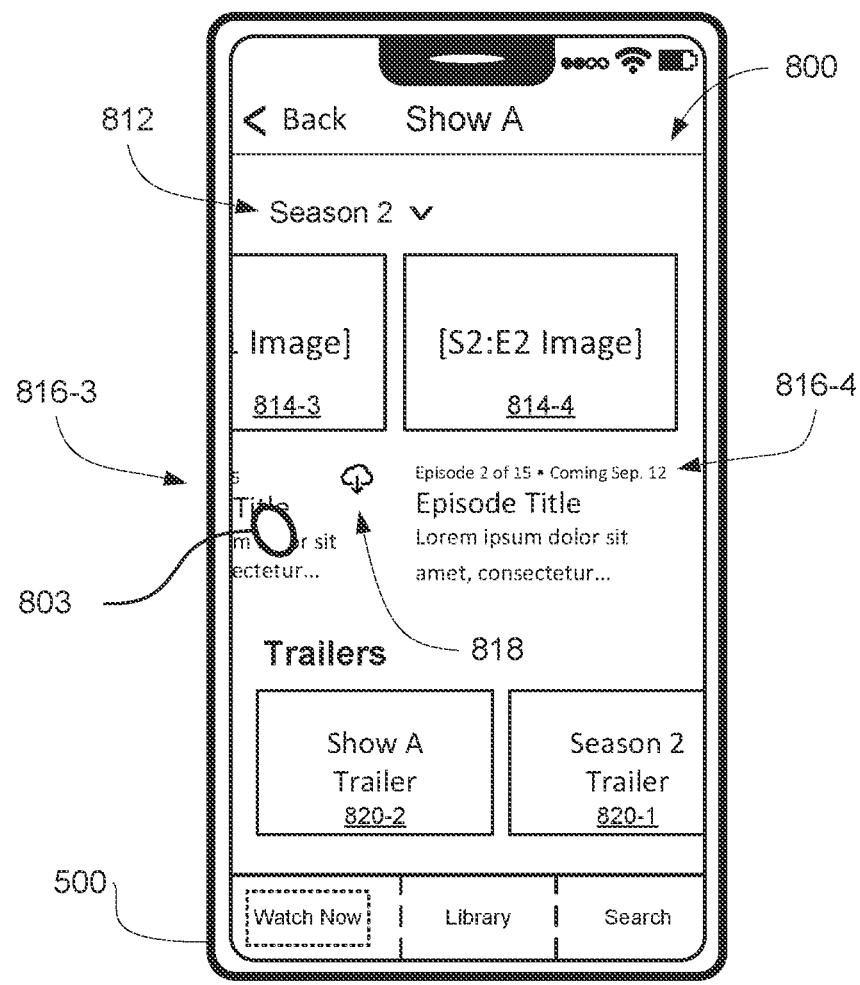
Figure 8N:
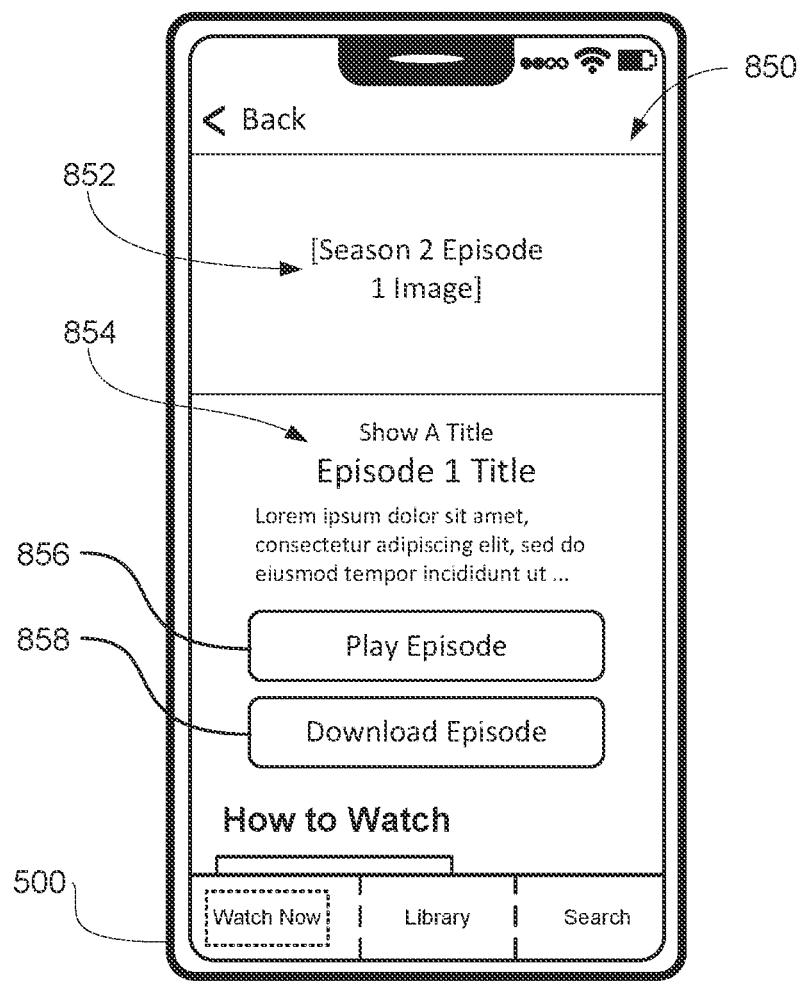
Figure 8O:
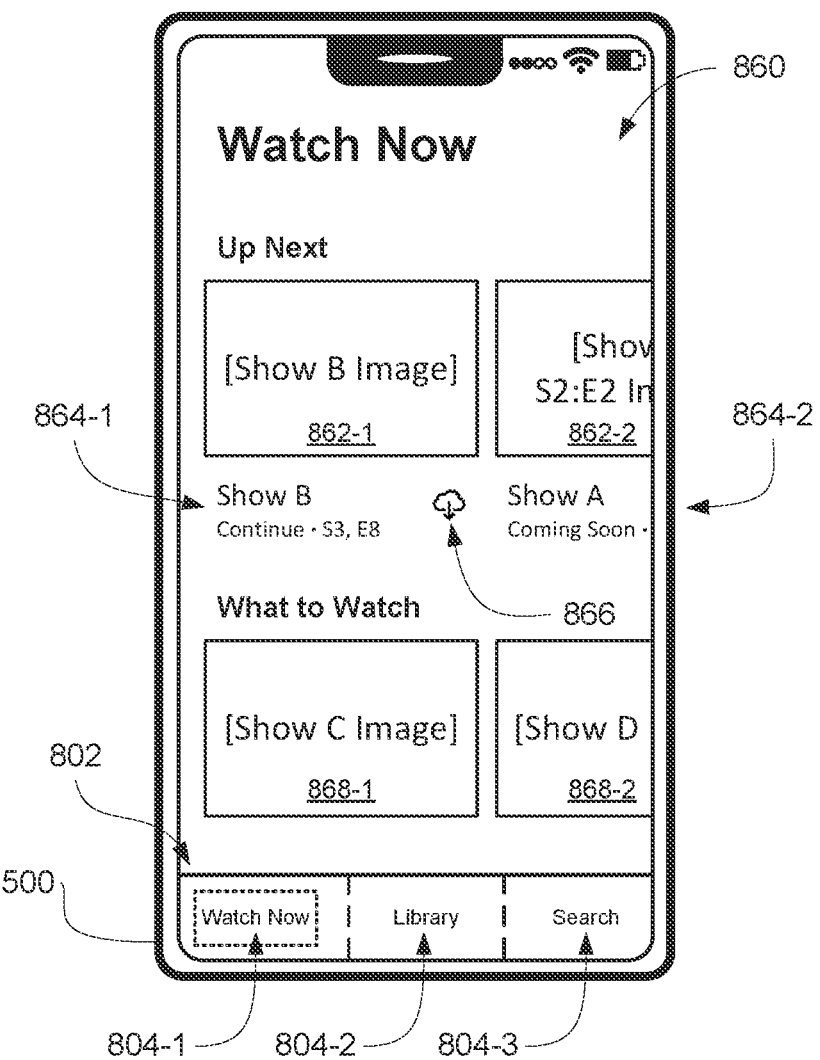
Figure 8P:
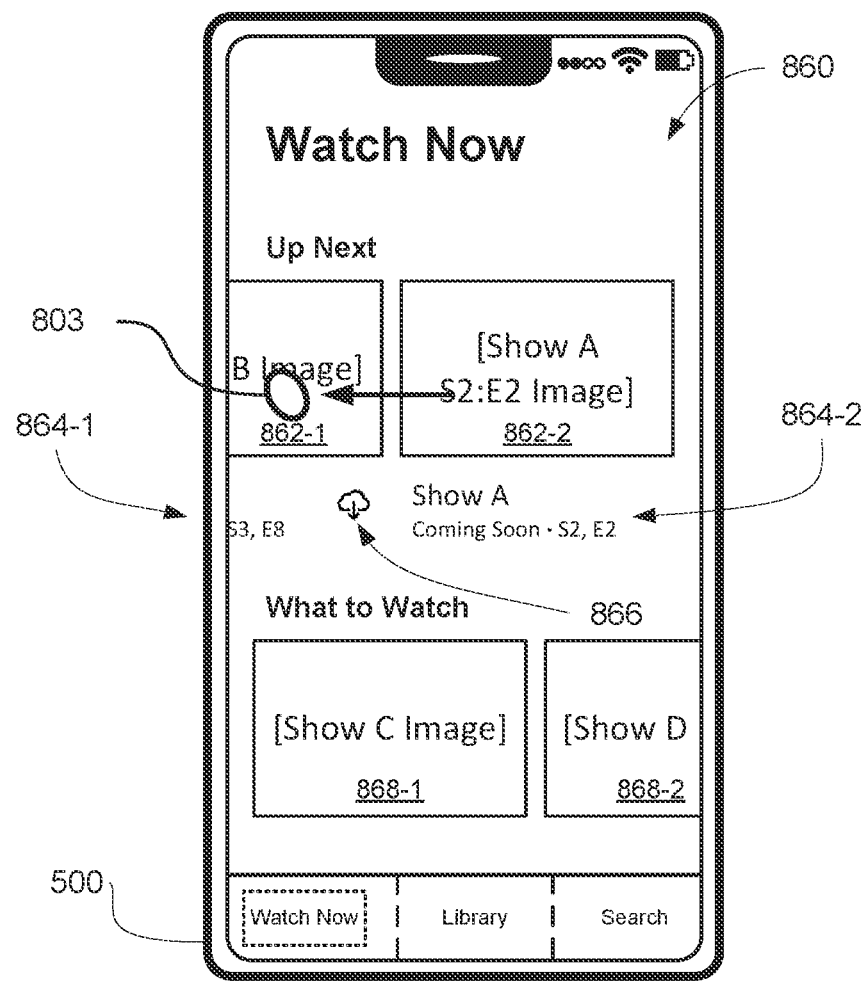

FIGS. 8A-8P illustrate exemplary ways in which an electronic device provides user interfaces for episodes of an episodic content series that have not been released in accordance with some embodiments of the disclosure. The embodiments in these figures are used to illustrate the processes described below, including the processes described with reference to FIG. 9.

FIG. 8A illustrates electronic device 500 displaying user interface 800 (e.g., via a display device, via a display generation component, etc.). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device that is in communication with device 500.

In some embodiments, user interface 800 is a user interface of a content browsing and playback application (e.g., an application in which a user is able to browse for, access, download, and/or playback content). In some embodiments, the content browsing and playback application is an application installed on device 500.

In some embodiments, user interface 800 includes navigation panel 802. In some embodiments, navigation panel 802 includes one or more tabs that are selectable to display user interfaces associated with the respective tab. In FIG. 8A, navigation panel 802 includes a watch now tab 804-1, library tab 804-2, and search tab 804-3. As shown in FIG. 8A, the watch now tab 804-1 is selected (e.g., indicated by the dotted box) and user interface 800 is a user interface corresponding to the "Watch Now" section of the content browsing and playback application. In some embodiments, the "Watch Now" is a content discovery user interface in which a user is able to browse for and discover content that is available (to view information for, to access, to view, etc.) via one or more content providers.

In some embodiments, user interface 800 is a user interface associated with an episodic content series (e.g., a product page, canonical page, a page dedicated to the episodic content series, etc.). In some embodiments, user interface 800 includes content and information about the respective episodic content series with which it is associated. For example, in FIG. 8A, user interface 800 includes graphic 806, textual description 808, and playback affordance 810. In some embodiments, user interface 800 is the same as, similar to, or shares characteristics of user interface 620 described above with respect to FIG. 6.

In some embodiments, graphic 806 is a still image, animation, video, or any other suitable graphic associated with Show A. In some embodiments, graphic 806 is a graphic for the latest available season of Show A. In some embodiments, graphic 806 is a graphic for the season that the user is currently viewing. In some embodiments, graphic 806 is a graphic for Show A, in general (e.g., not associated with any particular season). In some embodiments, graphic 806 is a graphic for a particular episode (e.g., the current episode that the active user profile indicates that the user is watching). In FIG. 8A, graphic 806 is a graphic for season 1 of Show A (e.g., the current season that the user is watching, the first available season, etc.). In some embodiments, textual description 808 includes the title of the show and a description of the show. In some embodiments, if an episode of Show A is scheduled to be publicly released within a threshold amount of time (e.g., 2 days, 4 days, 5 days, 7 days, 30 days, 2 months, 6 months, etc.), then textual description 808 includes an indication that the episode is coming and/or an indication of when the episode is scheduled to be released. For example, in FIG. 8A, textual description 808 includes an indication that a new episode will be released on Friday.

In some embodiments, playback affordance 810 is selectable to display content associated with the respective show. In some embodiments, the content that is played in response to a selection of playback affordance 810 depends on the user profile's viewing history and the availability of Show A content. For example, in FIG. 8A, the active user profile of the electronic device indicates that the user has not watched Show A (e.g., the user has not watched any episode of Show A). Thus, in some embodiments, playback affordance 810 is selectable to cause playback of the first episode of Show A (e.g., episode 1 of season 1). In some embodiments, if the user has watched one or more episodes of Show A, then playback affordance 810 is selectable to continue playback from the latest watched episode (e.g., if the user has watched up to episode 2, then selection causes playback of episode 3).

In some embodiments, user interface 800 includes season selector 812 and a list of episodes in a respective season of Show A. In FIG. 8A, season 1 is selected, as shown by season selector 812 displaying "Season 1". Thus, the list of episodes displays episodes in season 1 of Show A. For example, representation 814-1 corresponds to episode 1 of season 1 and representation 814-2 corresponds to episode 2 of season 1. In some embodiments, representations 814-1 and 814-2 are still images, animations, videos, or any other suitable graphic associated with the respective episode. In some embodiments, the list of episodes is horizontally scrollable to reveal other episodes in the respective season. In some embodiments, season selector 812 is selectable to cause display of a drop-down menu for selecting other seasons of Show A to display in the list of episodes.

In some embodiments, user interface 800 is vertically scrollable to reveal more content or information associated with Show A. For example, user interface 800 includes related content, trailers, promotional content, information on how to watch Show A, cast and crew information, etc.

FIG. 8B illustrates an embodiment of user interface 800 when all episodes of season 1 of Show A have been released and the user has watched all of the released episodes (e.g., the user has watched all episodes of season 1). In some embodiments, if season 2 of Show A is scheduled to be released (or begin releasing) within a threshold amount of time (e.g., 1 week, 2 weeks, 1 month, 2 months, 3 months, 6 months, etc.), then graphic 806 is a graphic associated with season 2 of Show A, textual description 808 includes an indication that season 2 is coming soon (optionally with the date that it is scheduled to be released, or optionally with the day of the week that it is scheduled to be released), and/or playback affordance 810 is selectable to display a trailer for season 2 of Show A.

In some embodiments, if season 2 of Show S is not scheduled to be released (optionally, within the threshold amount of time), then user interface 800 does not display content associated with season 2 of Show A and optionally continues to display content associated with season 1 of Show A (e.g., season 1 image, no indication that season 2 is coming soon, and/or playback affordance 810 is selectable to display an episode from season 1).

In FIG. 8C, a user input 803 corresponding to an upward swipe gesture is received. In some embodiments, in response to the user input, user interface 800 scrolls upwards to reveal further content in user interface 800. In FIG. 8C, user interface 800 includes a list of episodes in the respective selected season (e.g., selected by season selector 812). For example, the list of episodes in FIG. 8C includes episode 1 of season 1 (e.g., representation 814-1 and textual description 816-1) and episode 2 of season 1 (e.g., representation 814-2 and textual description 816-2). In some embodiments, each episode in the list of episodes includes a download affordance 818 for downloading the respective episode on device 500 (optionally only if the user is entitled to access and download the respective episode and the respective episode is available to download).

In some embodiments, the textual description of each episode includes an indication of the episode number of the respective episode and/or the total number of episodes in the respective season. For example, in FIG. 8C, textual description 816-1 includes an indication that the respective entry is for episode 1 out of 15 total episodes in season 1 (e.g., "Episode 1 of 15"), and textual description 816-2 includes an indication that the respective entry is for episode 2 out of 15 total episodes in season 1 (e.g., "Episode 2 of 15"). In this way, user interface 800 is able to indicate to the user not only the episode number of the respective episode (e.g., episode 1) but also the total number of episodes in the season (e.g., 15 episodes) and the order of the respective episode in the total number of episodes (e.g., first episode with 14 more episodes afterwards).

In some embodiments, user interface 800 includes a section for promotional content, such as trailers, as shown in FIG. 8C. In some embodiments, because season 2 is coming soon, the list of trailers includes representation 820-1 of a trailer for season 2 at the beginning of the list of trailers (e.g., before representation 820-2 corresponding to a trailer for Show A, which is not associated with any particular season). Thus, in some embodiments, content in a row of content that is associated with an upcoming season can be displayed earlier in the row than content that is not associated with the upcoming season. In some embodiments, each representation (e.g., representation 820-1 and representation 820-2) is selectable to cause playback of the respective trailer.

FIG. 8D illustrates an embodiment of user interface 800 when all episodes of season 1 of Show A have been released, the user has watched all of the released episodes (e.g., the user has watched all episodes of season 1), and episodes of season 2 of Show A have begun to be released (e.g., episode 1 of season 2 has been released). In FIG. 8D, because the user has watched all episodes of season 1 (e.g., a device has played all episodes of season 1 while the user's user profile is active on the device) and episode 1 of season 2 is now available for viewing, playback affordance 810 is selectable to begin playback of episode 1 of season 2. In some embodiments, because Show A is now releasing new episodes of season 2 (e.g., an episode of Show A is scheduled to be publicly released within a threshold amount of time), textual description 808 includes an indication that new episodes are coming soon (e.g., a new episode will be released on Friday). In some embodiments, because Show A is now releasing new episodes of season 2, graphic 806 is updated to display an image associated with the show (e.g., and not of any season in particular), an image associated with the most recently released episode, an image associated with the next upcoming episode, or an image associated with the season that the user is currently watching. In some embodiments, if, after episode 2 is released, the user watched episode 1, playback affordance 810 is selectable to begin playback of episode 2 of season 2 (e.g., and indicates "Play Season 2 Episode 2" instead of "Episode 1"). In such an embodiment, if episode 3 is scheduled to be released (optionally, within the threshold amount of time), then textual description 808 includes an indication that new episodes are coming soon. Thus, as the user watches episodes of season 2 and as episodes are scheduled to be released, user interface 800 is updated such that playback affordance 810 causes playback of respective episodes and/or textual description 808 includes indications that new episodes are coming soon. In some embodiments, if the user does not watch episode 1 of season 2 of Show A, then playback affordance 810 maintains its selectability to cause playback of episode 1 (e.g., does not become selectable to cause playback of episode 2 even after episode 2 is released).

In some embodiments, because the user has watched all episodes of season 1 and episodes of season 2 are now available, season selector 812 automatically selects (e.g., without the user performing an input to select season 2 from the season drop-down menu) season 2 such that the list of episodes displays episodes of season 2. In FIG. 8D, representation 814-3 corresponds to episode 1 of season 2 and representation 814-4 corresponds to episode 2 of season 2.

In FIG. 8E, a user input 803 corresponding to an upward swipe gesture is received. In some embodiments, in response to the user input, user interface 800 scrolls upwards to reveal further content in user interface 800. In some embodiments, because season 2 is selected by season selector 812, the list of episodes in user interface 800 includes episode 1 of season 2 (e.g., representation 814-3 and textual description 816-3) and episode 2 of season 2 (e.g., representation 814-4 and textual description 816-4). In some embodiments, each episode in the list of episodes includes a download affordance 818 for downloading the respective episode on device 500 (optionally only if the user is entitled to access and download the respective episode and the respective episode is available to download).

In some embodiments, because episodes of season 2 have been released (e.g., season 2 is no longer coming soon), the list of trailers is updated such that representation 820-1 of a trailer for season 2 is no longer at the beginning of the list of trailers. Thus, the list of trailers is returned to its original sorting order. For example, in FIG. 8E, the first trailer shown in the trailer section is the trailer for Show A, which is not associated with any particular season (e.g., representation 820-2).

In FIG. 8F, a user input 803 corresponding to a leftward swipe gesture on the list of episodes is received. In some embodiments, in response to the user input, the list if episodes is horizontally scrolled to reveal more episodes in the list of episodes. In FIG. 8F, user interface 800 displays representation 814-4 and textual description 816-4 corresponding to episode 2 of season 2. In some embodiments, episode 2 of season 2 has not yet been released, but will optionally be released within a threshold amount of time (e.g., 2 days, 4 days, 5 days, 7 days, 30 days, 2 months, 6 months, etc.). In some embodiments, because episode 2 of season 2 will be released (optionally, within a threshold amount of time), the list of episodes includes an entry for episode 2. In some embodiments, if episode 2 will not be released (optionally, within the threshold amount of time), then the list of episodes does not include an entry for episode 2. For example, in FIG. 8F, the list of episodes does not include an entry for episode 3 of season 2. In some embodiments, only one upcoming episode is displayed in the list of episodes at any time (e.g., episode 2, but not episode 3, even though episode 3 is scheduled to be released, optionally, within the threshold amount of time). In some embodiments, because episode 2 is scheduled to be released, textual description 816-2 includes an indication of when episode 2 is scheduled to be released (e.g., "Coming September 12" or "Coming Friday", etc.). In some embodiments, because episode 2 is not yet released, episode 2 is not available for download and the entry for episode 2 does not include a download affordance for downloading episode 2 on device 500.

In FIG. 8G, a user input 803 selecting representation 814-4 corresponding to episode 2 of season 2 is received. In some embodiments, in response to the user input, device 500 displays user interface 830, as shown in FIG. 8H. In some embodiments, user interface 830 is a user interface associated with episode 2 of season 2 (e.g., an episode page, a page dedicated to episode 2, etc.). In some embodiments, user interface 830 includes graphic 832 and textual description 834. In some embodiments, graphic 832 is a still image, an animation, a video, or any other suitable graphic associated with episode 2 of season 2. In some embodiments, textual description 834 includes the title of the episode, and/or a description of the episode. In some embodiments, textual description 834 includes an indication of when the episode is scheduled to be released. In some embodiments, textual description 834 does not include an indication of when the episode is scheduled to be released. In some embodiments, user interface 830 includes a "How to Watch" section that displays representations of content providers that will be providing access to the respective episode when it is released. In FIG. 8H, the "How to Watch" section includes representation 836 corresponding to an icon of Provider 1, from which episode 2 of season 2 will be available when it releases. In some embodiments, user interface 830 includes other content associated with episode 2 (e.g., related content, cast and crew information, etc.).

In some embodiments, in response to the user input, instead of displaying user interface 830, device 500 begins playback of content associated with episode 2 of season 2. For example, in some embodiments, device 500 displays a content playback user interface (e.g., such as user interface 840 described below with respect to FIG. 8L), and begins playback of a trailer for episode 2 of season 2, and not the actual episode itself, because the episode itself has not yet been released.

In FIG. 8I, device 500 is displaying user interface 800 and receives user input 803 selecting the textual description 816-4 associated with episode 2 of season 2. In some embodiments, in response to the user input, device 500 displays user interface 830, as shown in FIG. 8J. Thus, in some embodiments, both a user input selecting the representation of an upcoming episode (e.g., a not-yet-released episode), and a user input selecting the textual description of the upcoming episode, cause display of the episode page for the respective upcoming episode.

In FIG. 8K, device 500 is displaying user interface 800 and receives user input 803 selecting representation 814-3 associated with episode 1 of season 2 (e.g., a released episode of season 2). In some embodiments, in response to the user input, device 500 displays user interface 840 (e.g., a content playback user interface) and begins playback of episode 1 of season 2, as shown in FIG. 8L. Thus, in some embodiments, selection of a representation of a released episode causes playback of the respective episode (optionally only if the user has entitlement to access and view the respective episode), while selection of a representation of an unreleased episode causes display of an episode page.

In FIG. 8M, device 500 is displaying user interface 800 and receives user input 803 selecting the textual description 816-3 associated with episode 1 of season 2. In some embodiments, in response to the user input, device 500 displays user interface 850, as shown in FIG. 8N. In some embodiments, user interface 850 is a user interface associated with episode 1 of season 2 (e.g., an episode page, a page dedicated to episode 1, etc.). In some embodiments, user interface 850 includes graphic 852 and textual description 854. In some embodiments, graphic 852 is a still image, an animation, a video, or any other suitable graphic associated with episode 1 of season 2. In some embodiments, textual description 854 includes the title of the episode, the title of the show, and a description of the episode.

In some embodiments, user interface 850 includes one or both of playback affordance 856 and download affordance 858. In some embodiments, because episode 1 has been released and is available to be viewed, user interface 850 includes playback affordance 856 that is selectable to cause playback of episode 1 of season 2. In some embodiments, playback affordance 856 is only displayed if the user is entitled to view and play episode 1 of season 2 (e.g., has a subscription to a content provider that provides access to episode 1). In some embodiments, playback affordance 856 is displayed in user interface 850, but is only selectable to cause playback of episode 1 if the user is entitled to view and play episode 1 of season 2.

In some embodiments, because episode 1 has been released and is available to be viewed, user interface 850 includes download affordance 858 that is selectable to initiate a process to download episode 1 of season 2 on device 500. In some embodiments, download affordance 858 is only displayed if episode 1 is available to download (e.g., the content provider is permitting downloads of episode 1) and the user is entitled to download episode 1 of season 2 (e.g., has a subscription to a content provider that provides access to episode 1 and allows download of episode 1). In some embodiments, download affordance 858 is displayed in user interface 850, but is only selectable to initiate a process to download episode 1 if the user is entitled to download episode 1 of season 2.

In some embodiments, user interface 850 includes a "How to Watch" section that displays representations of content providers that will be providing access to the respective episode when it is released. In some embodiments, user interface 850 includes other content associated with episode 1 (e.g., related content, cast and crew information, etc.).

FIGS. 8O-8P illustrate an embodiment in which upcoming episodes are displayed in a user interface that is a user interface that is not associated with any particular show or episode and includes a plurality of different content from one or more content providers (e.g., not a product page or canonical page for Show A). In FIG. 8O, device 500 is displaying user interface 860. In some embodiments, user interface 860 is a user interface of the content browsing and playback application. In some embodiments, user interface 860 is the home user interface of the "Watch Now" tab (e.g., watch now tab 804-1). In some embodiments, user interface 860 includes a plurality of content that is suggested to the user. In some embodiments, the content in user interface 860 is a combination of any type of audiovisual work including television, movies, etc. In some embodiments, the plurality of content in user interface 860 can be provided by (e.g., available from) one or more content providers. In some embodiments, the plurality of content includes content that is suggested to the user based on previous user activity (e.g., content consumption activity). In some embodiments, the plurality of content includes content that is popular amongst users. In some embodiments, the plurality of content is similar to content that the user has previously watched. In some embodiments, the plurality of content is organized into genres or categories. For example, user interface 860 includes a "What to Watch" section that includes one or more representations of one or more content items that are suggested to the user. In some embodiments, the content in the "What to Watch" section are popular or trending content or content that is being promoted by one or more content providers. In FIG. 8O, representation 868-1 corresponds to Show C and representation 868-2 corresponds to Show D. In some embodiments, the representations are still images, animations, videos, or any other suitable graphic associated with the respective content item.

As shown in FIG. 8O, user interface 860 includes a "Up Next" section that includes representations of one or more content items that the user has shown interest in based on previous viewing or browsing activity. In some embodiments, the "Up Next" section includes content that the user has recently partially watched (optionally the selection of which resumes playback). In some embodiments, the "Up Next" section includes the next episode (e.g., next episode after the last-watched episode by the user) of a show that the user has recently watched. In some embodiments, the "Up Next" section includes content that the user has manually added to the user's "Up Next" queue.

In FIG. 8O, the "Up Next" section includes an entry corresponding to episode 8 of season 3 of Show B (e.g., representation 862-1 and textual description 864-1). In some embodiments, the entry corresponding to episode 8 of season 3 of show B includes representation 862-1 and textual description 864-1. In some embodiments, representation 862-1 is a still image, an animation, a video, or any other suitable graphic associated with Show B. In some embodiments, textual description 864-1 includes the title of the show and/or the title of the episode and/or the episode and season number of the episode (e.g., "S3, E8"). In some embodiments, textual description 864-1 includes an indication of why the item is included in the "Up Next" section. For example, textual description 864-1 displays "continue", indicating either that the user has partially watched episode 8 of season 3 or that the user has watched episode 7 of season 3 and continuing watching Show B comprises watching episode 8. In some embodiments, other indications, such as "Next", "Resume", etc. can be displayed in textual description 864-1. In some embodiments, in accordance with a determination that episode 8 of season 3 is available for download (e.g., the content provider is allowing downloads of episode 8 and/or the user is entitled to access and download episode 8), the entry for episode 8 includes download affordance 866 that is selectable to initiate a process to download episode 8 (optionally without navigating to another user interface).

In FIG. 8O, the "Up Next" section includes an entry corresponding to episode 2 of season 2 of Show A, which has not yet been released and is coming soon. The entry corresponding to episode 2 of season 2 of Show A will be described in more detail below with respect to FIG. 8P.

In FIG. 8P, a user input 803 corresponding to a leftward swipe on the items in the "Up Next" section is received. In some embodiments, in response to the user input, the items in the "Up Next" section are horizontally scrolled to reveal further content items in the "Up Next" section, as shown in FIG. 8P. In FIG. 8P, user interface 860 displays the entry corresponding to episode 2 of season 2 of Show A. In some embodiments, the entry corresponding to episode 2 of season 2 of Show A includes representation 862-2 and textual description 864-2. In some embodiments, representation 862-2 is a still image, animation, video, or any other suitable graphic associated with episode 2 of season 2 of Show A. In some embodiments, textual description 864-2 includes the title of the show and/or the title of the episode and/or the season and episode number of the episode (e.g., "S2, E2"). In some embodiments, because episode 2 of season 2 is not yet released and is coming soon, textual description 864-2 includes an indication that the episode is coming soon (e.g., "Coming Soon"). In some embodiments, textual description 864-2 includes an indication of when the episode will be released (e.g., "Friday", "September 24", etc.). In some embodiments, the entry corresponding to episode 2 of season 2 is displayed in the "Up Next" section because the user has manually added episode 2 of season 2 of Show A to the user's "Up Next" queue, the user has recently watched episode 1 of season 2 of Show A, or any other suitable indication of interest in Show A. In some embodiments, episode 2 is displayed in the "Up Next" section only if it is scheduled to be released within a threshold amount of time (e.g., 2 days, 4 days, 5 days, 7 days, 30 days, 2 months, 6 months, etc.). In some embodiments, because episode 2 of season 2 has not been released yet, episode 2 of season 2 is not available for download and the entry does not include a download affordance for downloading episode 2 of season 2 on device 500.

In some embodiments, both representation 862-1 and textual description 864-1 are selectable to cause playback of episode 8 of season 3. In some embodiments, both representation 862-2 and textual description 864-2 are selectable to display the episode page for episode 2 of season 2. Thus, in some embodiments, selection of any part of an entry for a released content item causes playback of the respective item, while selection of any part of an entry for an unreleased content item causes display of a product page for the unreleased item (e.g., the episode page for an unreleased episode or the product page for an unreleased movie).

It is understood that although FIGS. 8O-8P illustrate representations of episodes of television shows in the "Up Next" section, the "Up Next" section can include other types of media, such as movies.

In some embodiments, a user can have a user profile or user account that stores information about and associated with the user. In some embodiments, a user's viewing history, viewing preferences, purchase history, entitlements, subscriptions, and/or other information is stored on the user's user profile (e.g., stored on the user profile, associated with the user profile, etc.). In some embodiments, device 500 and other electronic devices can be configured with the user's user profile. In some embodiments, when a user's profile is active on a device, the device is configured to access and store data on the user's profile. For example, when a user's profile is active on a device, playback of content on the device is attributed to the user and the user's profile stores the playback in the user's viewing history. In some embodiments, access of content is based on the subscriptions stored in the user profile. For example, a user can subscribe the user's profile to a primary content provider (e.g., purchase the subscription onto the user's account) such that the user profile, when active on a device, allows the device to access content through the primary content provider using the subscription stored on the user's profile. In some embodiments, if a user's profile is inactive on a device (e.g., the profile is disabled, another profile is active, or the user has disabled collection of personal information), then playback of content on the device is not attributed to the user nor is it stored to the user's viewing history (and optionally the device does not access the user's profile to determine entitlement or playback status).

As used herein, determining a user's viewing history (e.g., whether the user has completed watching or partially watched a particular content item) and/or entitlements (e.g., whether the user has purchased access to a particular content item, whether the user has purchased a subscription to a content provider that provides access to content items) can be performed using the data stored on the user's profile. For example, a device can determine whether a user has viewed or partially viewed a particular content item (such as an episode of a show, or all episodes of a particular season of a show, etc.) by accessing the user's viewing history on the user's profile and determining whether the user's profile indicates that the user has viewed or partially viewed the content item. Similarly, in some embodiments, a device can determine whether a user is entitled or not entitled to access content is based on whether the user's profile indicates that the user does or does not have entitlement (e.g., using the entitlement or subscription information is stored in the user profile). Thus, as used herein, a user having watched or not having watched a content item and a user having or not having entitlement to content can be determined based on whether the active user profile (that is associated with the user) indicates that the user has watched the content item or has purchased entitlement to content.

Figure 9:
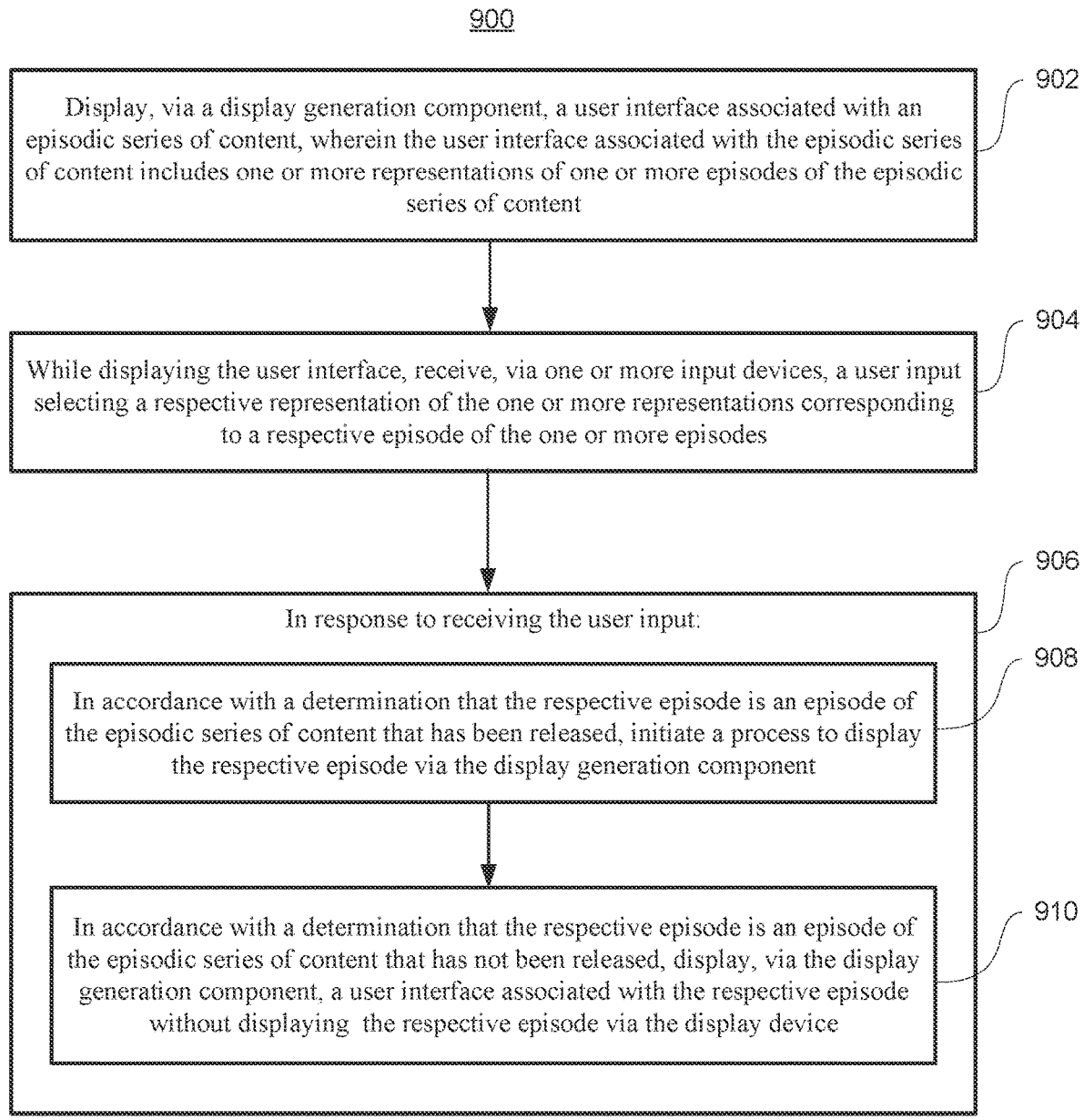
FIG. 9 is a flow diagram illustrating a method of presenting upcoming content for episodic content series in user interfaces in accordance with some embodiments of the disclosure.

FIG. 9 is a flow diagram illustrating a method 900 of presenting upcoming content for an episodic content series in user interfaces in accordance with some embodiments of the disclosure. The method 900 is optionally performed at an electronic device such as device 100, device 300, device 500, and device 511 as described above with reference to FIGS. 1A-1B, 2-3, 4A-4B and 5A-5B. Some operations in method 900 are, optionally combined and/or the order of some operations is, optionally, changed.

As described below, the method 900 provides ways to present upcoming content for episodic series of content in user interfaces. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., Apple TV, Mac, or iOS device, such as device 100, device 300, device 500, and/or device 511) in communication with a display generation component and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) displays (902), via the display generation component, a user interface associated with an episodic series of content, such as user interface 800 in FIG. 8A (e.g., a product page for the episodic series of content. In some embodiments, the product page includes information about the episodic series of content), wherein the user interface associated with the episodic series of content includes one or more representations of one or more episodes of the episodic series of content, such as representation 814-1 and representation 814-2 in FIG. 8A (e.g., a list or grid of episodes in the series. In some embodiments, the list includes a plurality of episodes).

In some embodiments, a display generation component is a display integrated with the electronic device (optionally a touch screen display) and/or an external display such as a monitor, projector, television, etc.

In some embodiments, the product page displays the episodes and/or seasons of the series. In some embodiments, the product page includes information on how and where to watch episodes of the series. In some embodiments, the product page includes additional content associated with the series, such as bonus content, trailers, related or similar content, information about actors in the series, etc.

In some embodiments, the list or grid of episodes is for a particular season of the series (e.g., a single season if only a single season of the series exists, or a selected season from multiple seasons if multiple seasons of the series exist). In some embodiments, the representations include graphics associated with the episode and/or a text description associated with the episode. In some embodiments, the list or grid of episodes includes episodes that have been released and/or are currently available to be watched. In some embodiments, the list or grid of episodes includes episodes that have not yet been released and are not currently available to be watched (e.g., have not been broadcast or made available to the public).

In some embodiments, while displaying the user interface, the electronic device receives (904), via the one or more input devices, a user input selecting a respective representation of the one or more representations corresponding to a respective episode of the one or more episodes, such as selection of representation 814-4 in FIG. 8G and selection of representation 814-3 in FIG. 8K (e.g., a user input selecting one of the episodes displayed in the user interface).

In some embodiments, in response to receiving the user input (906), in accordance with a determination that the respective episode is an episode of the episodic series of content that has been released (e.g., the episode that the user selected is an episode that has already been released and is available to the public to be watched), the electronic device initiates (908) a process to display (e.g., playback) the respective episode via the display generation component, such as in FIG. 8L (e.g., if the selected episode is an episode that is released and is available to be watched now, begin playback of the selected episode).

In some embodiments, playback begins only if the user is entitled to watch the respective content (e.g., has a subscription to a content provider that is providing the selected episode or the user has purchased access to the respective episode). In some embodiments, if the user is not entitled to watch the episode, then the electronic device does not display the episode.

In some embodiments, in response to receiving the user input, in accordance with a determination that the respective episode is an episode of the episodic series of content that has not been released (e.g., the episode that the user selected is an episode that has not yet been released, is not available to the public to be watched, and/or is coming soon), the electronic device displays (910), via the display generation component, a user interface associated with the respective episode without displaying (e.g., without playing back) the respective episode via the display device, such as in FIG. 8H (e.g., a product page for the respective unreleased episode).

In some embodiments, an episode that is coming soon is one that will be released (e.g., made available for public consumption, with or without a subscription or credentials) within the next three days, within the next week, within the next month, within the next two months, etc. In some embodiments, only one episode, at most, that is coming soon is displayed at one time (e.g., the episode that is soonest to be released). In some embodiments, if no episodes are coming soon, the user interface does not include a representation of an episode that is coming soon.

In some embodiments, in response to the user input selecting the unreleased episode, the electronic device does not cause playback of the respective episode. In some embodiments, the product page for the unreleased episode includes information about the episode such as content related to the episode, how to watch the episode, when the episode will be released, and/or a textual description of the episode, etc. In some embodiments, the product page for the unreleased episode does not include a selectable option to begin playback of the respective episode (e.g., as compared with a product page for a released episode, which optionally does include such a selectable option). In some embodiments, the product page for the unreleased episode does not include a selectable option to download the respective episode (e.g., as compared with a product page for a released episode, which optionally does include such a selectable option). In some embodiments, a representation of the respective unreleased episode is displayed on the user interface for the episodic series of content if the unreleased episode is coming soon, and is not displayed in the user interface for the episodic series of content if the unreleased episode is not coming soon. In some embodiments, selection of any part of the representation causes display of the product page for the unreleased episode (e.g., selection of the graphic and/or selection of the textual description). By contrast, in some embodiments, selection of the graphic of a representation for a released episode causes playback of the respective episode whereas selection of the textual description causes display of the product page for the respective released episode. In some embodiments, the product page for the respective released episode includes a selectable option to begin playback of the respective episode, and/or a selectable option to download the respective episode, and/or the date when the episode was released.

The above-described manner of displaying product pages for unreleased episodes (e.g., by displaying an unreleased episode alongside released episodes and upon selection of an unreleased episode, displaying the product page for the respective episode) provides a quick and efficient manner of displaying information about upcoming episodes (e.g., by displaying a representation of the episode even though the episode is not released, and further displaying a product page in response to a selection of the representation), which simplifies the interaction between the user and the electronic device and enhances the operability of the electronic device and makes the user-device interface more efficient (e.g., by providing the user with the option to access more information about upcoming episodes without requiring the user to perform independent research or wait until the episode is released), which additionally reduces power usage and improves battery life of the electronic device by enabling the user to use the electronic device more quickly and efficiently while reducing errors in the usage of the device.

In some embodiments, the respective episode is the episode of the episodic series of content that has not been released, and the user interface associated with the respective episode includes information about when the respective episode will be released, such as user interface 830 in FIG. 8H (e.g., the product page for the respective unreleased episode displays a textual indication that the respective episode will be released).

For example, the textual indication indicates that a new episode is coming soon, the day of the week that the episode will be released and/or the date that the episode will be released. In some embodiments, the product page for a respective unreleased episode displays a playback affordance that is selectable to cause playback of a trailer for the respective episode (e.g., if a trailer for the respective episode exists). By contrast, a product page for an already released episode can include a playback affordance that is selectable to cause playback of the episode and a trailer for the episode (e.g., if one exists) can be displayed in a related content portion of the user interface.

The above-described manner of displaying the release information of an unreleased episode (e.g., by displaying a textual indication of when the episode will be released) provides a quick and efficient manner of displaying information about upcoming episodes, which simplifies the interaction between the user and the electronic device and enhances the operability of the electronic device and makes the user-device interface more efficient (e.g., without requiring the user to navigate to a different user interface to determine when the respective episode will be released), which additionally reduces power usage and improves battery life of the electronic device by enabling the user to use the electronic device more quickly and efficiently while reducing errors in the usage of the device.

In some embodiments, in accordance with a determination that a given episode of the one or more episodes of the episodic series of content will be released (e.g., a currently unreleased episode is scheduled to be released, optionally within a threshold amount of time such as 2 days, 4 days, 5 days, 7 days, 30 days, 2 months, 6 months, etc.), the user interface associated with the episodic series of content includes an indication that the given episode will be released, such as the indication of a "New Episode on Friday" in FIG. 8A (e.g., the product page displays a textual indication that an episode will be released).

For example, the textual indication indicates that a new episode is coming soon (e.g., "new episode coming soon", "episode 2 coming soon", etc.), the day of the week that the episode will be released (e.g., "new episode on Friday", "episode 2 on Friday") and/or the date that the episode will be released (e.g., "new episode on September 2", "episode 2 on September 2". In some embodiments, the product page displays a textual indication that a new season will be released (e.g., "New Season coming September 14"). In some embodiments, if an episode (or season) is not scheduled to be released, the user interface does not include an indication that an episode (or season) will be released.

The above-described manner of displaying the release information of an unreleased episode (e.g., by displaying a textual indication of when the episode will be released on the show's product page) provides a quick and efficient manner of displaying information about upcoming episodes, which simplifies the interaction between the user and the electronic device and enhances the operability of the electronic device and makes the user-device interface more efficient (e.g., without requiring the user to navigate to a different user interface to determine when the respective episode will be released), which additionally reduces power usage and improves battery life of the electronic device by enabling the user to use the electronic device more quickly and efficiently while reducing errors in the usage of the device.

In some embodiments, the user interface associated with the episodic series of content includes a playback affordance that is selectable to initiate a process to play content associated with the episodic series of content, such as playback affordance 810 in FIG. 8A (e.g., the product page includes a smart button that is selectable to content to be displayed). In some embodiments, the displayed content depends on the user's watch state and/or the release state of the series.

In some embodiments, while displaying the user interface including the playback affordance, the electronic device receives, via the one or more input devices, a user input selecting the playback affordance, such as described in FIG. 8A (e.g., a user input selecting the smart button, or a selection input while the smart button has a focus).

In some embodiments, in response to receiving the user input selecting the playback affordance, in accordance with a determination that the user of the electronic device has not completed viewing a first respective season of the episodic series of content, the electronic device displays, via the display generation component, an episode of the episodic series of content, such as described in FIG. 8A (e.g., if the user has not watched any episodes of the series or if the user has watched some episodes of the episodic series, then begin playback of, or resume playback of, a respective episode of the series).

In some embodiments, if the user has not watched any episodes, then playback of the first episode of the first season begins. In some embodiments, if the user has watched at least one episode of the series, then playback resumes where the user left off (e.g., resumes playback if playback was paused in the middle of an episode, or plays the next episode if playback ended at the completion of an episode). In such embodiments, the playback affordance includes a textual description of the episode that will be played (e.g., "Watch First Episode", "Watch Season 1 Episode 1", etc.). In some embodiments, if a user has not watched all episodes of a currently released season, then the user interface displays content associated with the most recently released season (e.g., if the user has watched some episodes of the show), the first season (e.g., if the user has not watched any episodes), or the season that the user is currently viewing (e.g., the season of the user's most recently watched episode). For example, a "hero" graphic (e.g., representative image of the series) can be of the most recently released season and the description of the series can be that of the most recently released season. In some embodiments, if the user has not watched all episodes of a currently released season and/or if no season is upcoming, the user interface displays content associated with the series in general (e.g., the hero graphic is of the series in general and not for any season in particular and/or the description is of the series in general and not for any season in particular). In some embodiments, the device displays an episode of the episodic series of content in response to selection of the playback affordance if the user has not completed viewing all episodes of a first respective season regardless of the status of an upcoming season (e.g., even if an upcoming season is coming soon or even if the upcoming season begins releasing episodes).

In some embodiments, in response to receiving the user input selecting the playback affordance, in accordance with a determination that the user has completed viewing the first respective season of the episodic series of content (e.g., if the user has viewed all episodes of the first respective season), and a second respective season, next after the first respective season in a sequence of seasons of the episodic series of content, has not been released and is scheduled to be available for viewing (e.g., a currently unreleased season is scheduled to be released, optionally within a threshold amount of time such as 2 days, 4 days, 5 days, 7 days, 30 days, 2 months, 6 months, etc.), the electronic device displays, via the display generation component, a trailer for the second respective season, without displaying the episode of the episodic series of content, such as described in FIG. 8B.

In some embodiments, if the user has watched all available episodes that have been released and an upcoming season is scheduled to be released soon, then the smart button is selectable to display a trailer for the upcoming season (if a trailer is available for the second season). In such embodiments, the playback affordance includes a textual description that a trailer will be played (e.g., "Watch Season 2 Trailer", etc.). In some embodiments, if the user has watched all available episodes that have been released and an upcoming season is scheduled to be released soon, then the user interface is updated to display content associated with the upcoming season. For example, a "hero" graphic (e.g., representative image of the series) can be of the upcoming season and the description of the series can be updated to display a description of the upcoming season. In some embodiments, a "bonus content" or "trailers" section of the user interface that includes a list of bonus content or trailers, respectively, is updated such that any bonus content or trailers that are associated with the upcoming season are displayed at the front of the list (e.g., to promote the upcoming season). In some embodiments, if the user has watched all available episodes that have been released and an upcoming season is not scheduled to be released soon or if no trailer is available, then the smart button is selectable to begin playback from the beginning of the series (e.g., episode 1 of season 1), or the smart button is selectable to replay the latest episode. In some embodiments, if the user has watched all available episodes that have been released and an upcoming season is not scheduled to be released soon or if no trailer is available, then the user interface does not include the smart button.

The above-described manner of displaying content associated with a series (e.g., in response to a selection of a playback affordance on the product page) provides a quick and efficient manner of playing content that the user is likely to view next (e.g., the first episode, the next episode after a previous watched episode, or the trailer for an upcoming season), which simplifies the interaction between the user and the electronic device and enhances the operability of the electronic device and makes the user-device interface more efficient (e.g., without requiring the user to search through the user interface or navigate to a different user interface to find a particular content item), which additionally reduces power usage and improves battery life of the electronic device by enabling the user to use the electronic device more quickly and efficiently while reducing errors in the usage of the device.

In some embodiments, the electronic device determines that the user has completed viewing the first respective season of the episodic series of content, and that an episode of the second respective season has been released, such as in FIG. 8D (e.g., the user has watched every episode of the first respective season and the first episode of the upcoming season has now been released).

In some embodiments, in response to determining that an episode of the second respective season has been released (e.g., that the second season is no longer "upcoming"), the user interface can be updated to have the same behavior as when there is no upcoming season. For example, the playback affordance is no longer selectable to display a trailer for the upcoming season, etc. In some embodiments, the textual indication that the season is coming soon is no longer displayed in the user interface (optionally the textual indication is replaced by a textual indication that episodes of the season will be released soon). In some embodiments, the "hero" graphic is updated to display content associated with the recently released episode (e.g., the first episode of the now-released season, the second episode of the now-released season, etc.). In some embodiments, a "bonus content" or "trailers" section of the user interface is rearranged such that content associated with the now-released season is no longer promoted (e.g., the content returns to being arranged in logical or numerical sequence).

In some embodiments, after determining that the episode of the second respective season has been released, the electronic device receives, via the one or more input devices, a user input selecting the playback affordance, such as described in FIG. 8D (e.g., a user input selecting the smart button, or a selection input while the smart button has a focus).

In some embodiments, in response to receiving the user input selecting the playback affordance, the electronic device displays, via the display generation component, the episode of the second respective season, without displaying the trailer for the second respective season, such as described in FIG. 8D (e.g., displaying the first episode of the now-released season).

The above-described manner of displaying an episode of a newly released season (e.g., in response to a selection of the smart button on the product page after the first episode of the newly released season has been released) provides a quick and efficient manner of playing new episodes that the user is likely to view, which simplifies the interaction between the user and the electronic device and enhances the operability of the electronic device and makes the user-device interface more efficient (e.g., without requiring the user to search through the user interface or navigate to a different user interface to find newly released episodes of a newly released season), which additionally reduces power usage and improves battery life of the electronic device by enabling the user to use the electronic device more quickly and efficiently while reducing errors in the usage of the device.

In some embodiments, each of the one or more representations of one or more episodes of the episodic series of content includes a visual indicator of a total number of episodes in a respective season, of the episodic series of content, of which the episodes are a part, such as the textual indication of "Episode 1 of 15" and "Episode 2 of 15" in FIG. 8C (e.g., each representation of a respective episode in the user interface includes an indication of the episode number of the respective episode and the total number of episodes).

For example, the representation of the first episode includes a textual indication that reads "Episode 1 of 10" and the representation of the second episode includes a textual indication that reads "Episode 2 of 10", etc. In some embodiments, the indication of the total number of episodes is displayed on representations of episodes that have already been released and on representations of episodes that have not yet been released. In some embodiments, if the list of episodes only displays a subset of the total episodes in the season (for example, because only a subset of episodes have been released and some unreleased episodes are not yet coming soon), then the representations for the subset of displayed episodes also include an indication of the total number of episodes, even if the user interface does not display all of those episodes. For example, if three episodes have been released, one episode is coming soon, and the remaining six episodes are not scheduled to be released within the threshold amount of time, then the user interface only displays representations of the first four episodes, and each representation includes an indication of the total number of episodes (e.g., "Episode 1 of 10", "Episode 2 of 10", "Episode 3 of 10" and "Episode 4 of 10", respectively). In some embodiments, if no episodes of a season have been released, but the first episode of the season is coming soon such that the user interface includes a representation of the first episode, then the representation of the first episode also includes an indication of the total number of episodes (e.g., "Episode 1 of 10"). Thus, in some embodiments, the total number of episodes in a respective season is the total number of episodes planned for the season, including episodes that have not yet been released.

The above-described manner of displaying the total number of episodes in a respective season (e.g., on each representation of episodes in the respective season) provides a quick and efficient manner of indicating where the respective episode is in the order of episodes out of the total number of episodes in the season and whether all episodes have been released and if any episodes have not been released, which simplifies the interaction between the user and the electronic device and enhances the operability of the electronic device and makes the user-device interface more efficient (e.g., without requiring the user to search through the user interface to count the total number of available episodes in a season and/or to determine that additional, unreleased and not-displayed episodes will be coming), which additionally reduces power usage and improves battery life of the electronic device by enabling the user to use the electronic device more quickly and efficiently while reducing errors in the usage of the device.

In some embodiments, the respective representation of the one or more representations corresponding to the respective episode of the one or more episodes includes a graphic associated with the respective episode and a description associated with the respective episode, such as representation 814-4 and textual description 816-4 in FIG. 8G (e.g., each representation of an episode in the user interface includes a graphic and a textual description). In some embodiments, the graphic is a still image, an animation, a video, etc. associated with the respective episode. In some embodiments, the textual description includes the title of the episode, the episode number and the total number of episodes in the season, and/or a description or synopsis of the episode, etc.

In some embodiments, in response to receiving the user input, in accordance with the determination that the respective episode is the episode of the episodic series of content that has been released (e.g., the selected episode is an episode that has already been released), in accordance with a determination that the user input is directed to the graphic associated with the respective episode, such as in FIG. 8K, the electronic device initiates the process to display, via the display generation component, the respective episode, such as in FIG. 8L (e.g., selection of the graphic causes playback of the respective episode. In some embodiments, selection of the graphic causes playback only if the user has entitlement to view the respective episode). In some embodiments, if the user does not have entitlement to view the respective episode, then selection of the graphic causes display of the episode page associated with the respective episode.

In some embodiments, in response to receiving the user input, in accordance with the determination that the respective episode is the episode of the episodic series of content that has been released, in accordance with a determination that the user input is directed to the description associated with the respective episode, such as in FIG. 8M, the electronic device initiates the process to display, via the display generation component, the user interface associated with the respective episode without displaying the respective episode, such as in FIG. 8N (e.g., selection of the textual description causes display of the episode page associated with the respective episode and does not cause playback of the respective episode). In some embodiments, the episode page includes information about the respective episode, information on how to view the respective episode and/or a selectable option to play the respective episode. In some embodiments, the episode page includes related content and/or bonus content associated with the respective episode.

In some embodiments, in response to receiving the user input, in accordance with the determination that the respective episode is the episode of the episodic series of content that has not been released (e.g., the selected episode is an episode that has not yet been released), in accordance with a determination that the user input is directed to the graphic associated with the respective episode, such as in FIG. 8G, the electronic device initiates the process to display, via the display generation component, the user interface associated with the respective episode without displaying the respective episode, such as in FIG. 8H (e.g., display an episode page associated with the respective episode without causing playback of the respective episode).

In some embodiments, the episode page does not include a selectable option to play the respective episode (e.g., because the episode is not publicly available). In some embodiments, the episode page includes related content and/or bonus content associated with the respective episode, such as a trailer for the respective episode. In some embodiments, instead of initiating a process to display the episode page for an unreleased episode, selecting the graphic of an unreleased episode causes playback of content associated with the unreleased episode such as a trailer, slideshow, bonus video, or any other suitable content associated with the respective episode. In some embodiments, causing playback of content maintains consistent behavior with the behavior of a representation for an already released episode.

In some embodiments, in response to receiving the user input, in accordance with the determination that the respective episode is the episode of the episodic series of content that has not been released, in accordance with a determination that the user input is directed to the description associated with the respective episode, such as in FIG. 8I, the electronic device initiates the process to display, via the display generation component, the user interface associated with the respective episode without displaying the respective episode, such as in FIG. 8J (e.g., display the episode page associated with the respective episode without causing playback of the respective episode).

Thus, selection of both the graphic and the description of an unreleased episode causes display of the episode page for the respective episode whereas selection of the graphic for a released episode causes playback of the respective episode and selection of the description causes display of the episode page for the respective episode.

The above-described manner of playing the respective episode or displaying the episode page of the respective episode (e.g., displaying the respective episode in response to selection of the graphic for a released episode, or displaying the episode page in response to selection of the description of a released episode or selection of either the graphic or description of an unreleased episode) provides a quick and efficient manner of displaying episode information if the episode is not available when the user shows an interest in the unreleased episode (e.g., by always displaying the episode page for an unreleased episode that provides the user with information about the episode in response to selection of any part of the representation of the episode), which simplifies the interaction between the user and the electronic device and enhances the operability of the electronic device and makes the user-device interface more efficient (e.g., without requiring the user to navigate to a separate user interface or select specific portions of the representation to view information about the episode), which additionally reduces power usage and improves battery life of the electronic device by enabling the user to use the electronic device more quickly and efficiently while reducing errors in the usage of the device.

In some embodiments, in accordance with the determination that the respective episode is the episode of the episodic series of content that has been released, the user interface associated with the respective episode includes an affordance that is selectable to display, via the display generation component, the respective episode, such as playback affordance 856 in FIG. 8N (e.g., the episode page of an episode that has already been released includes a playback affordance that is selectable to cause playback of the episode).

In some embodiments, the playback affordance is displayed only if the user is entitled to view the episode (e.g., has a subscription to a content provider that provides access to the episode and/or series). In some embodiments, the episode page of an episode that has already been released includes a download affordance that is selectable to download the episode. In some embodiments, the download affordance is displayed only if the user is entitled to download the episode and/or if the episode is available to download.

In some embodiments, in accordance with a determination that the respective episode is the episode of the episodic series of content that has not been released, the user interface associated with the respective episode does not include the affordance that is selectable to display the respective episode, such as the lack of playback affordance 856 in FIG. 8H (e.g., the episode page of an episode that has not yet been released does not include a playback affordance that is selectable to cause playback of the episode).

In some embodiments, the episode page of an episode that has not been released does not include a download affordance that is selectable to download the episode. In some embodiments, the episode page of an episode that has not yet been released includes a playback affordance that is selectable to cause playback of a trailer for the episode (e.g., if a trailer exists).

The above-described manner of displaying affordances to access episodes (e.g., by displaying affordances to playback and/or to download on episode pages of episodes that have been released but not displaying the affordances for episodes that have not been released) provides a quick and efficient manner of providing access only to released episodes, which simplifies the interaction between the user and the electronic device and enhances the operability of the electronic device and makes the user-device interface more efficient (e.g., by not including access options for unreleased episodes that the user wouldn't be able to access, which would result in confusion as to whether the respective episode is accessible), which additionally reduces power usage and improves battery life of the electronic device by enabling the user to use the electronic device more quickly and efficiently while reducing errors in the usage of the device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the operation of the electronic device to present upcoming content for episodic content series described above with reference to method 900 optionally has one or more of the characteristics of providing user interfaces for downloading episodes of episodic content series, etc., described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 9 are, optionally, implemented by components depicted in FIGS. 1A-1B. For example, displaying operations 902 and 910, receiving operation 904, and initiating operation 908 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to present recommended content and/or episodes that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide content consumption activity data during user-set times for targeted content delivery services. In yet another example, users can select to limit the length of time content consumption activity data is maintained or entirely block the development of a content consumption profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, episode download suggestions can be generated and delivered to users based on aggregated non-personal information data or a bare minimum amount of personal information, such as the determination of a suggested episode to download being handled only on the user's device (e.g., using only information about playback and download that occurred on the device) or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
at an electronic device in communication with a display generation component and one or more input devices:
displaying, via the display generation component, a user interface associated with an episodic series of content, wherein the episodic series of content includes a plurality of episodes from a given season of the episodic series of content, including a first set of one or more episodes that are currently downloaded on the electronic device and a second set of one or more episodes that are not currently downloaded on the electronic device, and wherein the user interface:
includes one or more representations of the first set of one or more episodes that are currently downloaded on the electronic device;
does not include a representation of a given episode from the second set of one or more episodes that are not currently downloaded on the electronic device;
in accordance with a determination that one or more episode download criteria are met, includes a download affordance that is selectable to initiate a process for downloading one or more episodes in the second set of one or more episodes, wherein initiating the process for downloading one or more episodes in the second set of the one or more episodes includes displaying, via the display generation component, a second user interface that includes representations of one or more episodes in the second set of the one or more episodes; and
in accordance with a determination that the one or more episode download criteria are not met, does not include the download affordance that is selectable to initiate the process for downloading one or more episodes in the second set of one or more episodes.

2. The method of claim 1, wherein the plurality of episodes from the given season of the episodic series of content comprises a sequence of episodes, and wherein the one or more episode download criteria include one or more of:
a requirement that a user of the electronic device has entitlement to download the one or more episodes in the second set of one or more episodes;
a requirement that the user of the electronic device has viewed a respective episode in the first set of one or more episodes, previous to an episode in the second set of one or more episodes in the sequence of episodes of the plurality of episodes; and
a requirement that the one or more episodes in the second set of one or more episodes are available for download.

3. The method of claim 1, further comprising:
while displaying the user interface including the download affordance, receiving, via the one or more input devices, a user input selecting the download affordance; and
in response to receiving the user input selecting the download affordance, initiating the process for downloading the one or more episodes in the second set of one or more episodes, including:
in accordance with a determination that a second episode in the second set of one or more episodes should be next to be downloaded, displaying, via the display generation component, a first portion of a second user interface associated with the episodic series of content, different from the user interface associated with the episodic series of content, wherein the first portion of the second user interface includes a representation of the second episode and a first selectable option that is selectable to initiate a process to download the second episode to the electronic device; and in accordance with a determination that a third episode in the second set of one or more episodes should be next to be downloaded, displaying, via the display generation component, a second portion of the second user interface, different from the first portion, wherein the second portion of the second user interface includes a representation of the third episode and a second selectable option that is selectable to initiate a process to download a fourth episode to the electronic device, wherein the third episode is different from the second episode.

4. The method of claim 1, wherein the process for downloading the one or more episodes in the second set of one or more episodes includes beginning download of a respective episode in the second set of one or more episodes without navigating away from the user interface associated with the episodic series of content.

5. The method of claim 4, wherein:

in accordance with the determination that the one or more episode download criteria are met, the user interface associated with the episodic series of content includes a representation of the respective episode, and the download affordance is displayed with the representation of the respective episode, and in accordance with the determination that the one or more episode download criteria are not met, the user interface associated with the episodic series of content does not include a representation of the respective episode.

6. The method of claim 5, wherein:

the plurality of episodes from the given season of the episodic series of content comprises a sequence of episodes;

a user account associated with the electronic device includes an indication that a given episode in the first set of one or more episodes has been most recently watched;

a next episode after the given episode in the sequence of episodes is not currently downloaded on the electronic device;

in accordance with a determination that the given episode is a first episode of the plurality of episodes, the respective episode is a second episode in the second set of one or more episodes and the download affordance displayed with the representation of the respective episode is selectable to initiate a process for downloading the second episode; and in accordance with a determination that the given episode is a third episode of the plurality of episodes, the respective episode is a fourth episode in the second set of one or more episodes and the download affordance displayed with the representation of the respective episode is selectable to initiate a process for downloading the fourth episode.

7. The method of claim 5, wherein the one or more representations of the first set of one or more episodes are displayed in a first portion in the user interface associated with downloaded episodes, and the representation of the respective episode is displayed in a second portion in the user interface, different from the first portion, the method further comprising:

after downloading the respective episode:

in accordance with a determination that a user account associated with the electronic device does not include an indication that at least a portion of the respective episode has been played, maintaining display of the representation of the respective episode in the second portion in the user interface.

8. The method of claim 7, further comprising:

after downloading the respective episode:

in accordance with a determination that the user account includes the indication that at least a portion of the respective episode has been played:

ceasing display of the representation of the respective episode in the second portion in the user interface; and displaying the representation of the respective episode in the first portion in the user interface.

9. The method of claim 7, further comprising:

after downloading the respective episode:

in accordance with a determination that the user account includes an indication that the respective episode has completed playback and in accordance with a determination that a second respective episode, next in a sequence of episodes of the plurality of episodes after the respective episode, is available for download, the user interface includes a representation of the second respective episode, wherein the second respective episode is in the second set of one or more episodes; and in accordance with the determination that the user account includes an indication that the respective episode has completed playback and in accordance with a determination that the second respective episode is not available for download, the user interface does not include the representation of the second respective episode.

10. The method of claim 1, wherein:

in accordance with a determination that the episodic series of content includes a third set of one or more episodes from a second season of the episodic series of content, different from the given season, that are currently downloaded on the electronic device:

the user interface includes a first portion associated with the given season and a second portion associated with the second season, the one or more representations of the one or more episodes in the first set displayed in the first portion of the user interface and one or more representations of the one or more episodes in the third set displayed in the second portion of the user interface;

the download affordance that is selectable to initiate the process for downloading the one or more episodes in the second set of one or more episodes is included in the first portion of the user interface; and in accordance with a determination that one or more second episode download criteria associated with the second season are satisfied, the user interface includes a second download affordance in the second portion that is selectable to initiate a process for downloading one or more episodes from the second season that are not currently downloaded on the electronic device.

11. An electronic device, comprising:

one or more processors;

memory; and one or more programs, wherein the one or more programs are stored in the memory and configured to be executed by the one or more processors, the one or more programs including instructions for:

displaying, via a display generation component, a user interface associated with an episodic series of content, wherein the episodic series of content includes a plurality of episodes from a given season of the episodic series of content, including a first set of one or more episodes that are currently downloaded on the electronic device and a second set of one or more episodes that are not currently downloaded on the electronic device, and wherein the user interface:
- includes one or more representations of the first set of one or more episodes that are currently downloaded on the electronic device;
- does not include a representation of a given episode from the second set of one or more episodes that are not currently downloaded on the electronic device;
- in accordance with a determination that one or more episode download criteria are met, includes a download affordance that is selectable to initiate a process for downloading one or more episodes in the second set of one or more episodes, wherein initiating the process for downloading one or more episodes in the second set of the one or more episodes includes displaying, via the display generation component, a second user interface that includes representations of one or more episodes in the second set of the one or more episodes; and
- in accordance with a determination that the one or more episode download criteria are not met, does not include the download affordance that is selectable to initiate the process for downloading one or more episodes in the second set of one or more episodes.

12. The electronic device of claim 11, wherein the plurality of episodes from the given season of the episodic series of content comprises a sequence of episodes, and wherein the one or more episode download criteria include one or more of:
- a requirement that a user of the electronic device has entitlement to download the one or more episodes in the second set of one or more episodes;
- a requirement that the user of the electronic device has viewed a respective episode in the first set of one or more episodes, previous to an episode in the second set of one or more episodes in the sequence of episodes of the plurality of episodes; and
- a requirement that the one or more episodes in the second set of one or more episodes are available for download.

13. The electronic device of claim 11, wherein the one or more programs include instructions for:
- while displaying the user interface including the download affordance, receiving, via one or more input devices, a user input selecting the download affordance; and
- in response to receiving the user input selecting the download affordance, initiating the process for downloading the one or more episodes in the second set of one or more episodes, including:
- in accordance with a determination that a second episode in the second set of one or more episodes should be next to be downloaded, displaying, via the display generation component, a first portion of a second user interface associated with the episodic series of content, different from the user interface associated with the episodic series of content, wherein the first portion of the second user interface includes a representation of the second episode and a first selectable option that is selectable to initiate a process to download the second episode to the electronic device; and
- in accordance with a determination that a third episode in the second set of one or more episodes should be next to be downloaded, displaying, via the display generation component, a second portion of the second user interface, different from the first portion, wherein the second portion of the second user interface includes a representation of the third episode and a second selectable option that is selectable to initiate a process to download a fourth episode to the electronic device, wherein the third episode is different from the second episode.

14. The electronic device of claim 11, wherein the process for downloading the one or more episodes in the second set of one or more episodes includes beginning download of a respective episode in the second set of one or more episodes without navigating away from the user interface associated with the episodic series of content.

15. The electronic device of claim 14, wherein:
- in accordance with the determination that the one or more episode download criteria are met, the user interface associated with the episodic series of content includes a representation of the respective episode, and the download affordance is displayed with the representation of the respective episode, and
- in accordance with the determination that the one or more episode download criteria are not met, the user interface associated with the episodic series of content does not include a representation of the respective episode.

16. The electronic device of claim 15, wherein:
- the plurality of episodes from the given season of the episodic series of content comprises a sequence of episodes;
- a user account associated with the electronic device includes an indication that a given episode in the first set of one or more episodes has been most recently watched;
- a next episode after the given episode in the sequence of episodes is not currently downloaded on the electronic device;
- in accordance with a determination that the given episode is a first episode of the plurality of episodes, the respective episode is a second episode in the second set of one or more episodes and the download affordance displayed with the representation of the respective episode is selectable to initiate a process for downloading the second episode; and
- in accordance with a determination that the given episode is a third episode of the plurality of episodes, the respective episode is a fourth episode in the second set of one or more episodes and the download affordance displayed with the representation of the respective episode is selectable to initiate a process for downloading the fourth episode.

17. The electronic device of claim 15, wherein the one or more representations of the first set of one or more episodes are displayed in a first portion in the user interface associated with downloaded episodes, and the representation of the respective episode is displayed in a second portion in the user interface, different from the first portion, the one or more programs include instructions for:
- after downloading the respective episode:
- in accordance with a determination that a user account associated with the electronic device does not include an indication that at least a portion of the respective episode has been played, maintaining display of the representation of the respective episode in the second portion in the user interface.

18. The electronic device of claim 17, wherein the one or more programs include instructions for:
   after downloading the respective episode:
      in accordance with a determination that the user account includes the indication that at least a portion of the respective episode has been played:
         ceasing display of the representation of the respective episode in the second portion in the user interface; and
         displaying the representation of the respective episode in the first portion in the user interface.

19. The electronic device of claim 17, wherein the one or more programs include instructions for:
   after downloading the respective episode:
      in accordance with a determination that the user account includes an indication that the respective episode has completed playback and in accordance with a determination that a second respective episode, next in a sequence of episodes of the plurality of episodes after the respective episode, is available for download, the user interface includes a representation of the second respective episode, wherein the second respective episode is in the second set of one or more episodes; and
      in accordance with the determination that the user account includes an indication that the respective episode has completed playback and in accordance with a determination that the second respective episode is not available for download, the user interface does not include the representation of the second respective episode.

20. A non-transitory computer readable storage medium storing one or more programs, the one or more programs comprising instructions, which when executed by one or more processors of an electronic device, cause the electronic device to:
   display, via a display generation component, a user interface associated with an episodic series of content, wherein the episodic series of content includes a plurality of episodes from a given season of the episodic series of content, including a first set of one or more episodes that are currently downloaded on the electronic device and a second set of one or more episodes that are not currently downloaded on the electronic device, and wherein the user interface:
      includes one or more representations of the first set of one or more episodes that are currently downloaded on the electronic device;
      does not include a representation of a given episode from the second set of one or more episodes that are not currently downloaded on the electronic device;
      in accordance with a determination that one or more episode download criteria are met, includes a download affordance that is selectable to initiate a process for downloading one or more episodes in the second set of one or more episodes, wherein initiating the process for downloading one or more episodes in the second set of the one or more episodes includes displaying, via the display generation component, a second user interface that includes representations of one or more episodes in the second set of the one or more episodes; and
      in accordance with a determination that the one or more episode download criteria are not met, does not include the download affordance that is selectable to initiate the process for downloading one or more episodes in the second set of one or more episodes.

21. The electronic device of claim 11, wherein:
   in accordance with a determination that the episodic series of content includes a third set of one or more episodes from a second season of the episodic series of content, different from the given season, that are currently downloaded on the electronic device:
      the user interface includes a first portion associated with the given season and a second portion associated with the second season, the one or more representations of the one or more episodes in the first set displayed in the first portion of the user interface and one or more representations of the one or more episodes in the third set displayed in the second portion of the user interface;
      the download affordance that is selectable to initiate the process for downloading the one or more episodes in the second set of one or more episodes is included in the first portion of the user interface; and
      in accordance with a determination that one or more second episode download criteria associated with the second season are satisfied, the user interface includes a second download affordance in the second portion that is selectable to initiate a process for downloading one or more episodes from the second season that are not currently downloaded on the electronic device.

22. The non-transitory computer readable storage medium of claim 20, wherein the plurality of episodes from the given season of the episodic series of content comprises a sequence of episodes, and wherein the one or more episode download criteria include one or more of:
   a requirement that a user of the electronic device has entitlement to download the one or more episodes in the second set of one or more episodes;
   a requirement that the user of the electronic device has viewed a respective episode in the first set of one or more episodes, previous to an episode in the second set of one or more episodes in the sequence of episodes of the plurality of episodes; and
   a requirement that the one or more episodes in the second set of one or more episodes are available for download.

23. The non-transitory computer readable storage medium of claim 20, wherein the one or more programs further cause the electronic device to:
   while displaying the user interface including the download affordance, receive, via one or more input devices, a user input selecting the download affordance; and
   in response to receiving the user input selecting the download affordance, initiate the process for downloading the one or more episodes in the second set of one or more episodes, including:
      in accordance with a determination that a second episode in the second set of one or more episodes should be next to be downloaded, display, via the display generation component, a first portion of a second user interface associated with the episodic series of content, different from the user interface associated with the episodic series of content, wherein the first portion of the second user interface includes a representation of the second episode and a first selectable option that is selectable to initiate a process to download the second episode to the electronic device; and
      in accordance with a determination that a third episode in the second set of one or more episodes should be next to be downloaded, display, via the display generation component, a second portion of the second user interface, different from the first portion, wherein the second portion of the second user interface includes a representation of the third episode and a second selectable option that is selectable to initiate a process to download a fourth episode to the electronic device, wherein the third episode is different from the second episode.

24. The non-transitory computer readable storage medium of claim 20, wherein the process for downloading the one or more episodes in the second set of one or more episodes includes beginning download of a respective episode in the second set of one or more episodes without navigating away from the user interface associated with the episodic series of content.

25. The non-transitory computer readable storage medium of claim 24, wherein:
in accordance with the determination that the one or more episode download criteria are met, the user interface associated with the episodic series of content includes a representation of the respective episode, and the download affordance is displayed with the representation of the respective episode, and
in accordance with the determination that the one or more episode download criteria are not met, the user interface associated with the episodic series of content does not include a representation of the respective episode.

26. The non-transitory computer readable storage medium of claim 25, wherein:
the plurality of episodes from the given season of the episodic series of content comprises a sequence of episodes;
a user account associated with the electronic device includes an indication that a given episode in the first set of one or more episodes has been most recently watched;
a next episode after the given episode in the sequence of episodes is not currently downloaded on the electronic device;
in accordance with a determination that the given episode is a first episode of the plurality of episodes, the respective episode is a second episode in the second set of one or more episodes and the download affordance displayed with the representation of the respective episode is selectable to initiate a process for downloading the second episode; and
in accordance with a determination that the given episode is a third episode of the plurality of episodes, the respective episode is a fourth episode in the second set of one or more episodes and the download affordance displayed with the representation of the respective episode is selectable to initiate a process for downloading the fourth episode.

27. The non-transitory computer readable storage medium of claim 25, wherein the one or more representations of the first set of one or more episodes are displayed in a first portion in the user interface associated with downloaded episodes, and the representation of the respective episode is displayed in a second portion in the user interface, different from the first portion, the one or more programs further cause the electronic device to:
after downloading the respective episode:
in accordance with a determination that a user account associated with the electronic device does not include an indication that at least a portion of the respective episode has been played, maintain display of the representation of the respective episode in the second portion in the user interface.

28. The non-transitory computer readable storage medium of claim 27, wherein the one or more programs further cause the electronic device to:
after downloading the respective episode:
in accordance with a determination that the user account includes the indication that at least a portion of the respective episode has been played:
cease display of the representation of the respective episode in the second portion in the user interface; and
display the representation of the respective episode in the first portion in the user interface.

29. The non-transitory computer readable storage medium of claim 27, wherein:
after downloading the respective episode:
in accordance with a determination that the user account includes an indication that the respective episode has completed playback and in accordance with a determination that a second respective episode, next in a sequence of episodes of the plurality of episodes after the respective episode, is available for download, the user interface includes a representation of the second respective episode, wherein the second respective episode is in the second set of one or more episodes; and
in accordance with the determination that the user account includes an indication that the respective episode has completed playback and in accordance with a determination that the second respective episode is not available for download, the user interface does not include the representation of the second respective episode.

30. The non-transitory computer readable storage medium of claim 20, wherein:
in accordance with a determination that the episodic series of content includes a third set of one or more episodes from a second season of the episodic series of content, different from the given season, that are currently downloaded on the electronic device:
the user interface includes a first portion associated with the given season and a second portion associated with the second season, the one or more representations of the one or more episodes in the first set displayed in the first portion of the user interface and one or more representations of the one or more episodes in the third set displayed in the second portion of the user interface;
the download affordance that is selectable to initiate the process for downloading the one or more episodes in the second set of one or more episodes is included in the first portion of the user interface; and
in accordance with a determination that one or more second episode download criteria associated with the second season are satisfied, the user interface includes a second download affordance in the second portion that is selectable to initiate a process for downloading one or more episodes from the second season that are not currently downloaded on the electronic device.

* * * * *